(12) United States Patent
Little

(10) Patent No.: US 11,169,340 B2
(45) Date of Patent: Nov. 9, 2021

(54) INTERCONNECTION SYSTEM

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Terrance F. Little, Fullerton, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 30 days.

(21) Appl. No.: 16/359,949

(22) Filed: Mar. 20, 2019

(65) Prior Publication Data
US 2019/0293884 A1    Sep. 26, 2019

Related U.S. Application Data

(60) Provisional application No. 62/645,823, filed on Mar. 21, 2018.

(51) Int. Cl.
*G02B 6/43*  (2006.01)
*H01R 12/72* (2011.01)
(Continued)

(52) U.S. Cl.
CPC ............. *G02B 6/43* (2013.01); *G02B 6/3897* (2013.01); *H01R 12/721* (2013.01);
(Continued)

(58) Field of Classification Search
CPC .... H01R 12/72; H01R 12/716; H01R 12/721; H01R 13/6559; H01R 13/6582;
(Continued)

(56) References Cited

U.S. PATENT DOCUMENTS 3,727,168 A * 4/1973 Henschen .............. H01R 31/02
439/498
4,087,146 A * 5/1978 Hudson, Jr. .......... H01R 12/714
439/67
(Continued)

FOREIGN PATENT DOCUMENTS

| CN | 102365907 A | 2/2012 |
| CN | 107078425 A | 8/2017 |
| CN | 107548480 A | 1/2018 |

*Primary Examiner* — Peter G Leigh
(74) *Attorney, Agent, or Firm* — Ming Chieh Chang; Wei Te Chung

(57) ABSTRACT

An electrical receptacle connector is mounted within a metallic cage for mating with a QSFP module received within the cage. The contacts of the cable receptacle connector are arranged with two groups, of which one are connected to the printed circuit board on which the cage is mounted, and the other are connected to the wires which are further connected to a board-mount receptacle connector mounted on another printed circuit board on which the CPU (Central Processing Unit) socket is mounted. Each board-mount receptacle connector corresponds to more than one cable receptacle connector.

20 Claims, 79 Drawing Sheets

(51) Int. Cl.
*G02B 6/38* (2006.01)
*H01R 27/02* (2006.01)
*H01R 25/00* (2006.01)
*H01R 13/6587* (2011.01)

(52) U.S. Cl.
CPC ....... H01R 13/6587 (2013.01); H01R 25/003 (2013.01); H01R 27/02 (2013.01)

(58) Field of Classification Search
CPC ............ H01R 13/6594; H01R 13/6658; H01R 13/6587; H01R 13/6592; H01R 25/003; H01R 27/02
USPC ......................................................... 439/329
See application file for complete search history.

(56) References Cited

U.S. PATENT DOCUMENTS

| | | | | |
|---|---|---|---|---|
| 6,558,191 B2 * | 5/2003 | Bright | ................... | G02B 6/4246 439/541.5 |
| 7,209,621 B2 * | 4/2007 | Glebov | ................... | G02B 6/322 385/129 |
| 7,499,616 B2 * | 3/2009 | Aronson | .............. | G02B 6/4249 385/100 |
| 7,744,416 B2 | 6/2010 | Hon Hai | | |
| 8,331,752 B2 * | 12/2012 | Biribuze | .............. | G02B 6/4452 385/135 |
| 8,570,762 B2 * | 10/2013 | Rosenberg | .............. | G06F 1/183 361/775 |
| 8,845,364 B2 | 9/2014 | Molex | | |
| 8,944,830 B2 * | 2/2015 | Little | ................... | G02B 6/4292 439/79 |
| 9,011,177 B2 * | 4/2015 | Lloyd | ................... | H05K 3/222 439/607.47 |
| 9,170,386 B2 * | 10/2015 | Lin | ....... | G02B 6/4272 |
| 9,553,381 B2 * | 1/2017 | Regnier | ............... | H01R 9/0512 |
| 9,590,366 B1 | 3/2017 | Tyco | | |
| 9,705,258 B2 * | 7/2017 | Phillips | ................... | H01R 13/74 |
| 10,826,150 B2 * | 11/2020 | Rosenberger | ........... | H01P 5/026 |
| 2008/0287005 A1 * | 11/2008 | Kameda | .................. | G06F 1/184 439/498 |
| 2014/0037254 A1 * | 2/2014 | Wang | ................ | G02B 6/4248 385/94 |
| 2016/0093985 A1 * | 3/2016 | Zhang | ................ | H01R 13/6586 439/607.07 |
| 2016/0218455 A1 * | 7/2016 | Sayre | ................ | H01R 13/6594 |
| 2017/0077643 A1 * | 3/2017 | Zbinden | .............. | G02B 6/4268 |
| 2017/0302011 A1 * | 10/2017 | Wanha | ............... | H01R 13/6471 |
| 2018/0006416 A1 * | 1/2018 | Lloyd | ............... | H01R 13/6583 |
| 2018/0034175 A1 * | 2/2018 | Lloyd | ................... | H01R 12/71 |
| 2019/0312389 A1 * | 10/2019 | Little | ................. | H01R 13/6582 |

\* cited by examiner

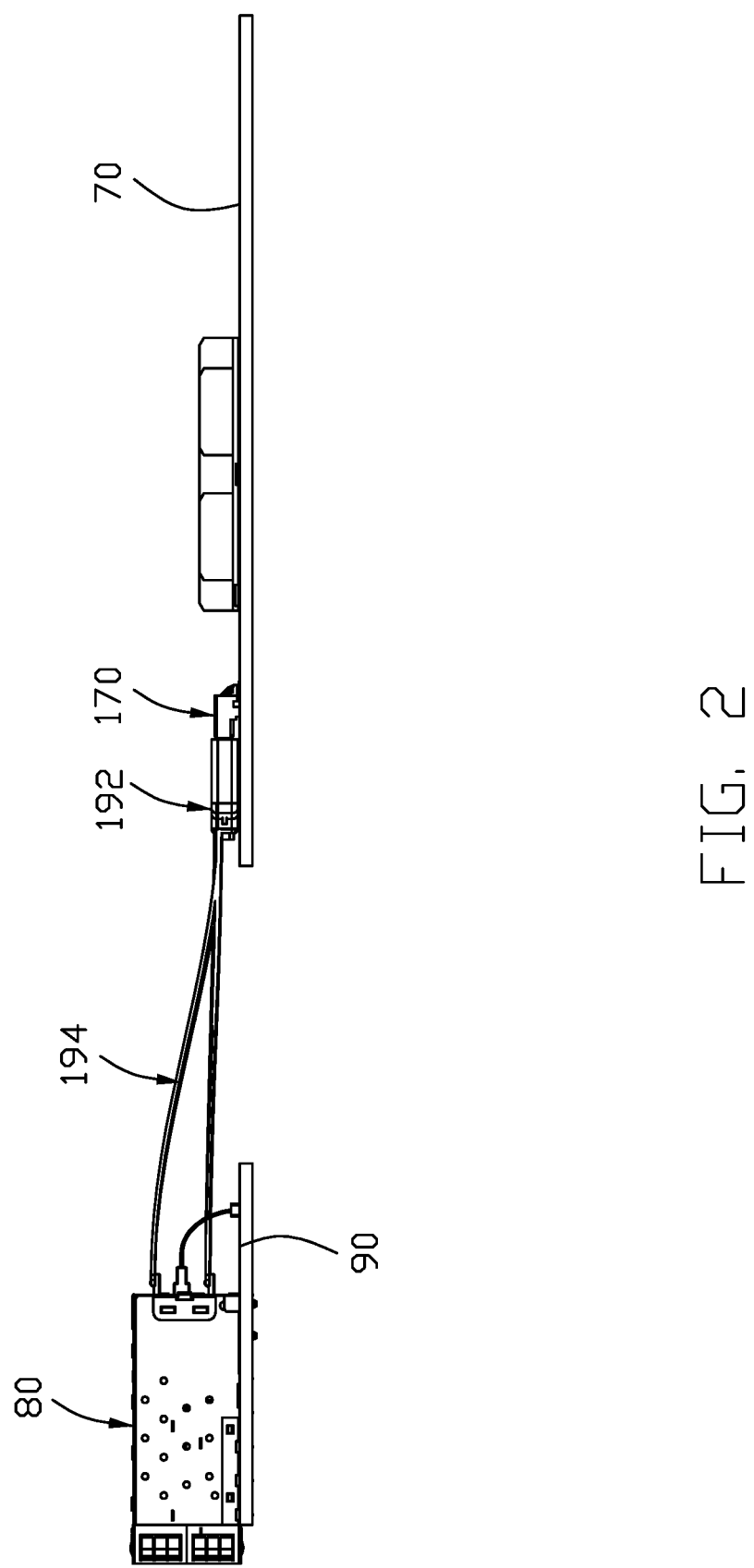

170

170

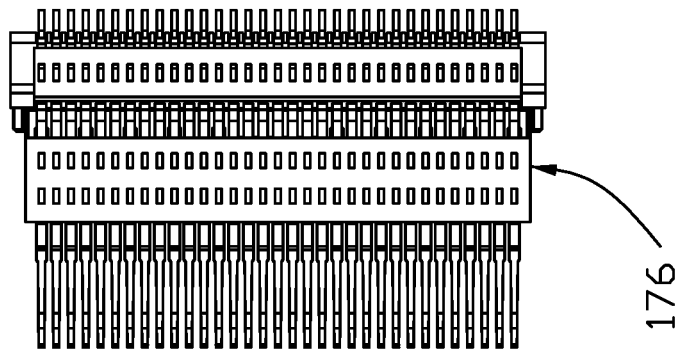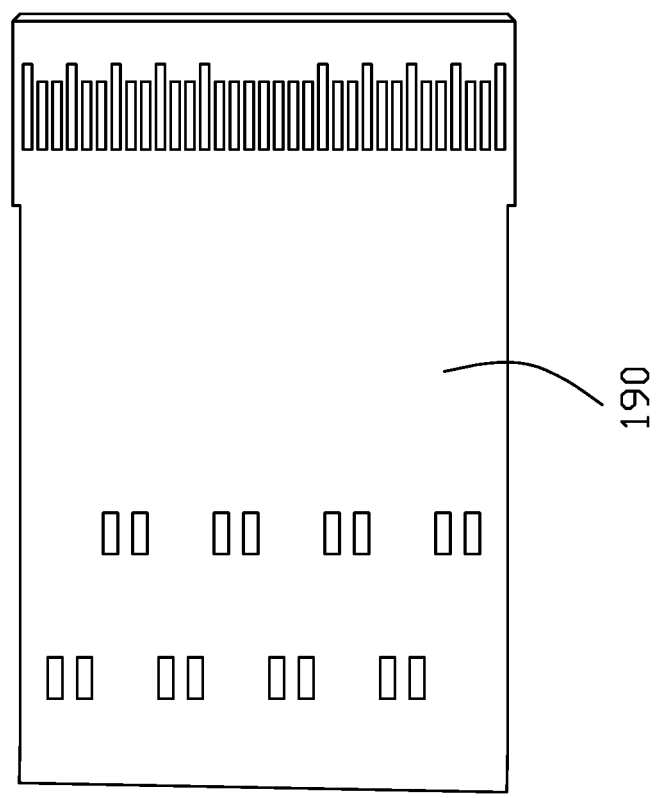
FIG. 18(B)

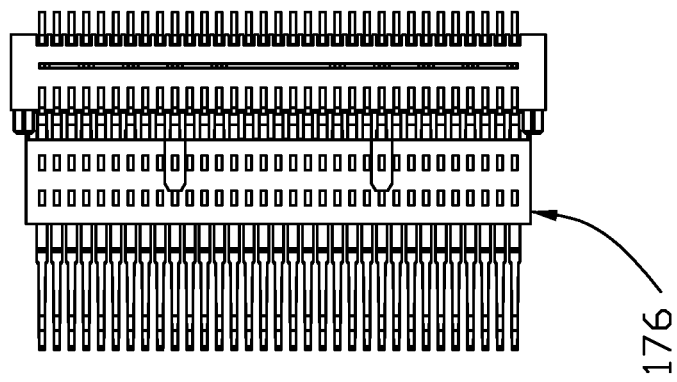
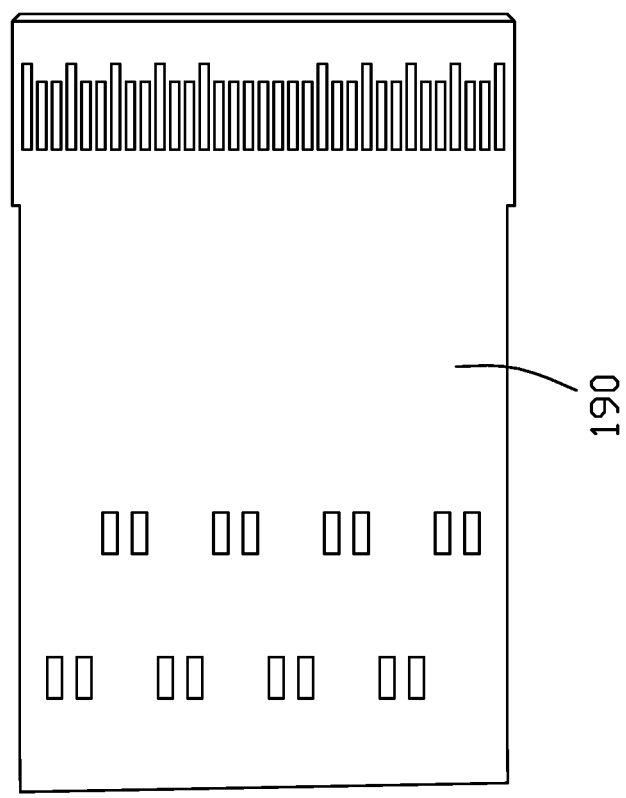
FIG. 18(C)

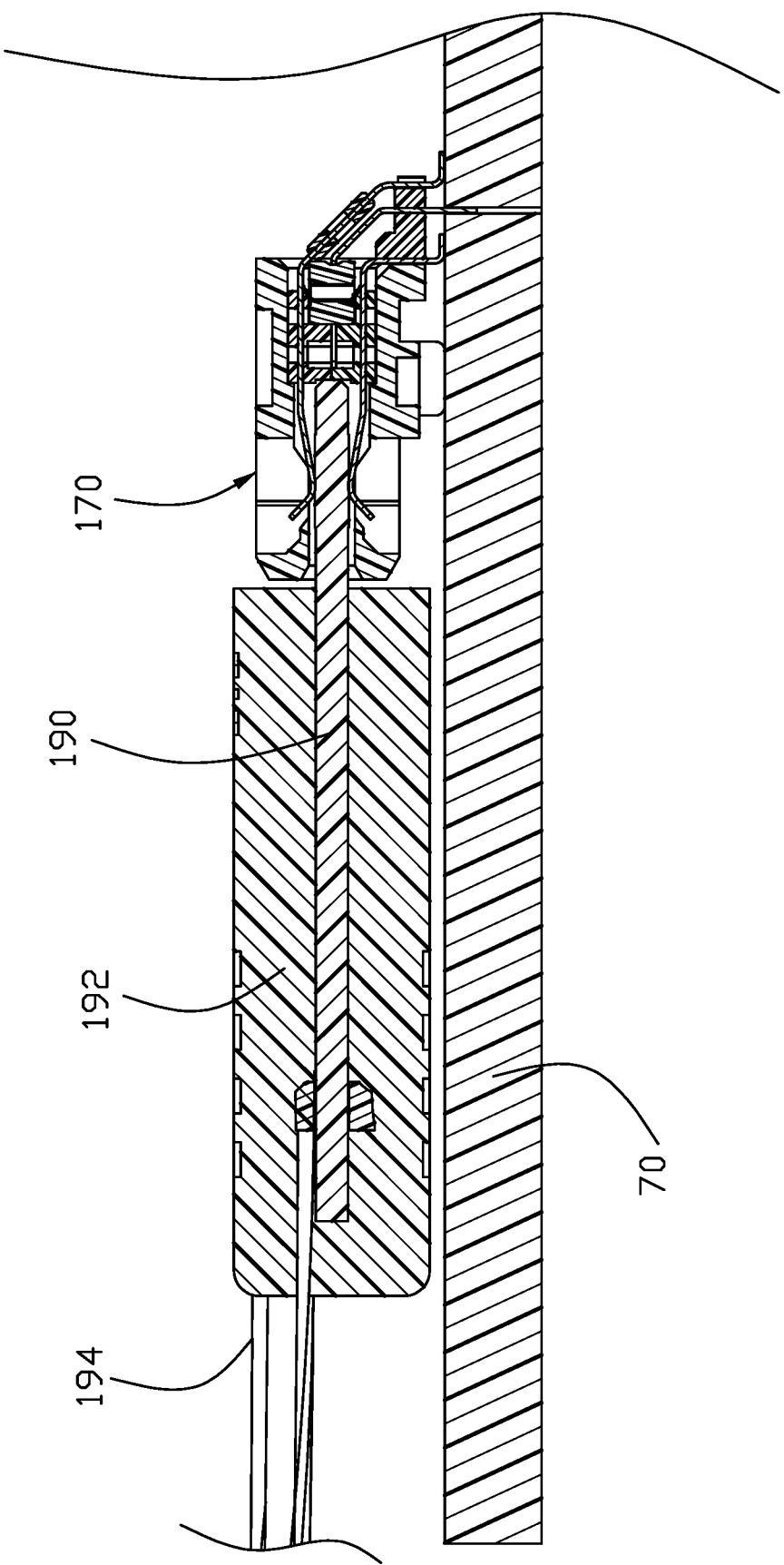

600

600

750

750

750

800

800

# INTERCONNECTION SYSTEM

BACKGROUND OF THE INVENTION

1. Field of the Invention

The present invention relates to an electrical connector assembly, especially to the receptacle connector equipped with cable to transmit high speed signal instead of mounting to PCB by following the spirit of the previous designs of which the provisional applications have Ser. Nos. 62/367, 098 filed on Jul. 26, 2016, 62/399,272 filed on Sep. 23, 2016, 62/412,841 filed on Oct. 26, 2016, 62/425,627 filed on Nov. 23, 2016, 62/449,133 filed on Jan. 23, 2017, 62/509,141 filed on May 21, 2017, 62/522,113 filed on Jun. 20, 2017, 62/533,131 filed on Jul. 17, 2017, 62/584,751 filed on Nov. 11, 2017, 62/614,366 filed on Jan. 6, 2018, and 62/635,508 filed on Feb. 26, 2018.

2. Description of Related Arts

A traditional design between the receptacle connector, which is located at the rear end of the cage for coupling with a QSFP or other type module, and a CPU is through the traces on the printed circuit board on which the CPU socket is mounted. Anyhow, conductive traces on the printed circuit board have their own limitations for high speed high frequency signal transmission.

Therefore, a new arrangement for the QSFP or other type connection without involvement via the traces on the printed circuit board but via the wires, is desired.

SUMMARY OF THE INVENTION

To achieve the above-mentioned object, an electrical receptacle connector is mounted within a metallic cage for mating with a QSFP or other type module received within the cage. The contacts of the receptacle connector are arranged with two groups, of which one are connected to the printed circuit board on which the cage is mounted, and the other are connected to the wires which are further connected to another connector mounted on another printed circuit board adjacent to the CPU (Central Processing Unit) socket.

Other objects, advantages and novel features of the invention will become more apparent from the following detailed description when taken in conjunction with the accompanying drawings.

BRIEF DESCRIPTION OF THE DRAWINGS

FIG. 2 is a side view of the electrical assembly of FIG. 1;

FIG. 18(B) is a top view of the contact module subassembly and the mating tongue of FIG. 18(A);

FIG. 18(C) is a bottom view of the contact module subassembly and the mating tongue of FIG. 18(A);

FIG. 22 is another cross-sectional view of the electrical assembly of FIG. 1;

DETAILED DESCRIPTION OF THE PREFERRED EMBODIMENT

Figure 1:
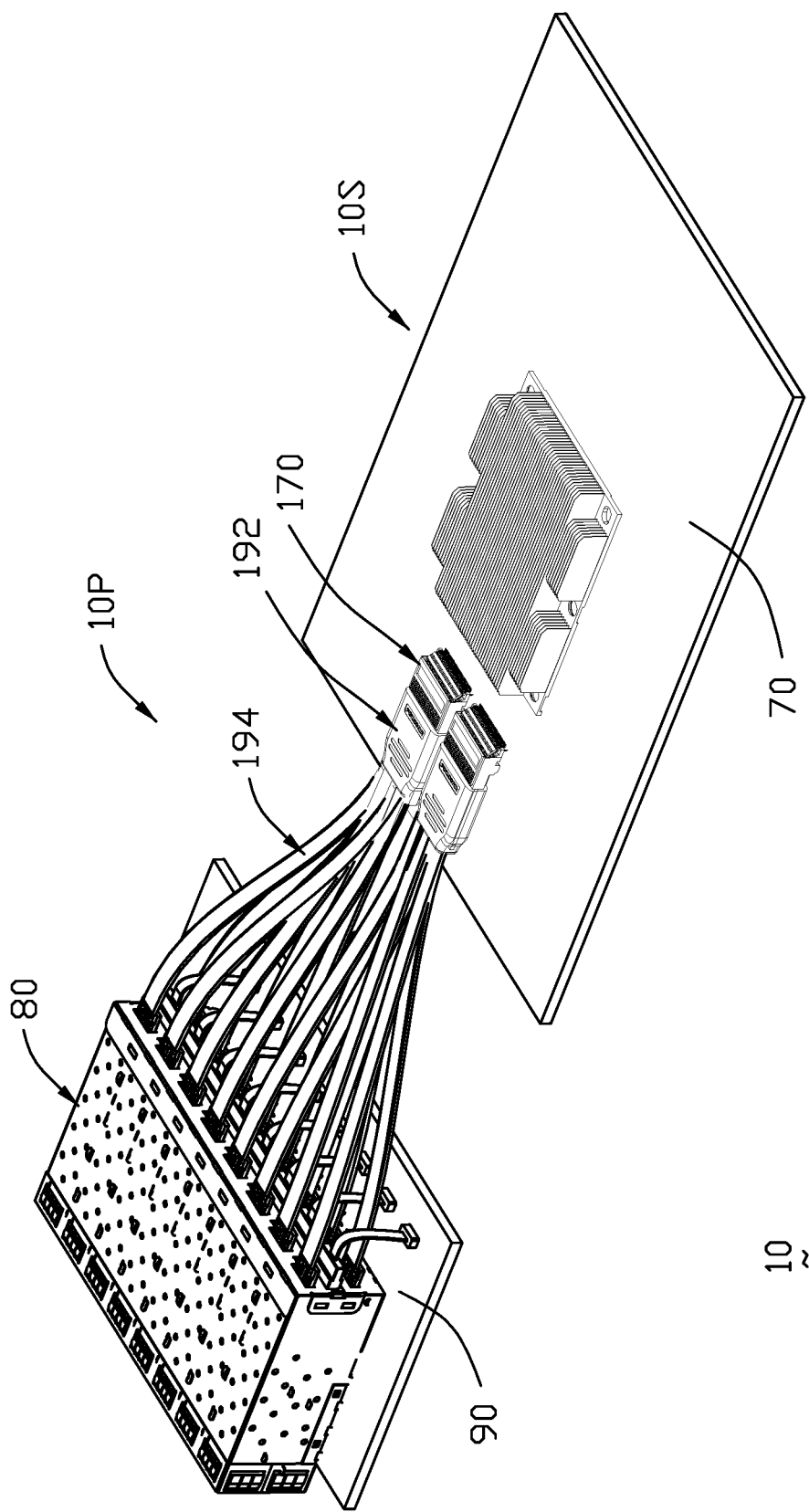
FIG. 1 is a perspective view of an electrical assembly or interconnection system according to the invention.
Figure 3A:
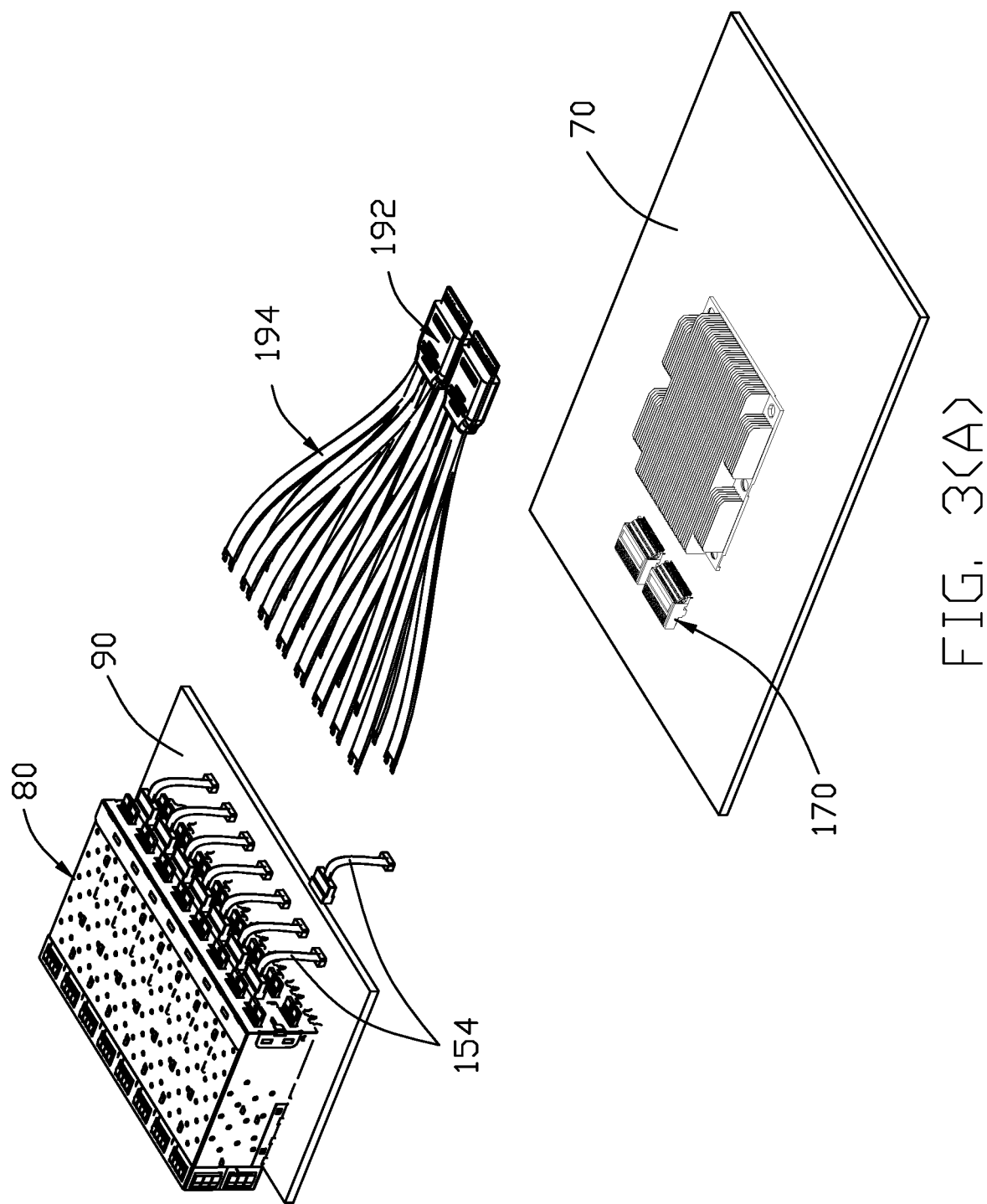
FIG. 3(A) is an exploded perspective view of the electrical assembly of FIG. 1.
Figure 3B:
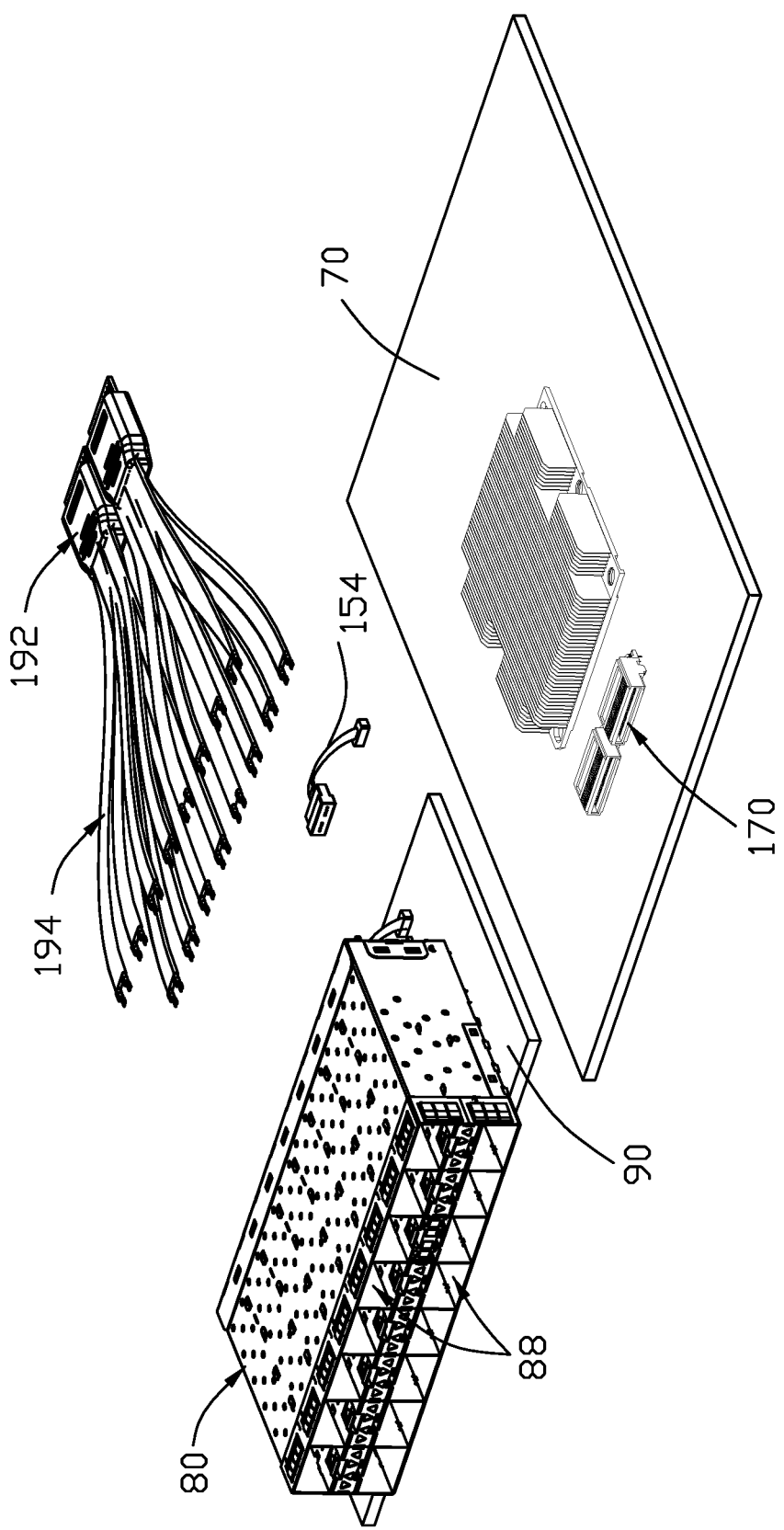
FIG. 3(B) is another exploded perspective view of the electrical assembly of FIG. 3(A)
Figure 4A:
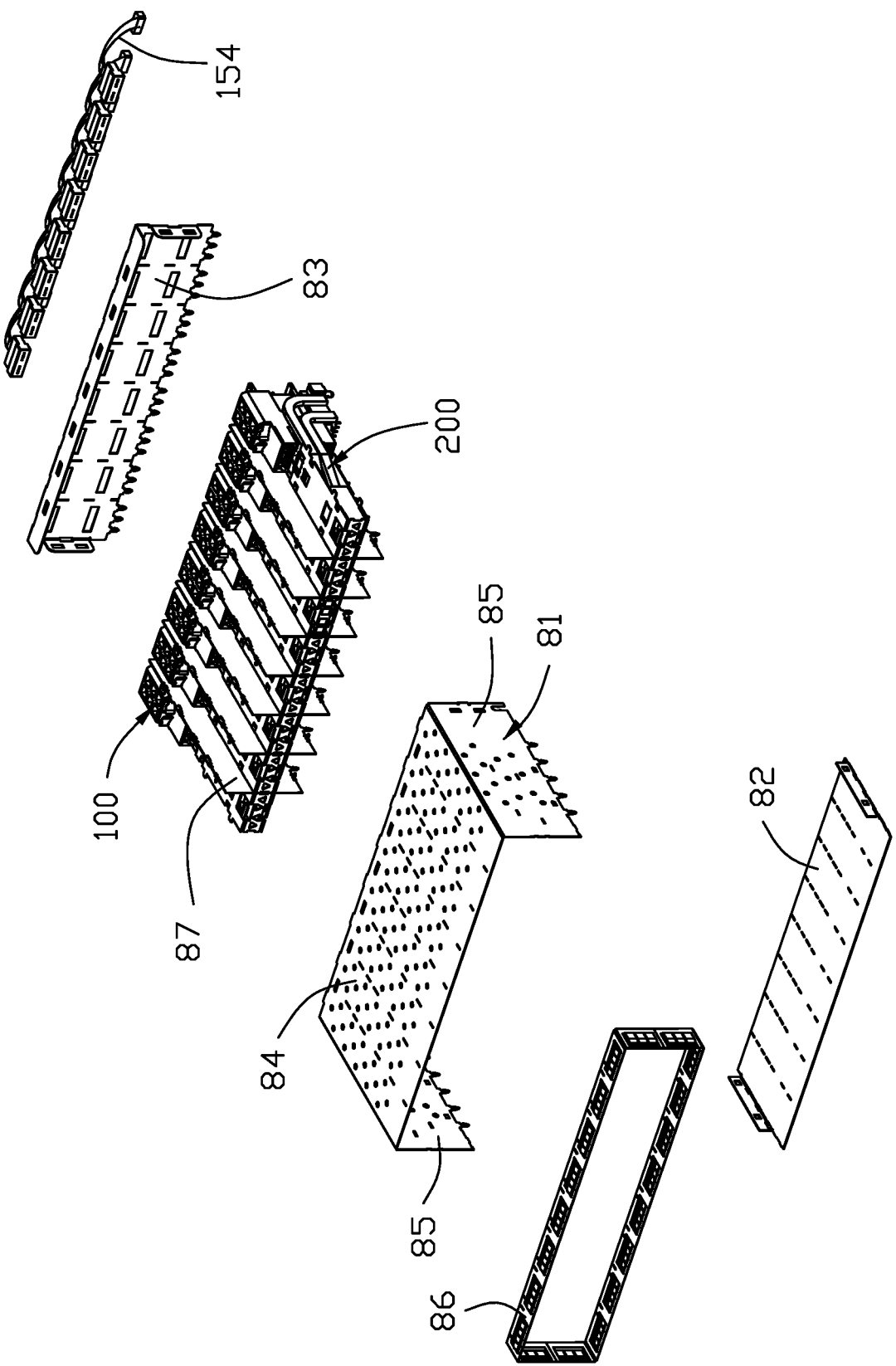
FIG. 4(A) is a further exploded perspective view of the electrical assembly of FIG. 3(A) without showing the high speed cables.
Figure 4B:
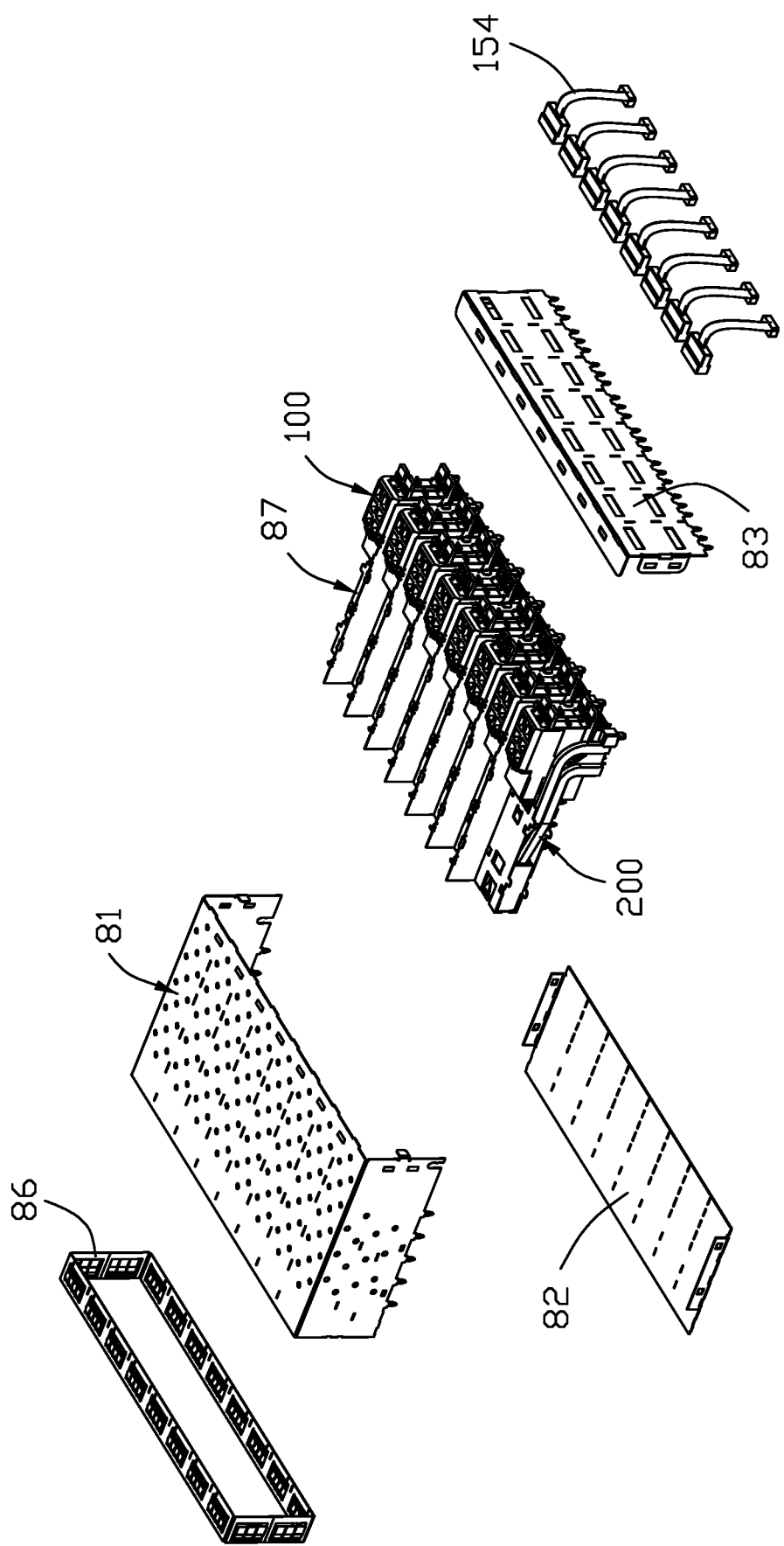
FIG. 4(B) is another further exploded perspective view of the electrical assembly of FIG. 4(A)
Figure 5A:
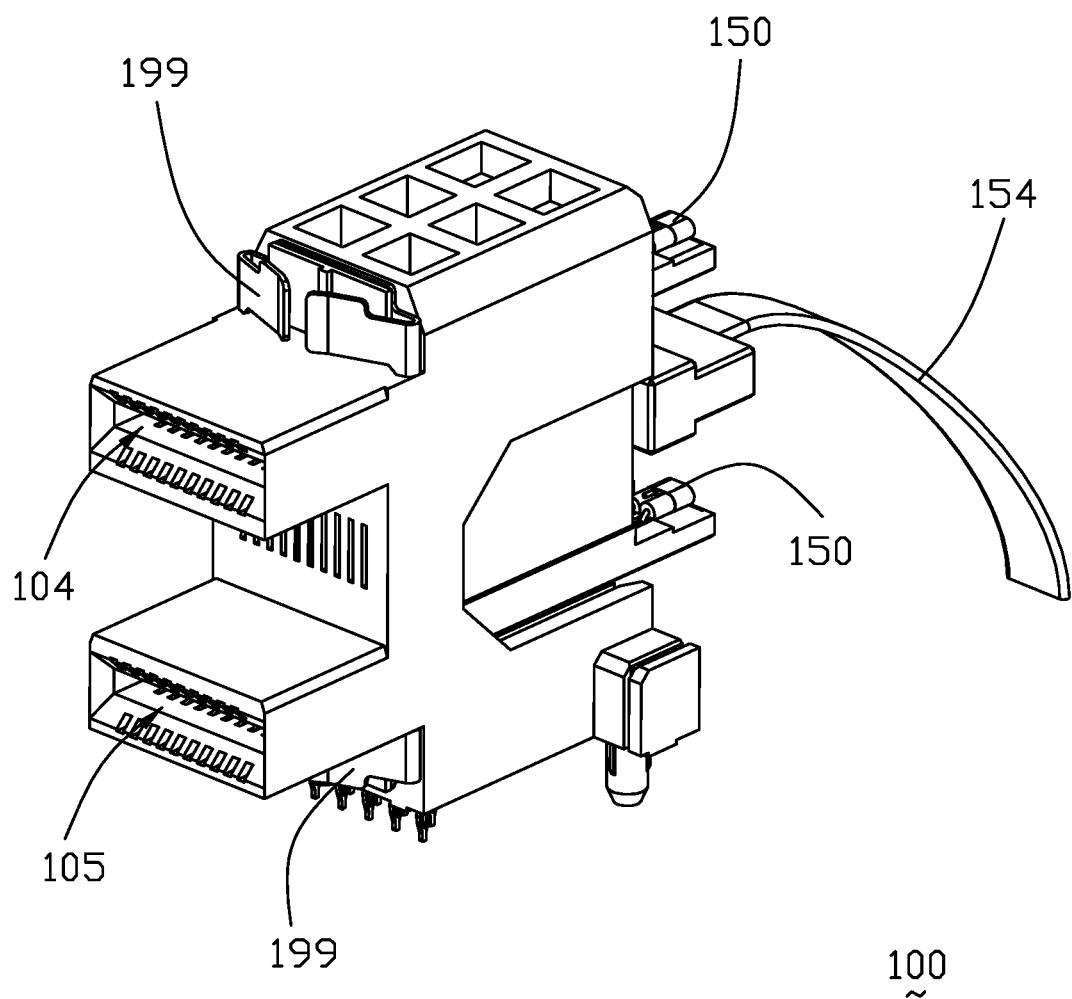
FIG. 5(A) is a perspective view of the cable receptacle connector mounted in each receiving space of the cage of the electrical assembly of FIG. 3(A) with the lower speed cable and front portions of the high speed cables connected thereto.
Figure 5B:
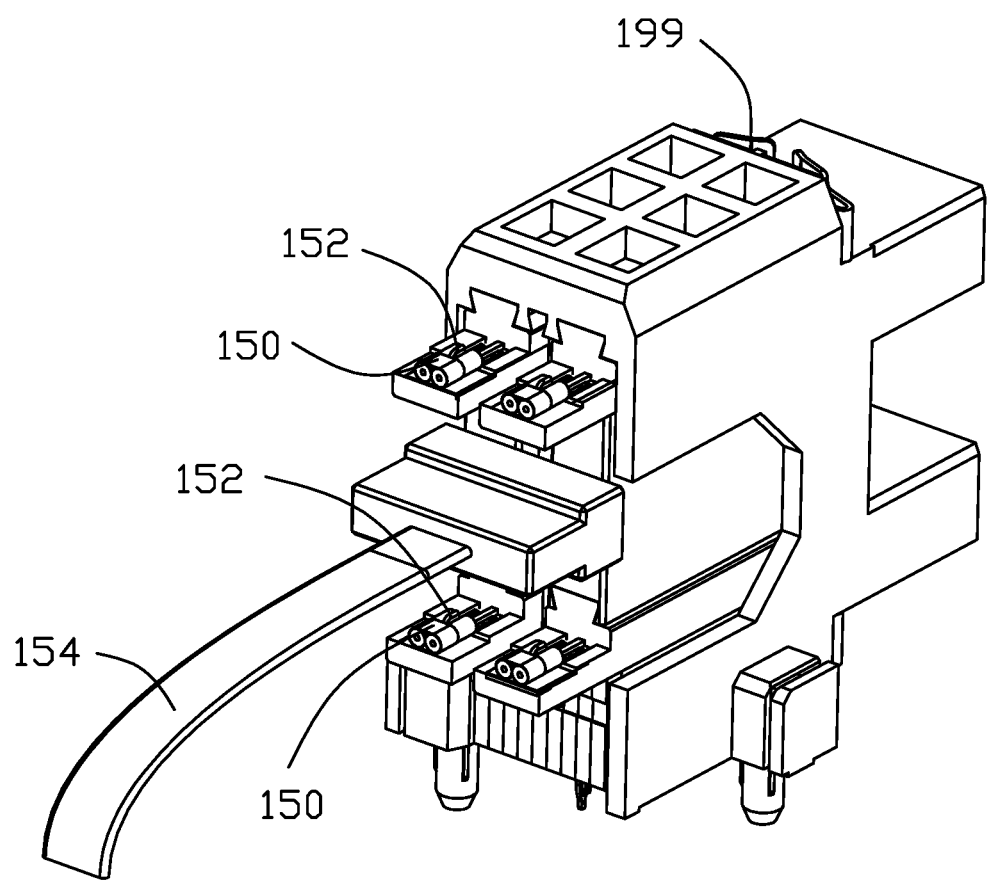
FIG. 5(B) is another perspective view of the cable receptacle connector mounted in each receiving space of the cage of the electrical assembly of FIG. 5(A)
Figure 5C:
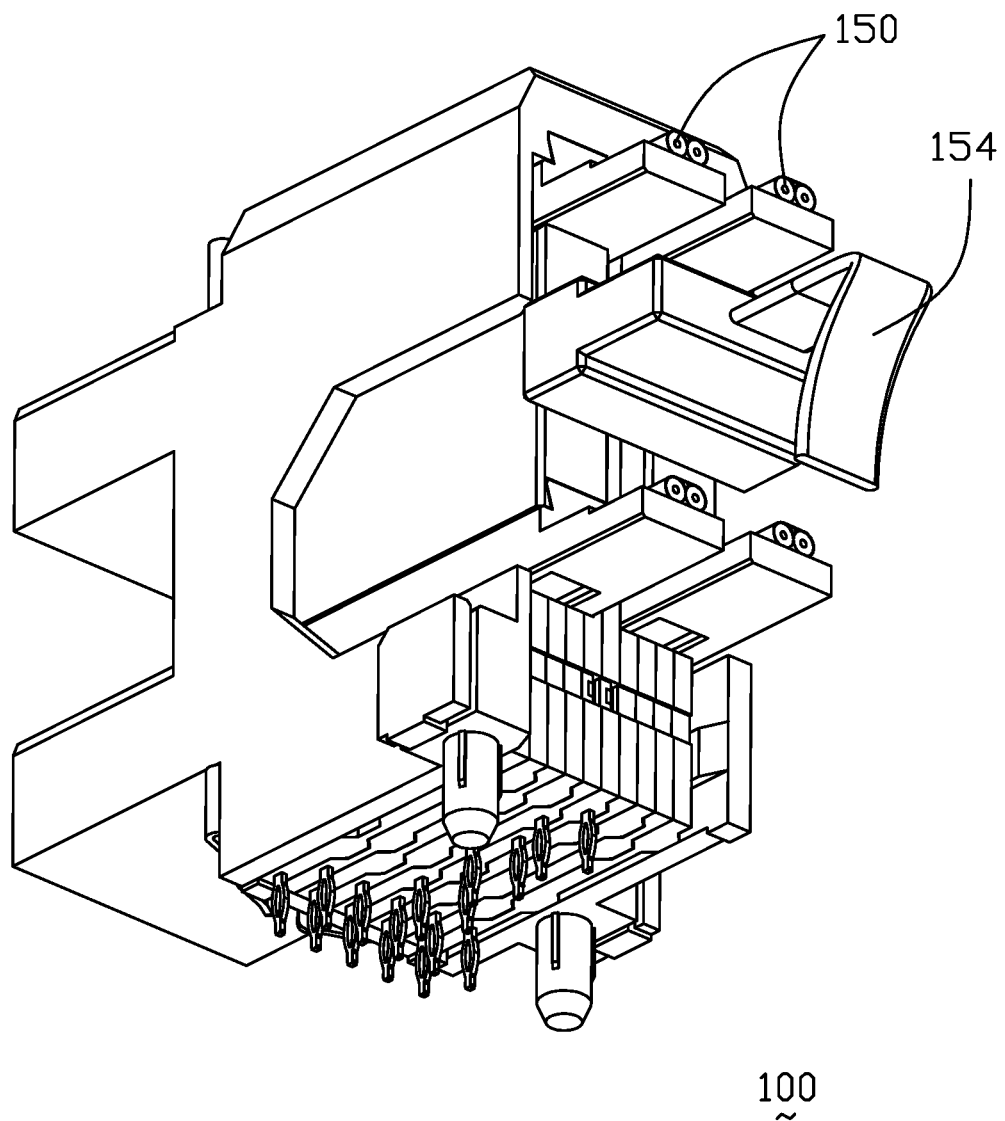
FIG. 5(C) is another perspective view of the cable receptacle connector mounted in each receiving space of the cage of the electrical assembly of FIG. 5(A)
Figure 6A:
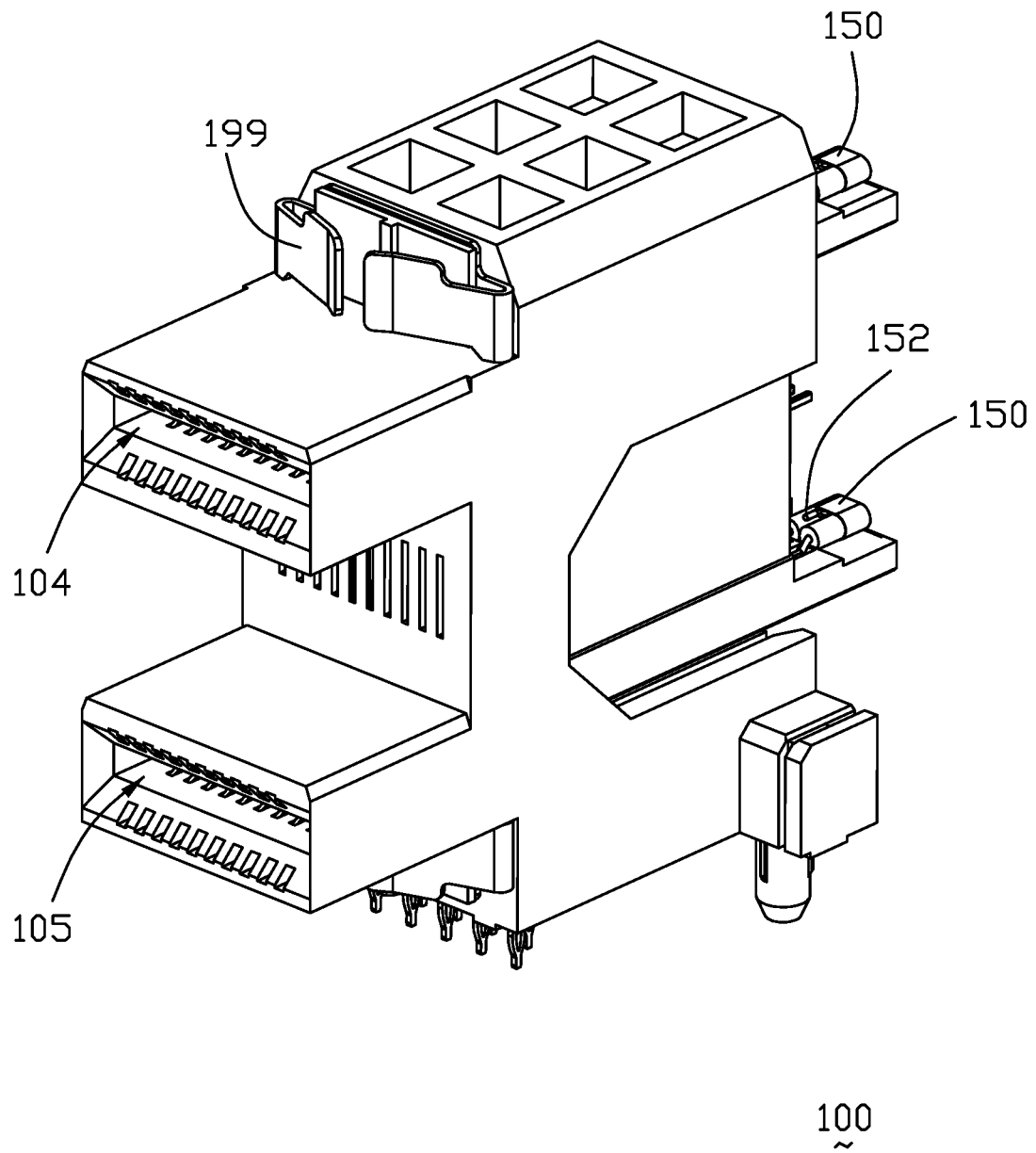
FIG. 6(A) is a perspective view of the cable receptacle connector of FIG. 5(A) without the lower speed cables connected thereto.
Figure 6B:
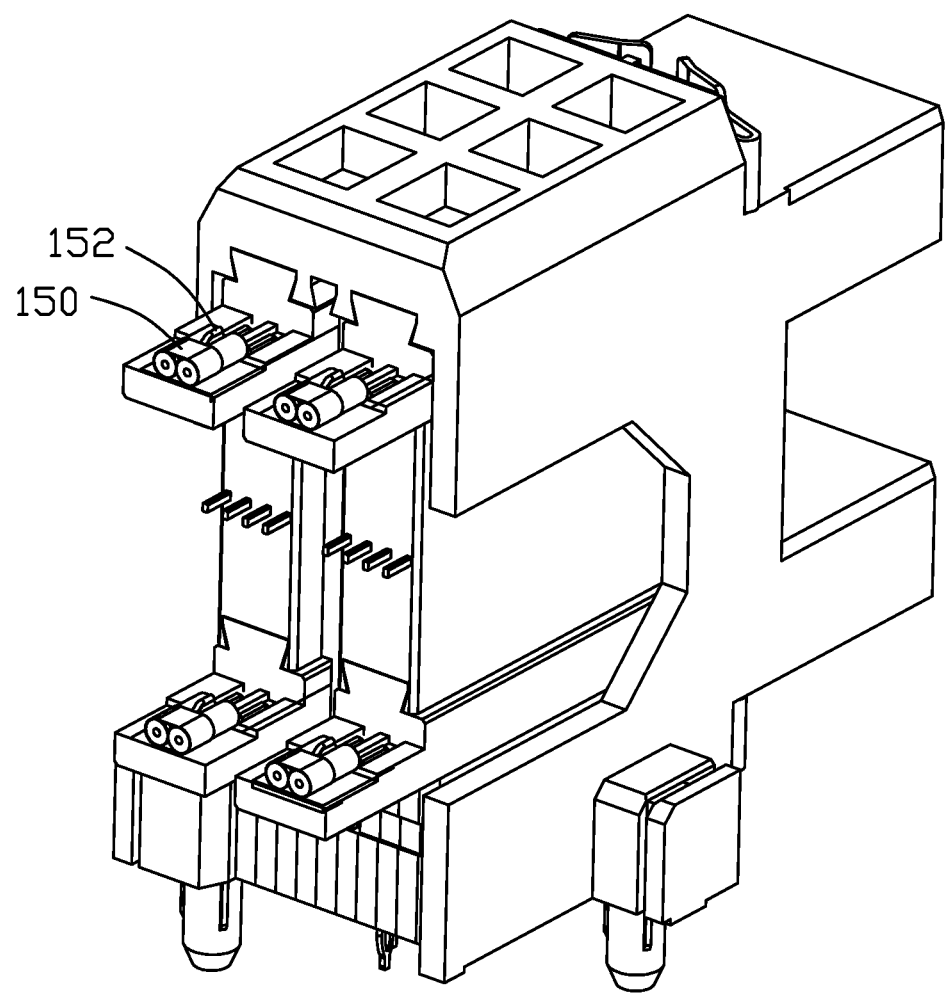
FIG. 6(B) is another perspective view of the cable receptacle connector of FIG. 6(A)
Figure 7A:
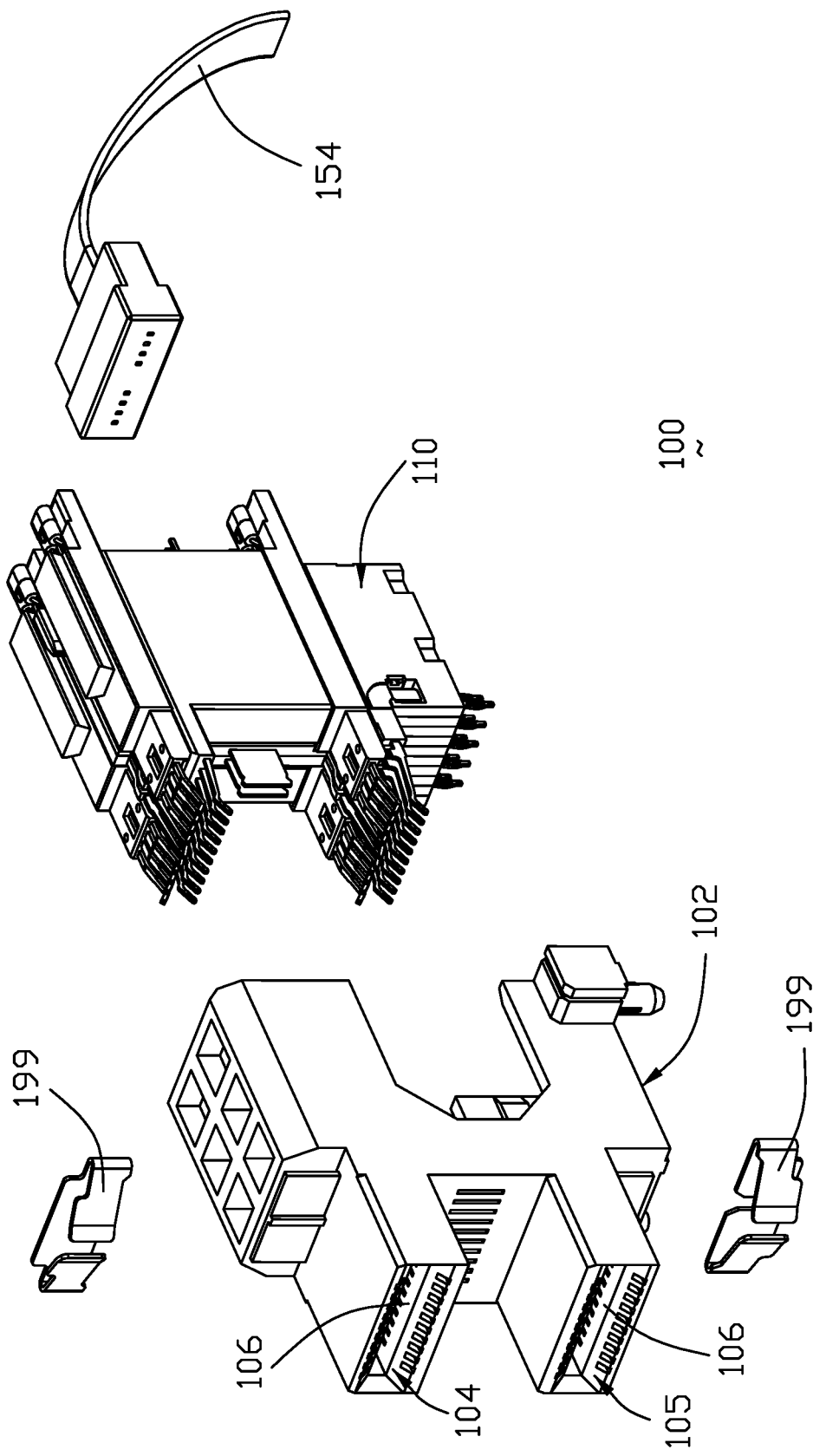
FIG. 7(A) is an exploded perspective view of the cable receptacle connector of FIG. 5(A) with the low speed cable and front portions of the high speed cables therewith.
Figure 7B:
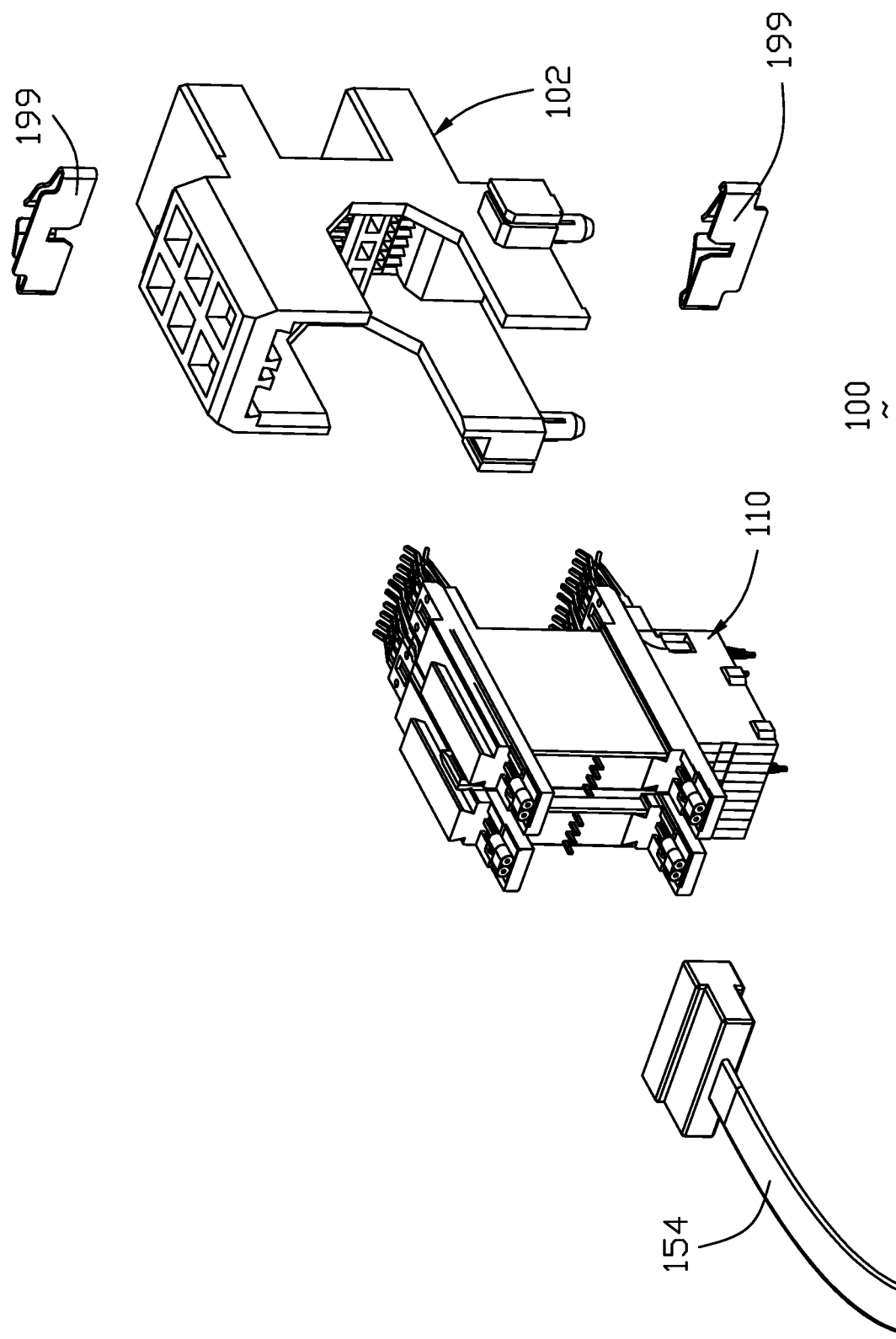
FIG. 7(B) is another exploded perspective view of the cable receptacle connector of FIG. 7(A)
Figure 8:
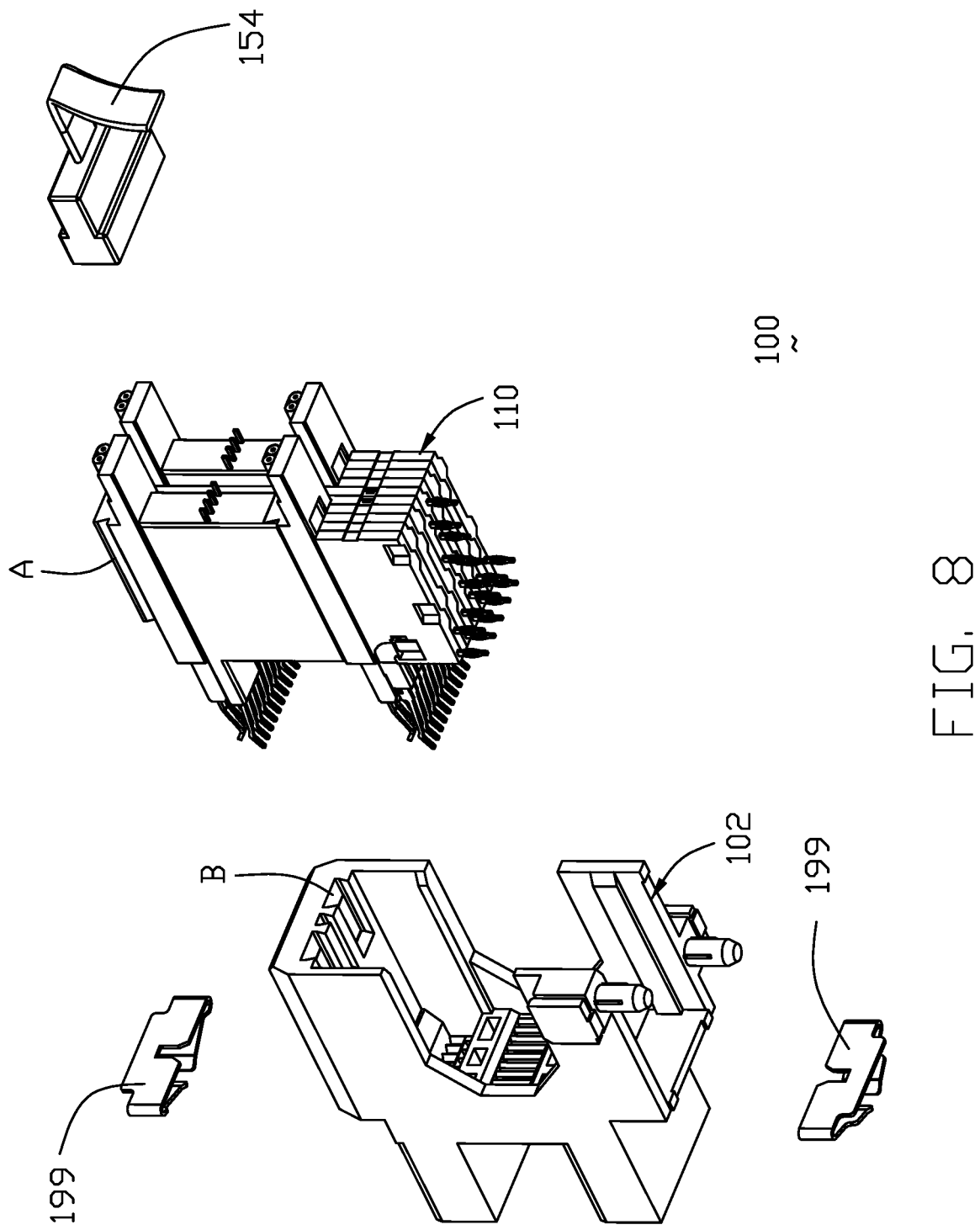
FIG. 8 is an exploded perspective view of the cable receptacle connector of FIG. 7(A) with the low speed cables detached from the corresponding contacts.
Figure 9A:
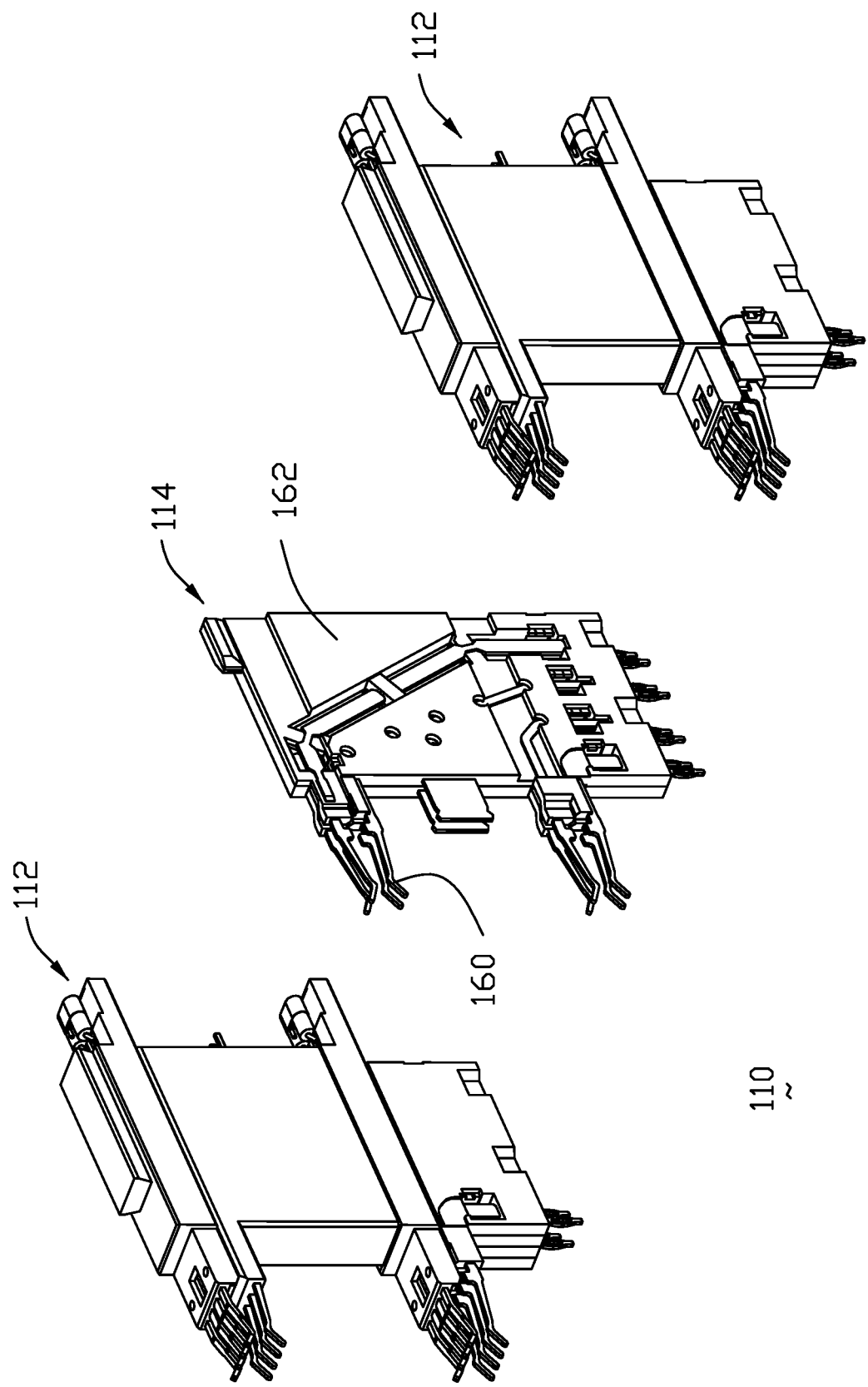
FIG. 9(A) is an exploded perspective view of the contact module subassembly of the cable receptacle connector of FIG. 7(A)
Figure 9B:
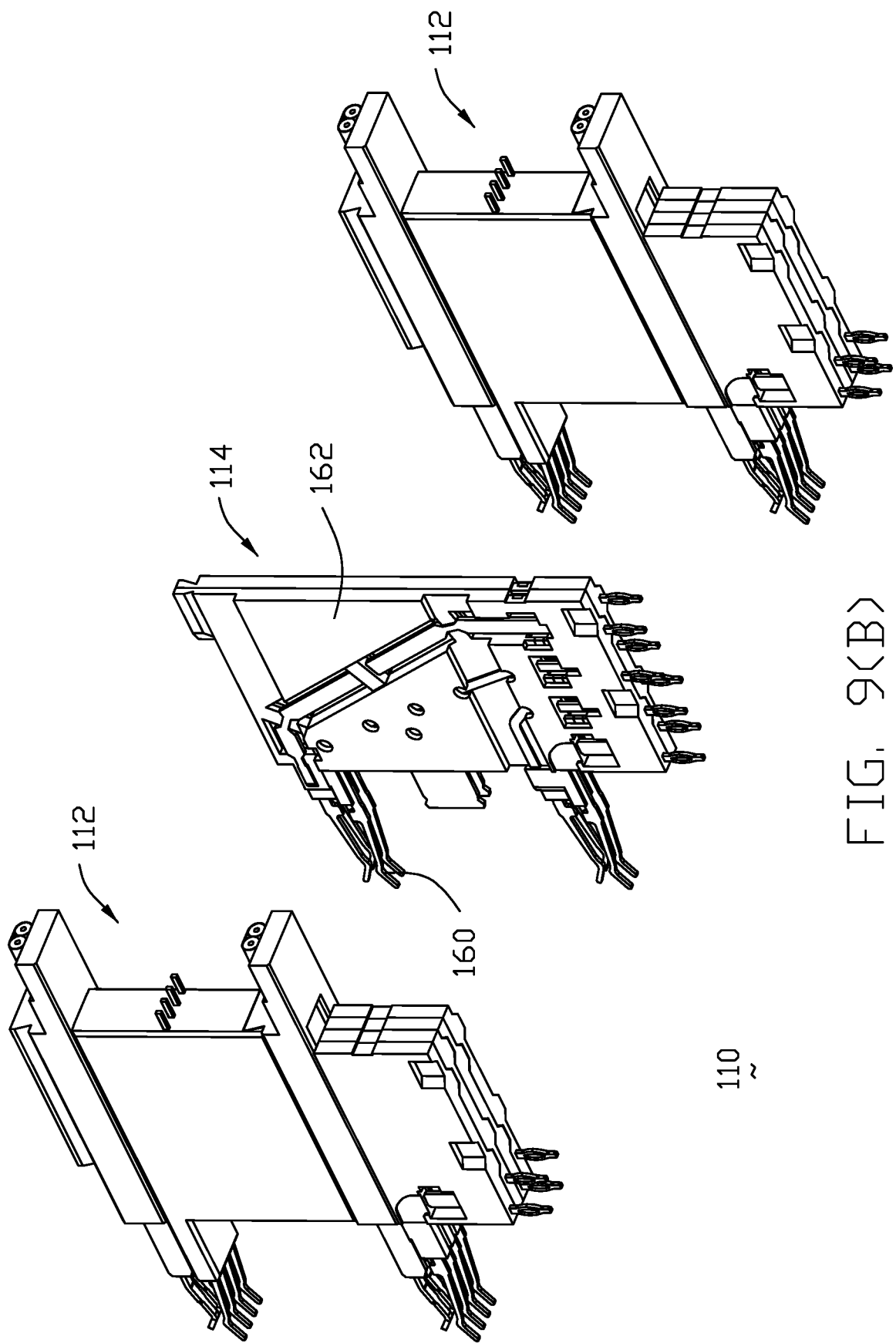
FIG. 9(B) is another exploded perspective view of the contact module subassembly of the cable receptacle connector of FIG. 9(A)
Figure 9C:
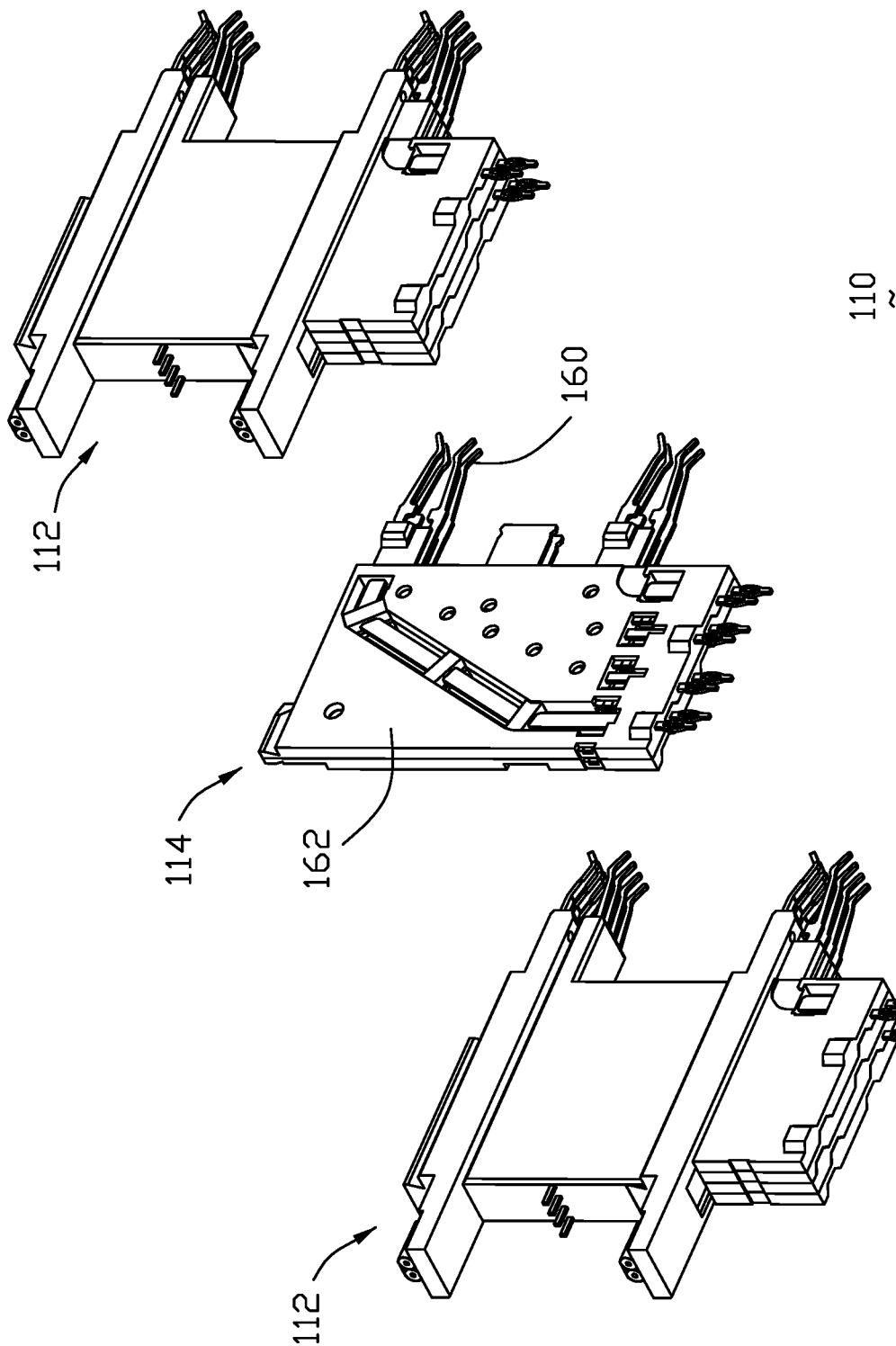
FIG. 9(C) is another perspective view of the cable receptacle connector of FIG. 9(A)
Figure 9D:
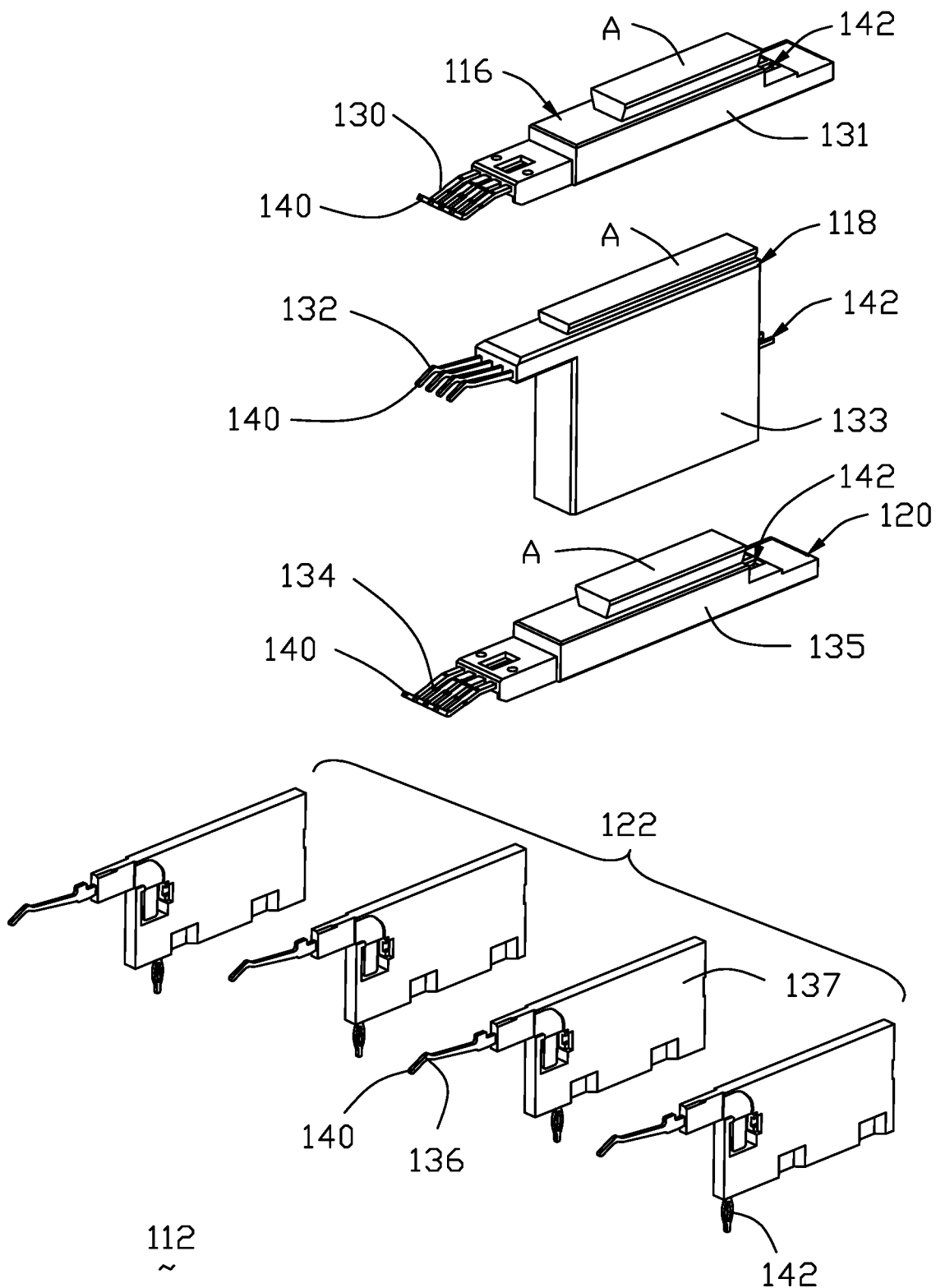
FIG. 9(D) is an exploded perspective view of the side module subassembly of the contact module subassembly of the cable receptacle connector of FIG. 9(A)
Figure 9E:
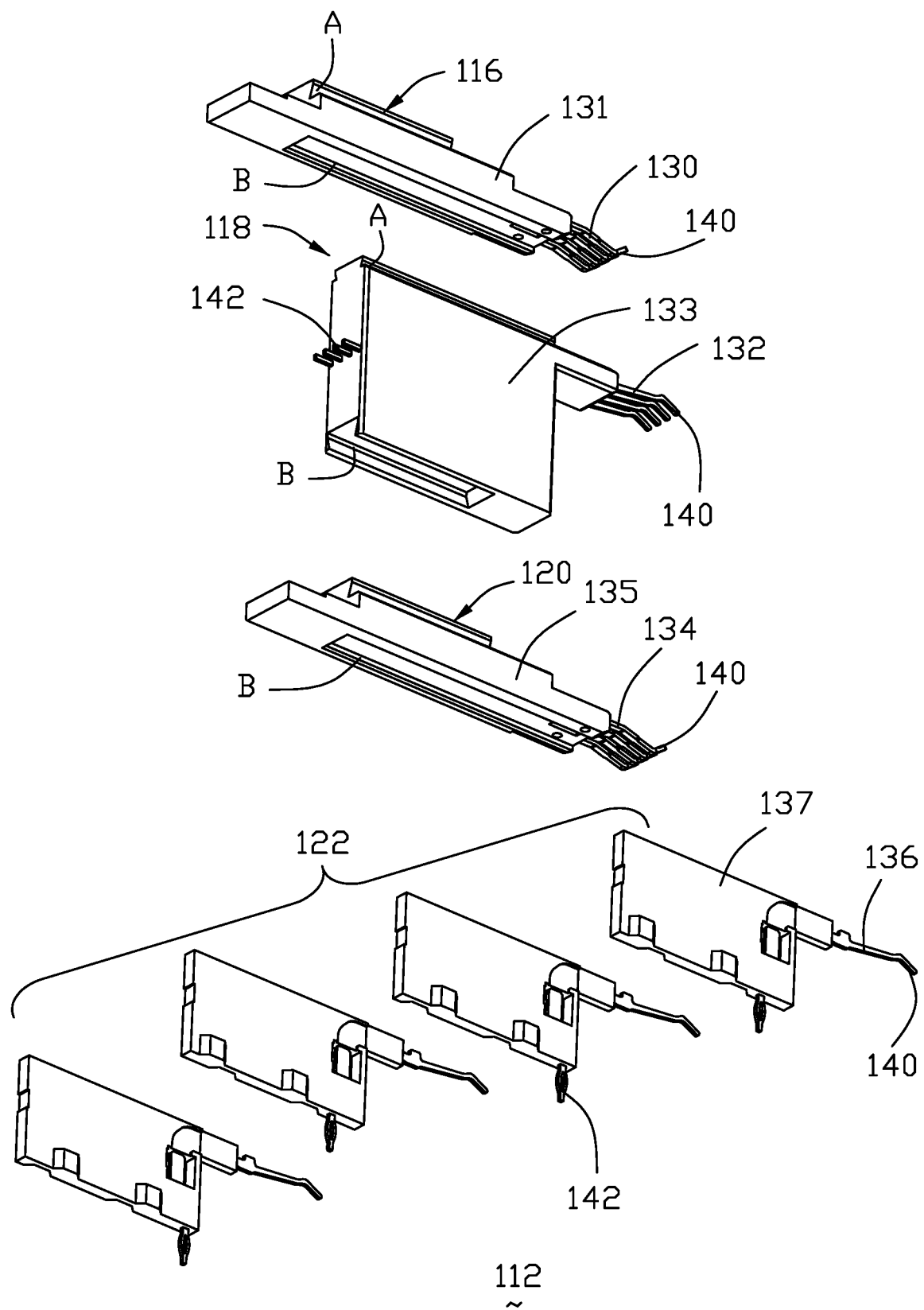
FIG. 9(E) is another exploded perspective view of the side module subassembly of the contact module subassembly of the cable receptacle connector of FIG. 9(D)
Figure 10A:
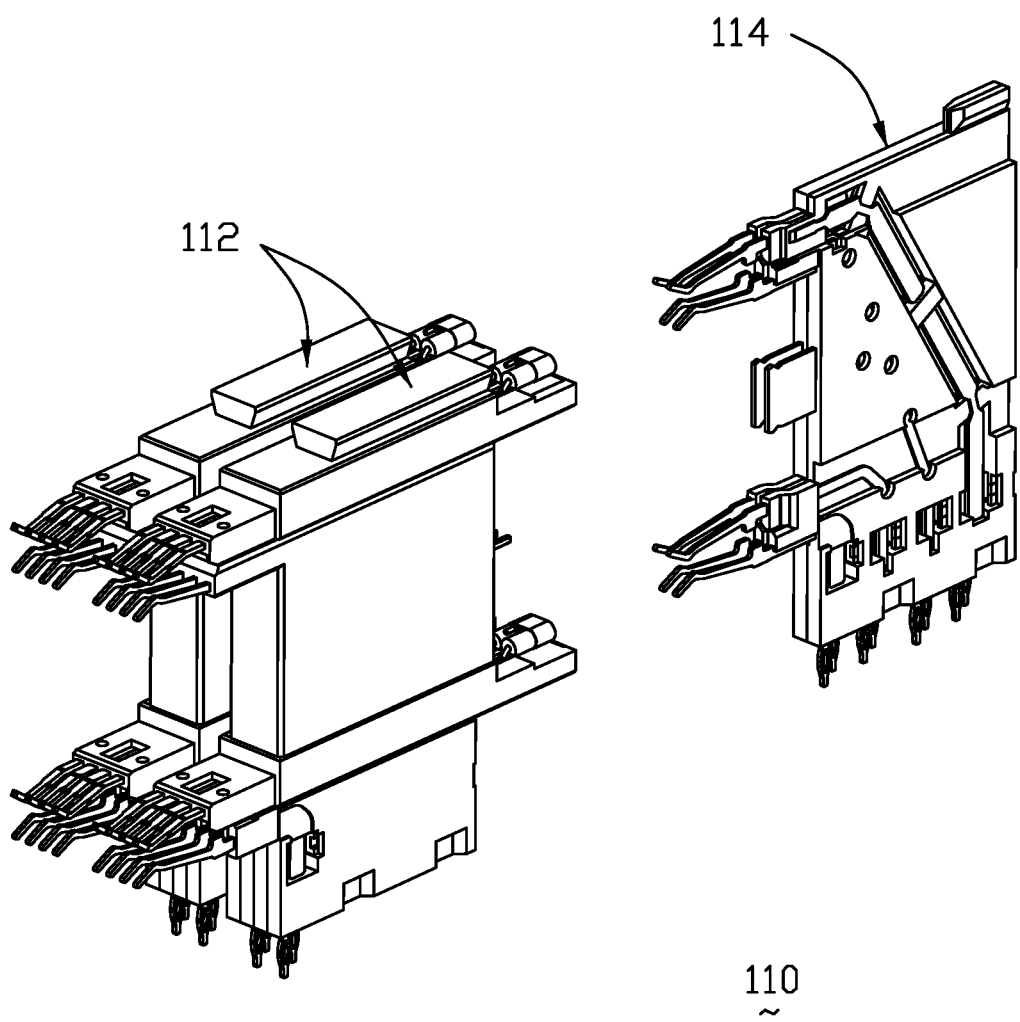
FIG. 10(A) is a perspective view of the contact module subassembly of the cable receptacle connector FIG. 9(A) to show the relative positions.
Figure 10B:
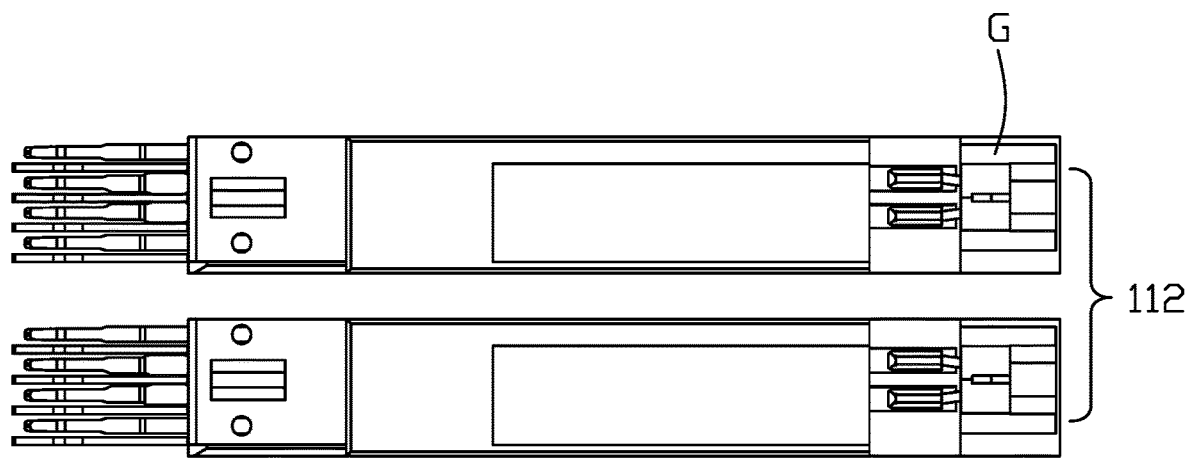
FIG. 10(B) is a top view of the contact module subassembly of the cable receptacle connector of FIG. 10(A)
Figure 11:
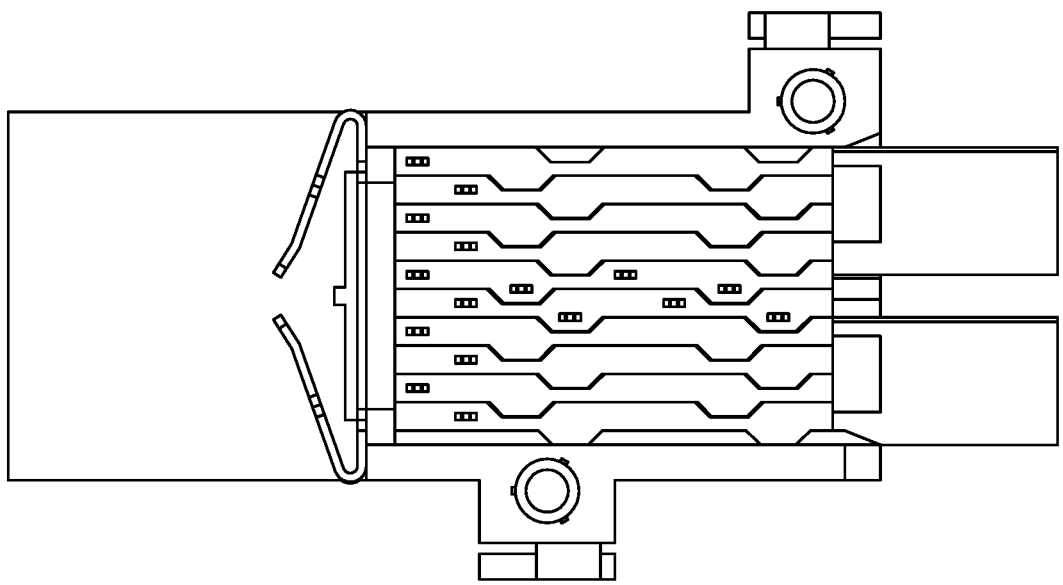
FIG. 11 is a bottom view of the cable receptacle connector of the electrical assembly of FIG. 6(A)
Figure 12A:
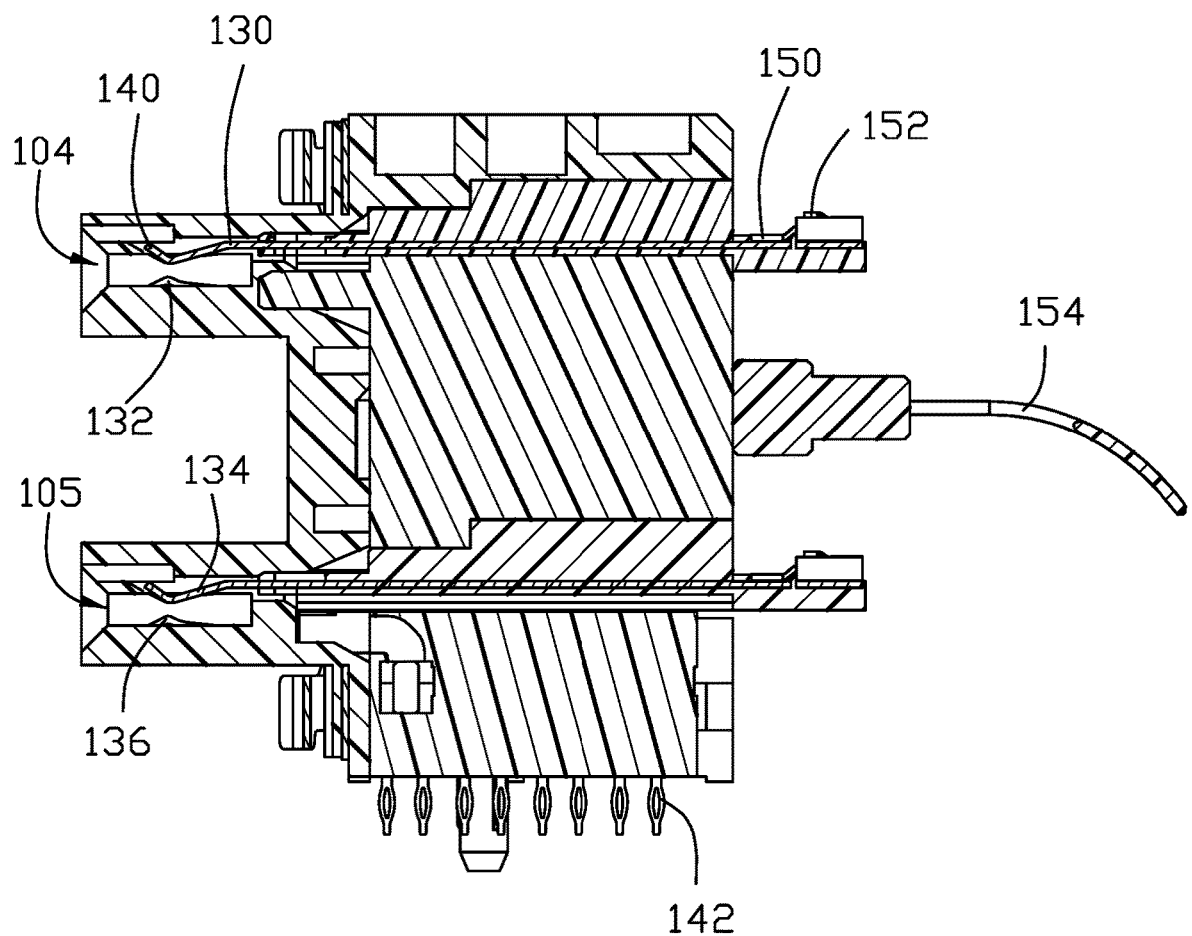
FIG. 12(A) is a cross-sectional view of the cable receptacle connector of FIG. 5(A)
Figure 12B:
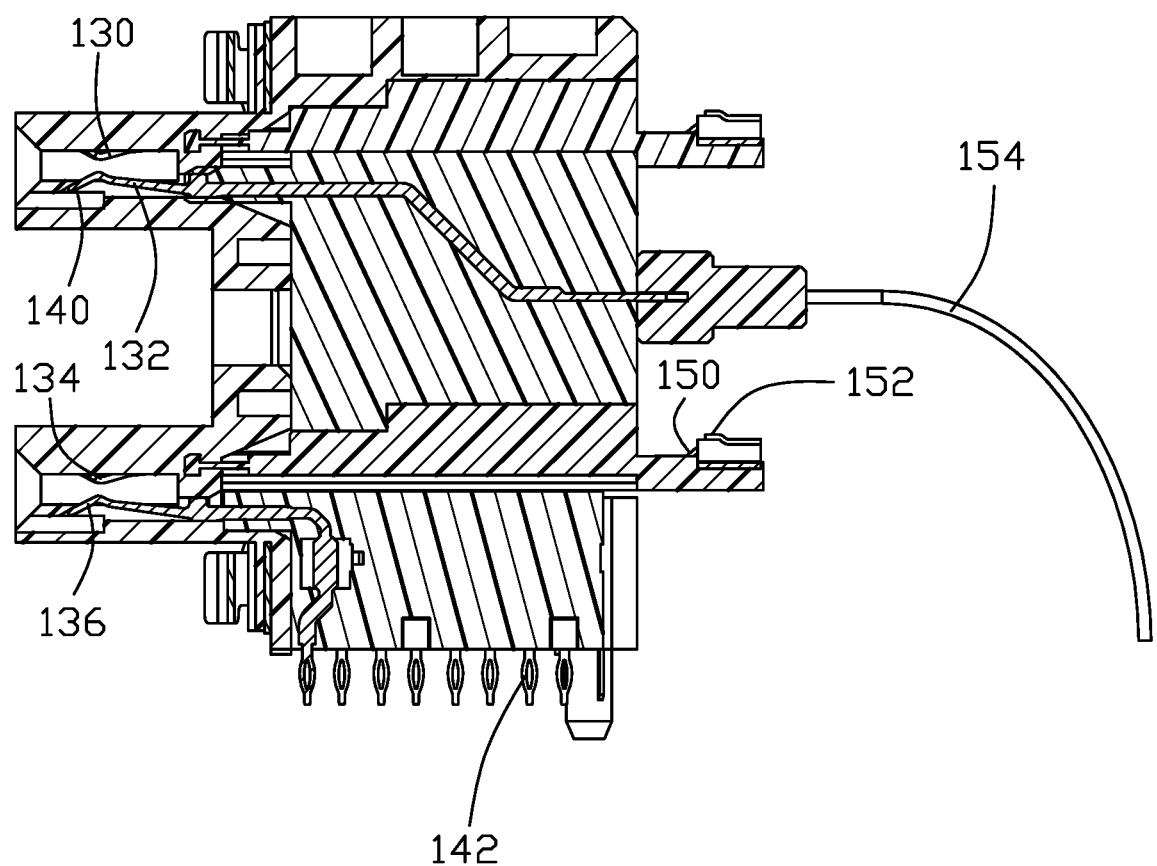
FIG. 12(B) is another cross-sectional view of the cable receptacle connector of FIG. 5(A)
Figure 12C:
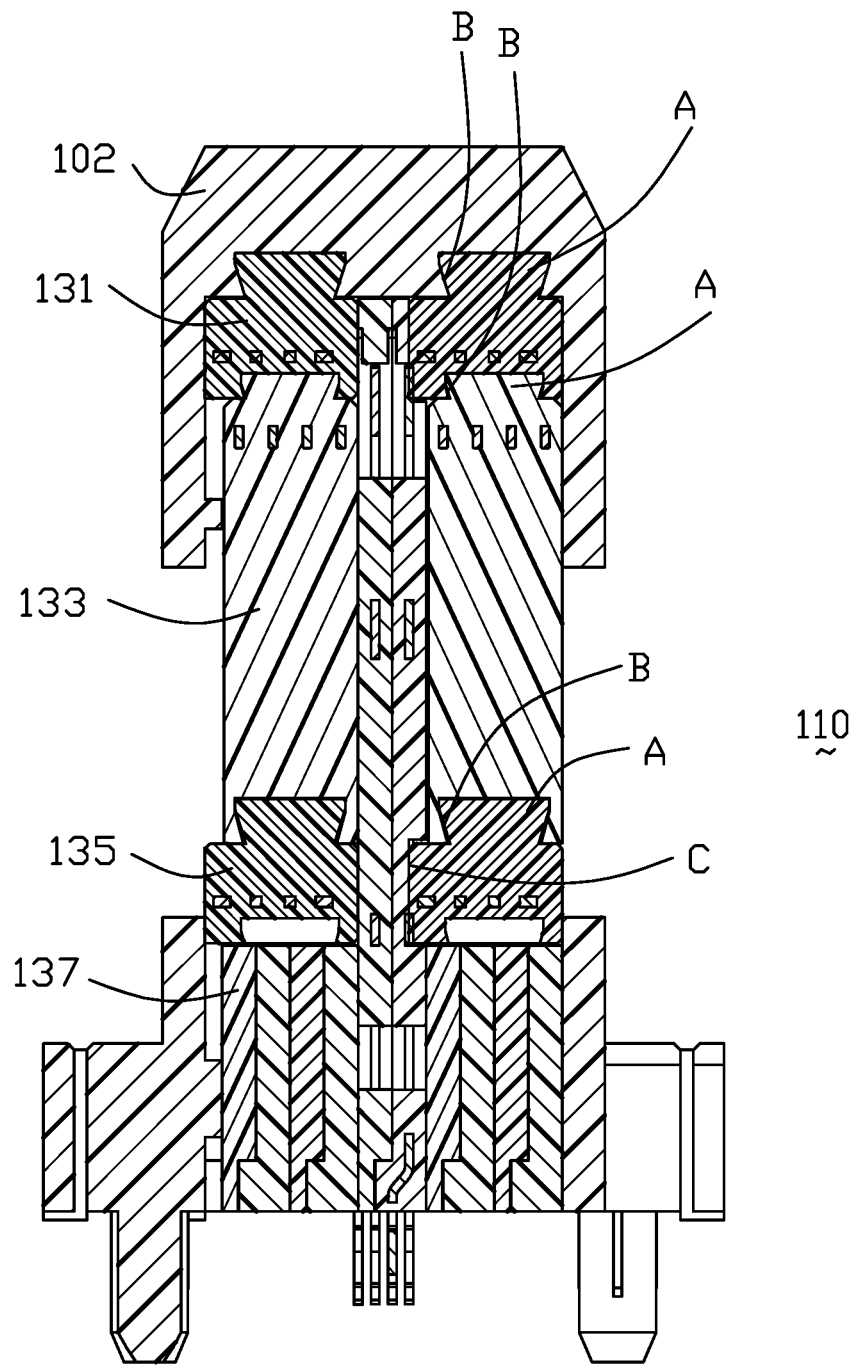
FIG. 12(C) is another cross-sectional view of the cable receptacle connector of FIG. 5(A)
Figure 13A:
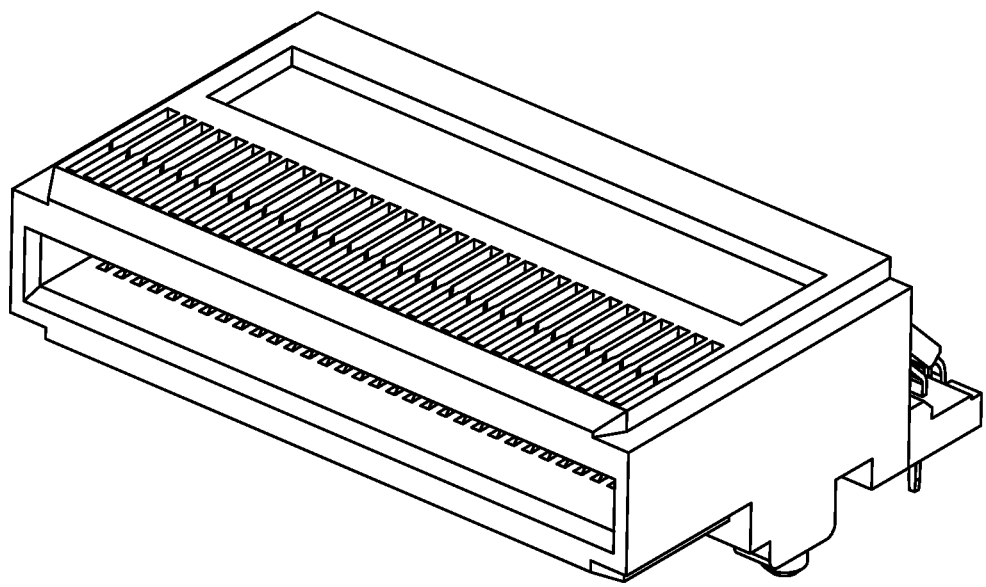
FIG. 13(A) is a perspective view of the board-mount receptacle connector of the electrical assembly of FIG. 1.
Figure 13B:
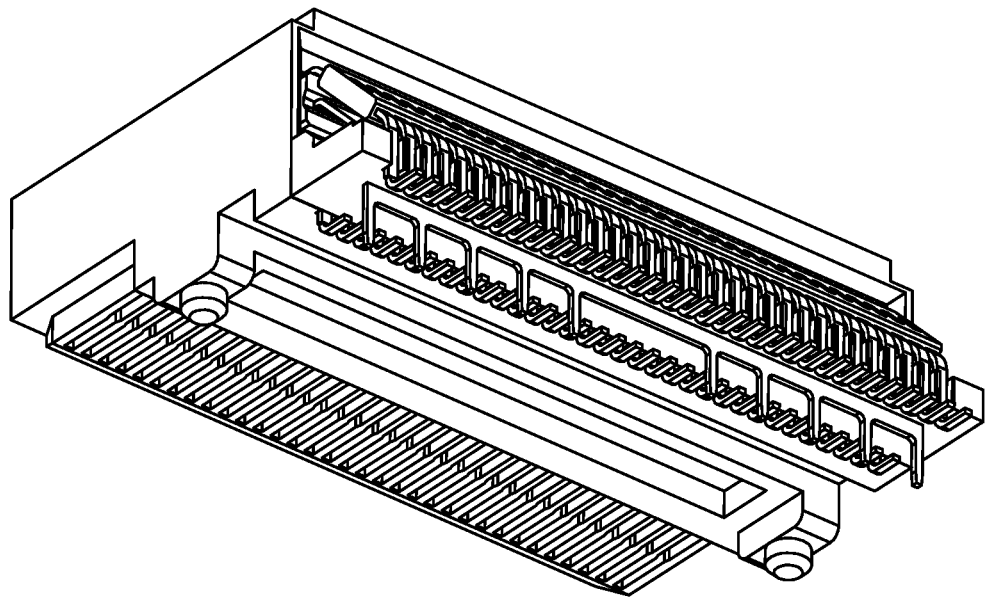
FIG. 13(B) is another perspective view of the board-mount receptacle connector of the electrical assembly of FIG. 13(A)
Figure 14A:
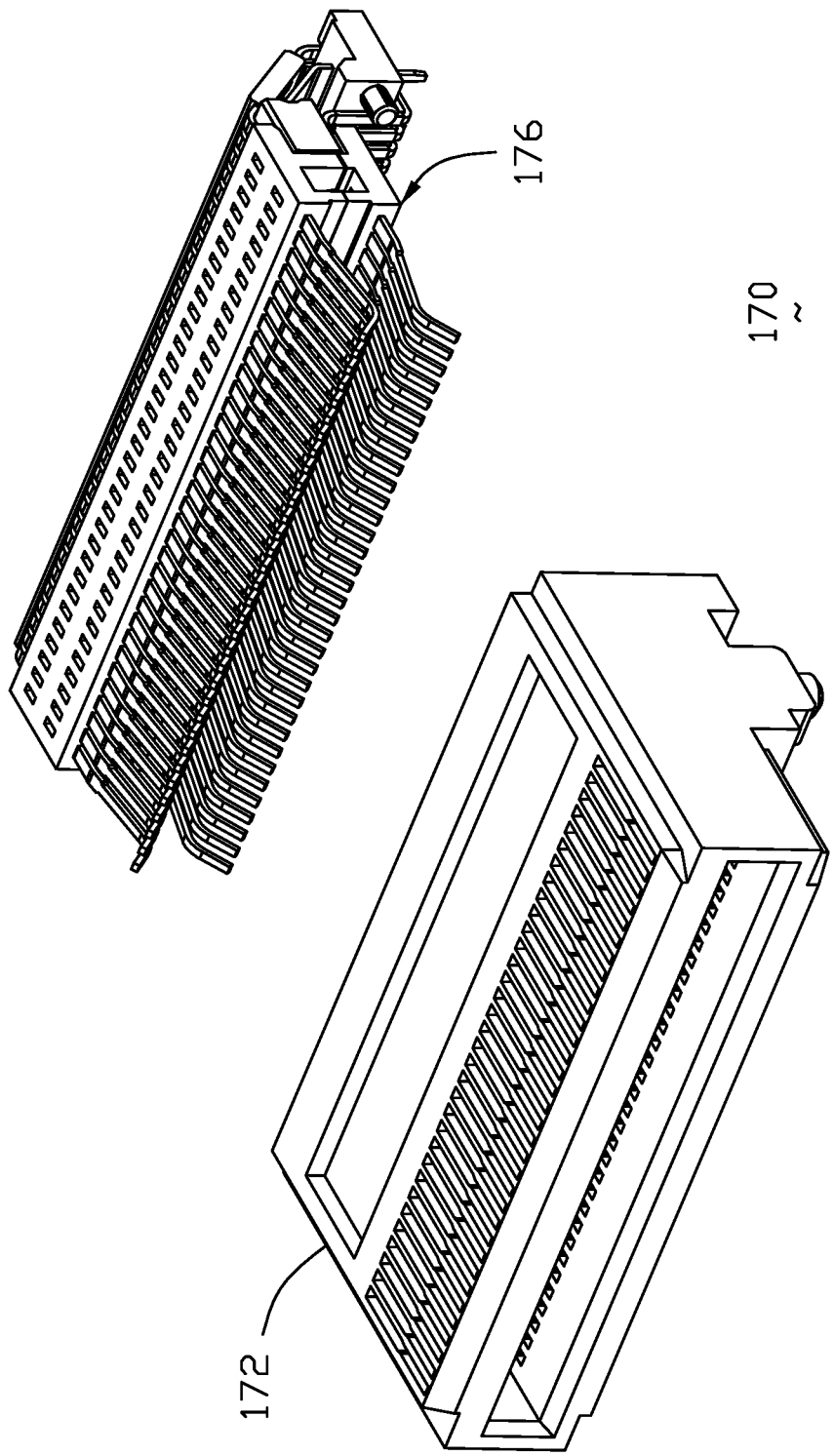
FIG. 14(A) is an exploded perspective view of the board-mount receptacle connector of FIG. 13(A)
Figure 14B:
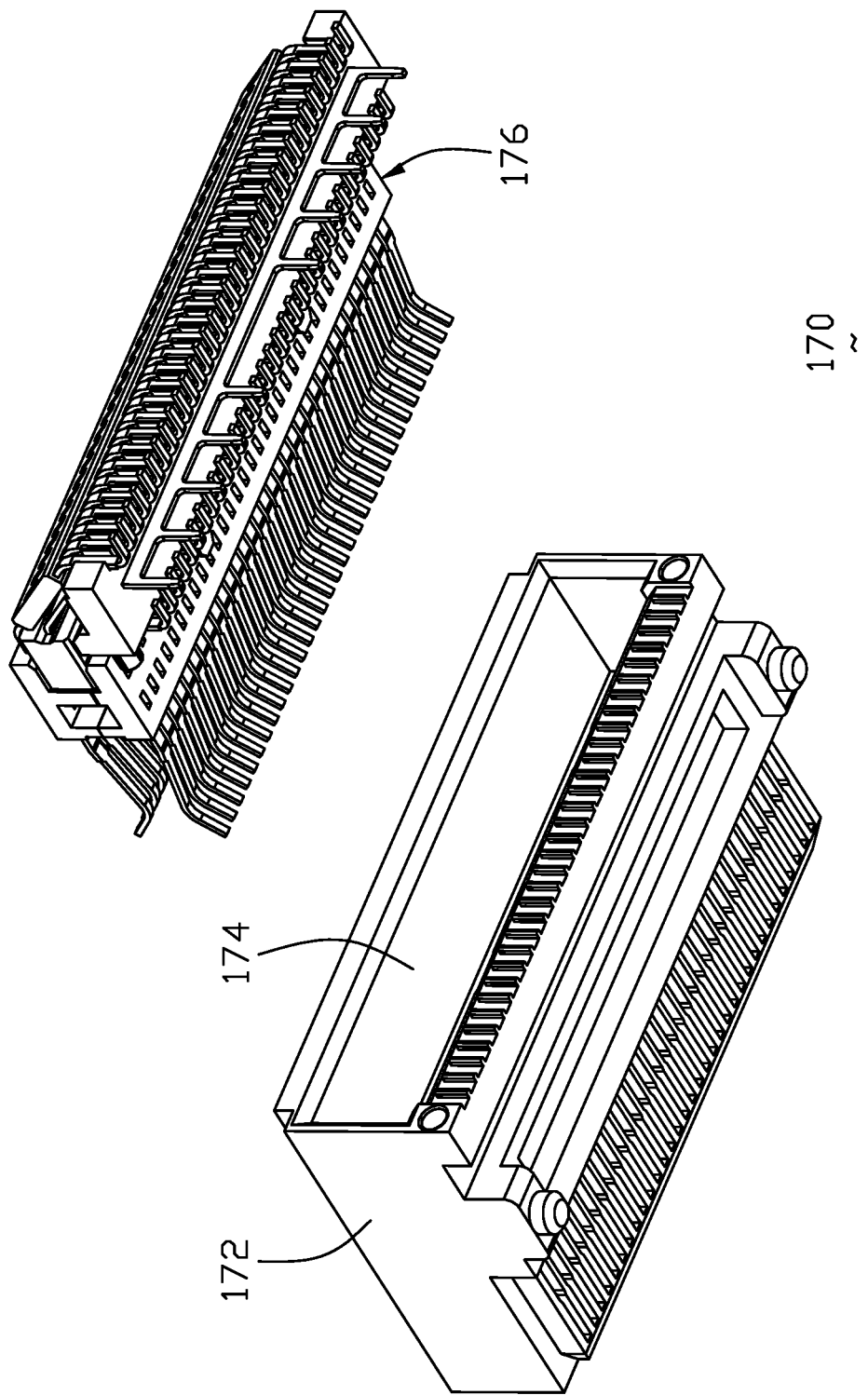
FIG. 14(B) is another exploded perspective view of the board-mount receptacle connector of FIG. 13(A)
Figure 14C:
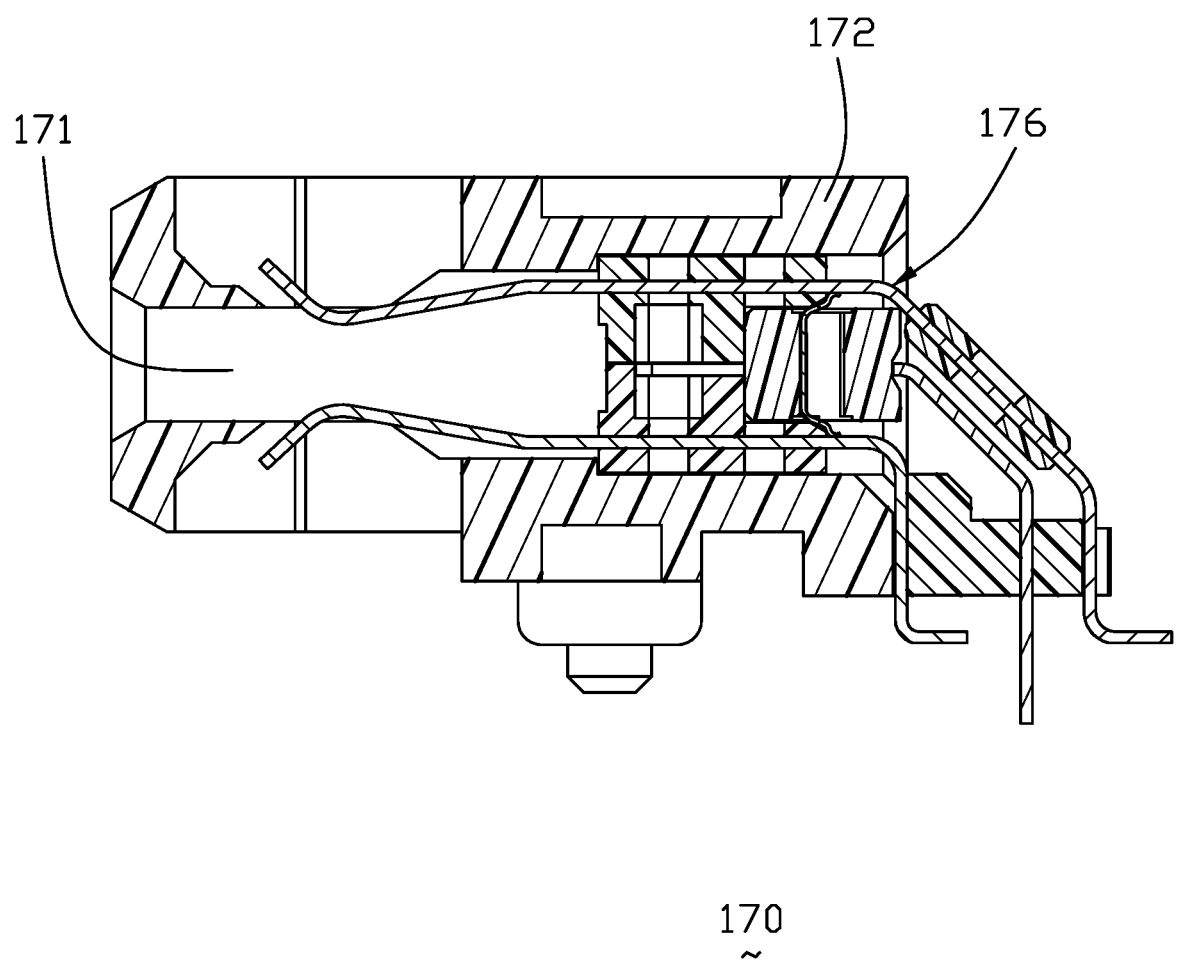
FIG. 14(C) is a cross-sectional view of the board-mount receptacle connector of FIG. 14(A)
Figure 15A:
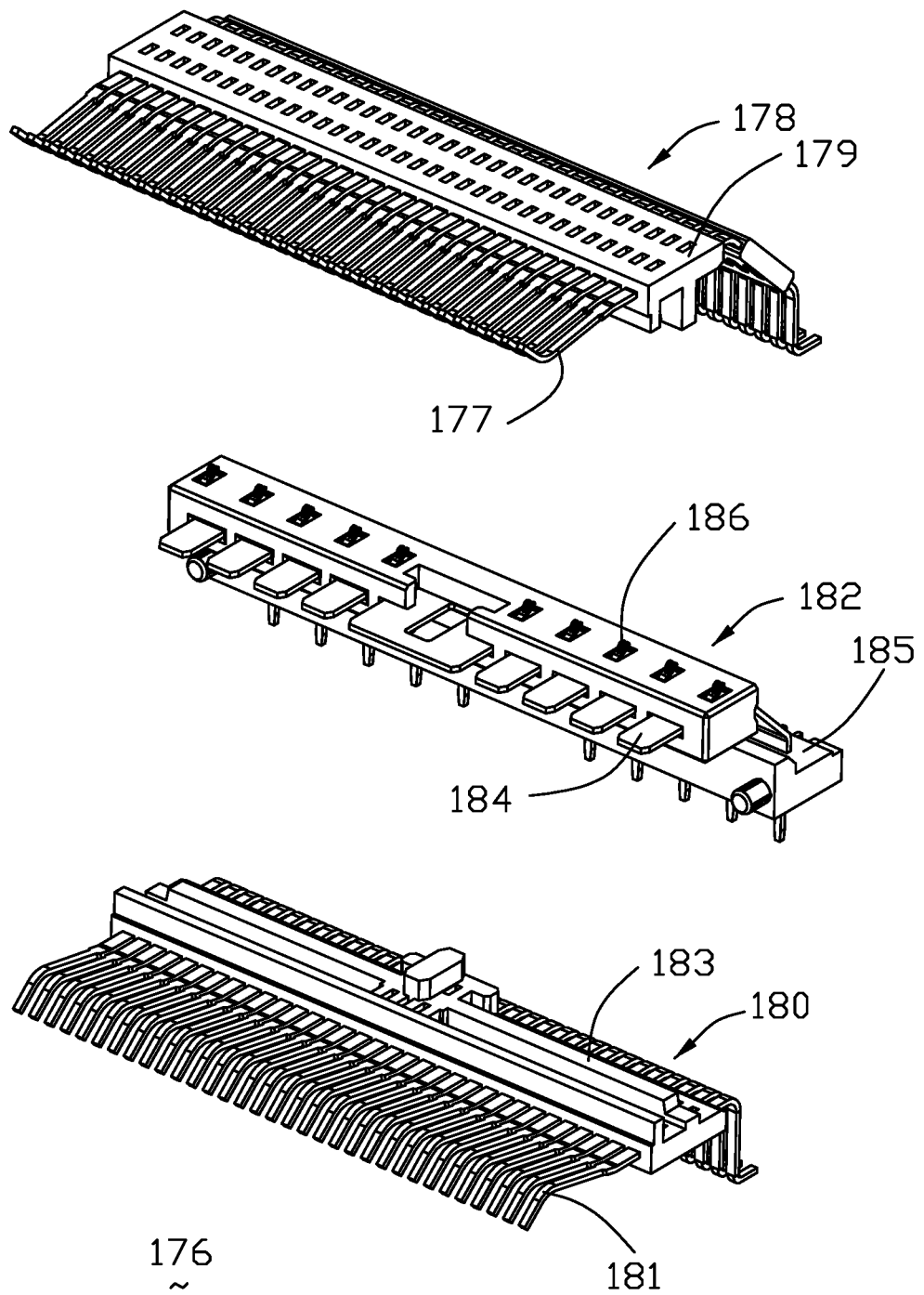
FIG. 15(A) is an exploded perspective view of the contact module subassembly of the board-mount receptacle connector of FIG. 13(A)
Figure 15B:
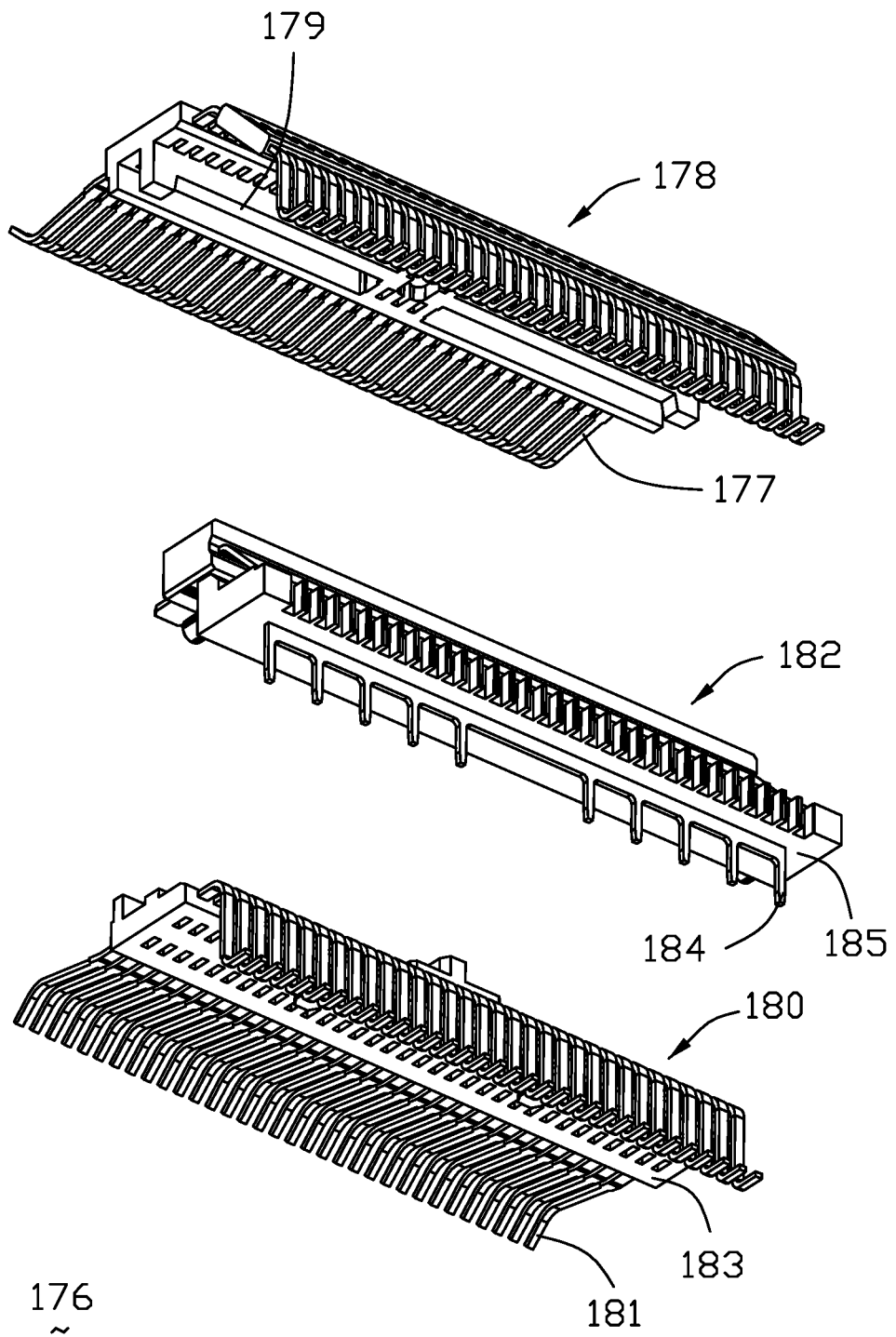
FIG. 15(B) is another exploded perspective view of the contact module subassembly of the board-mount receptacle connector of FIG. 15(A)
Figure 16A:
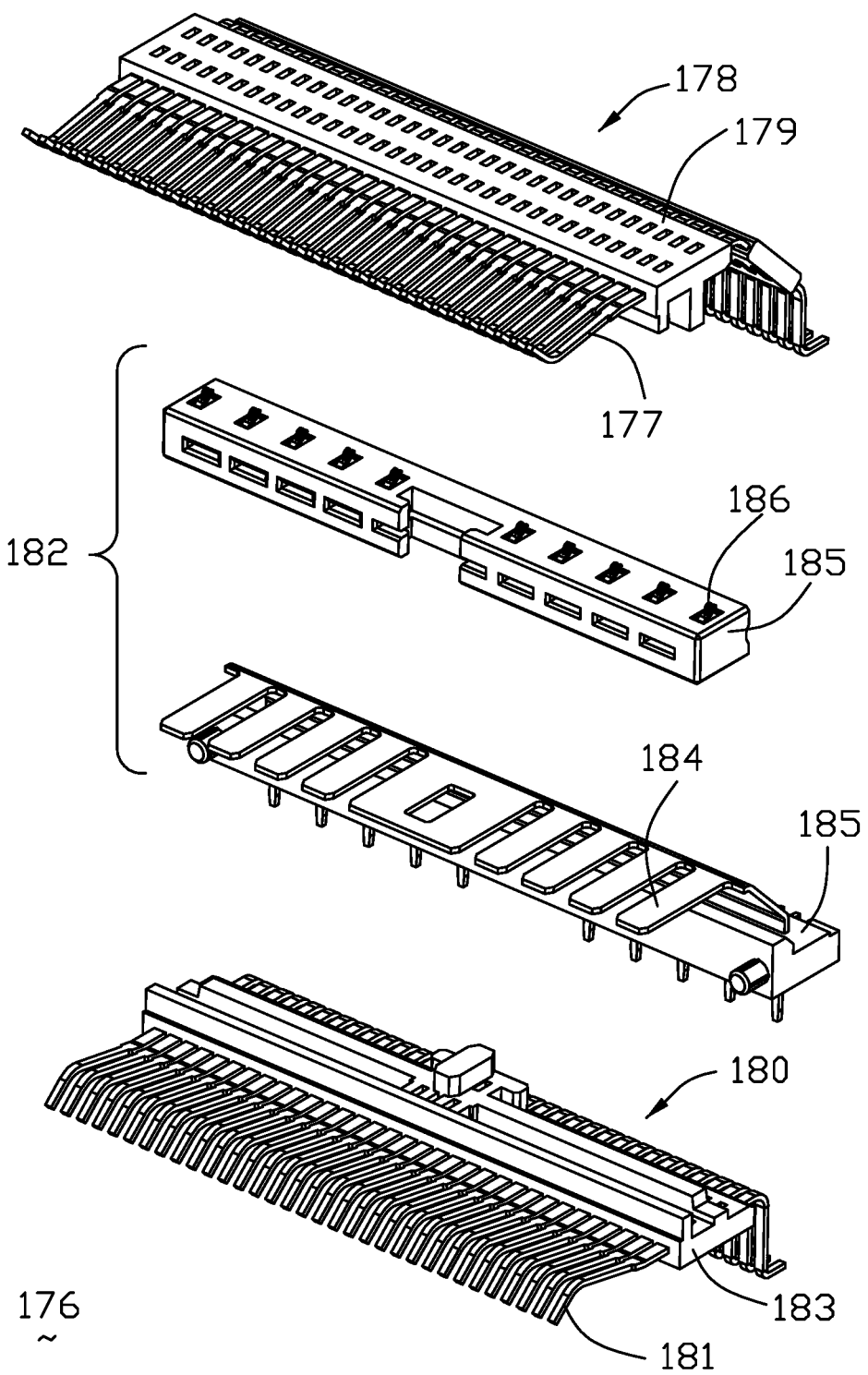
FIG. 16(A) is a further exploded perspective view of the contact module subassembly of the board-mount receptacle connector of FIG. 15(A)
Figure 16B:
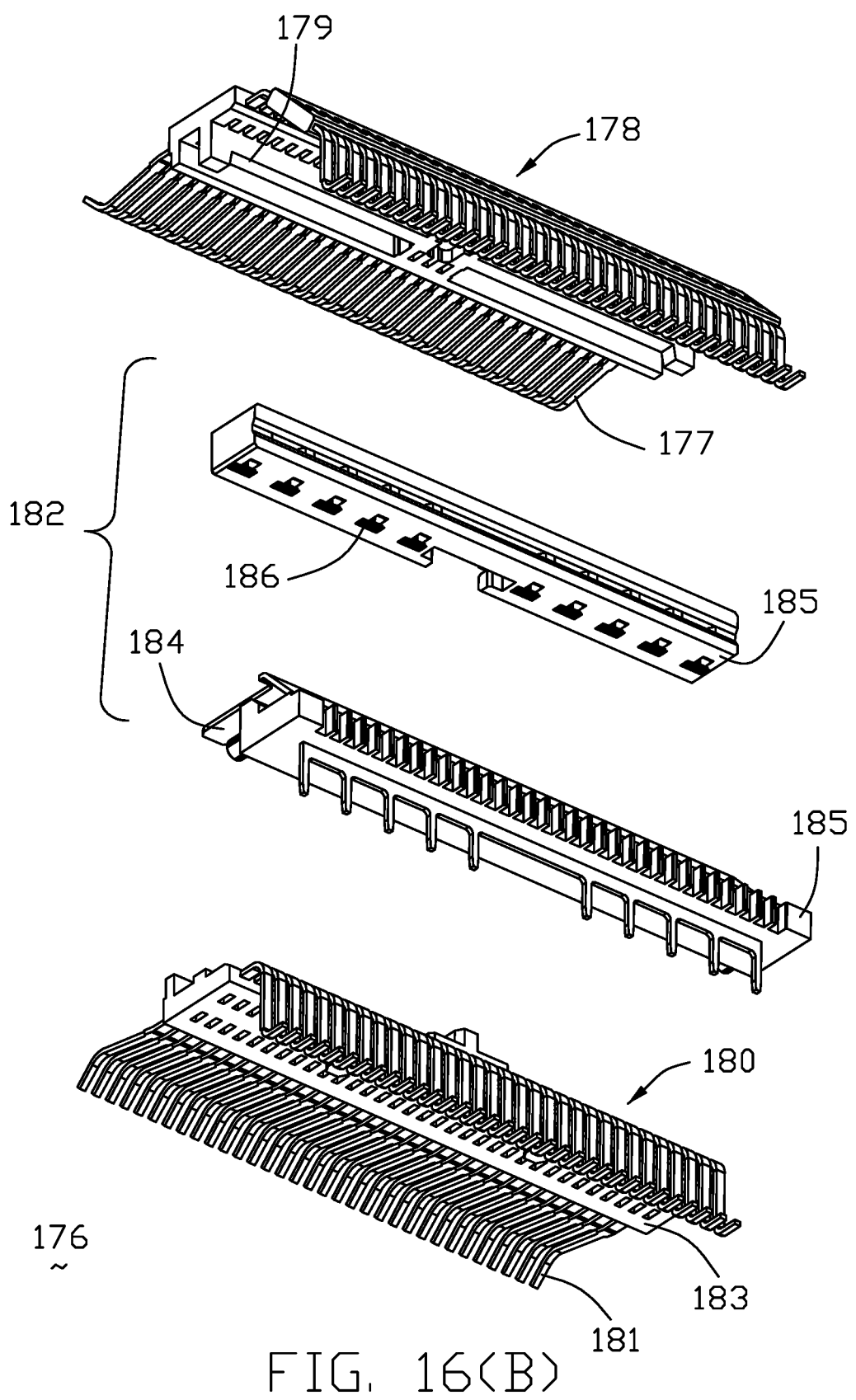
FIG. 16(B) is another further exploded perspective view of the contact module subassembly of the board-mount receptacle connector of FIG. 16(A)
Figure 17:
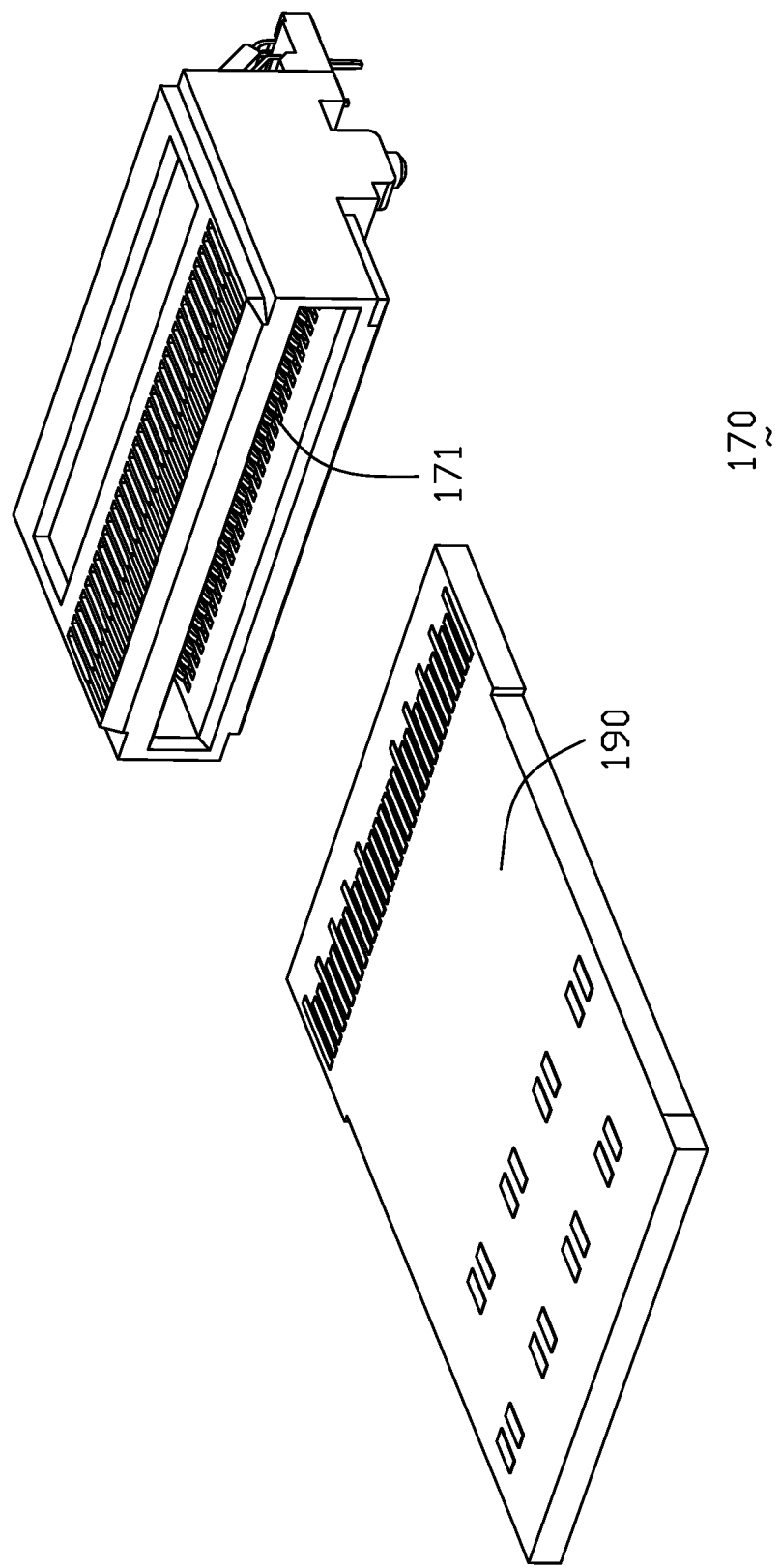
FIG. 17 is a perspective view to show how the board-mount receptacle connector of FIG. 13(A) and a mating tongue of a complementary plug of the cable adapted to be mated with each other.
Figure 18A:
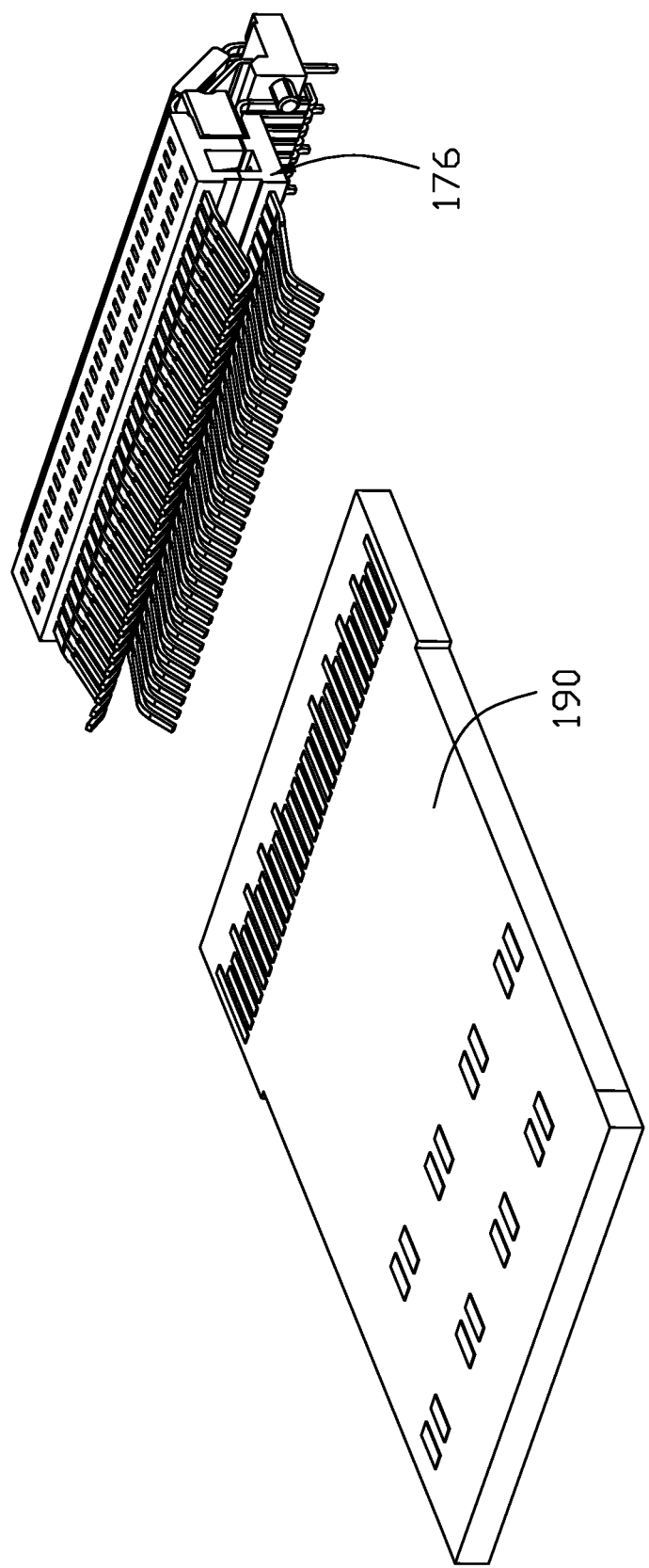
FIG. 18(A) is a perspective view to show how the contact module subassembly of the board-mount receptacle connector of 15(A) and the complementary plug of the cable of FIG. 17 adapted to be mated with each other.
Figure 19A:
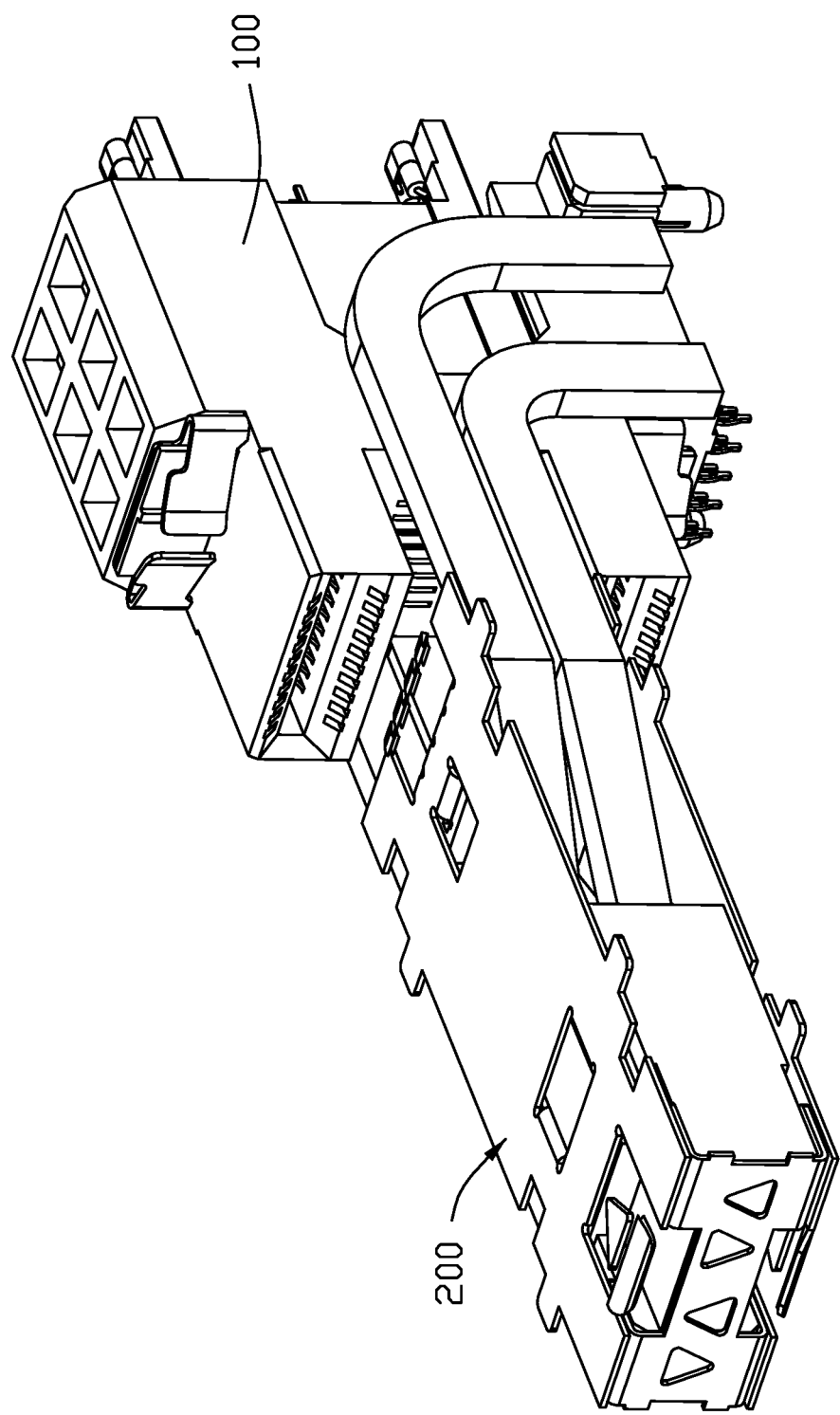
FIG. 19(A) is a perspective view of the cable receptacle connector and the associated light pipe unit of the electrical assembly of FIG. 1.
Figure 19B:
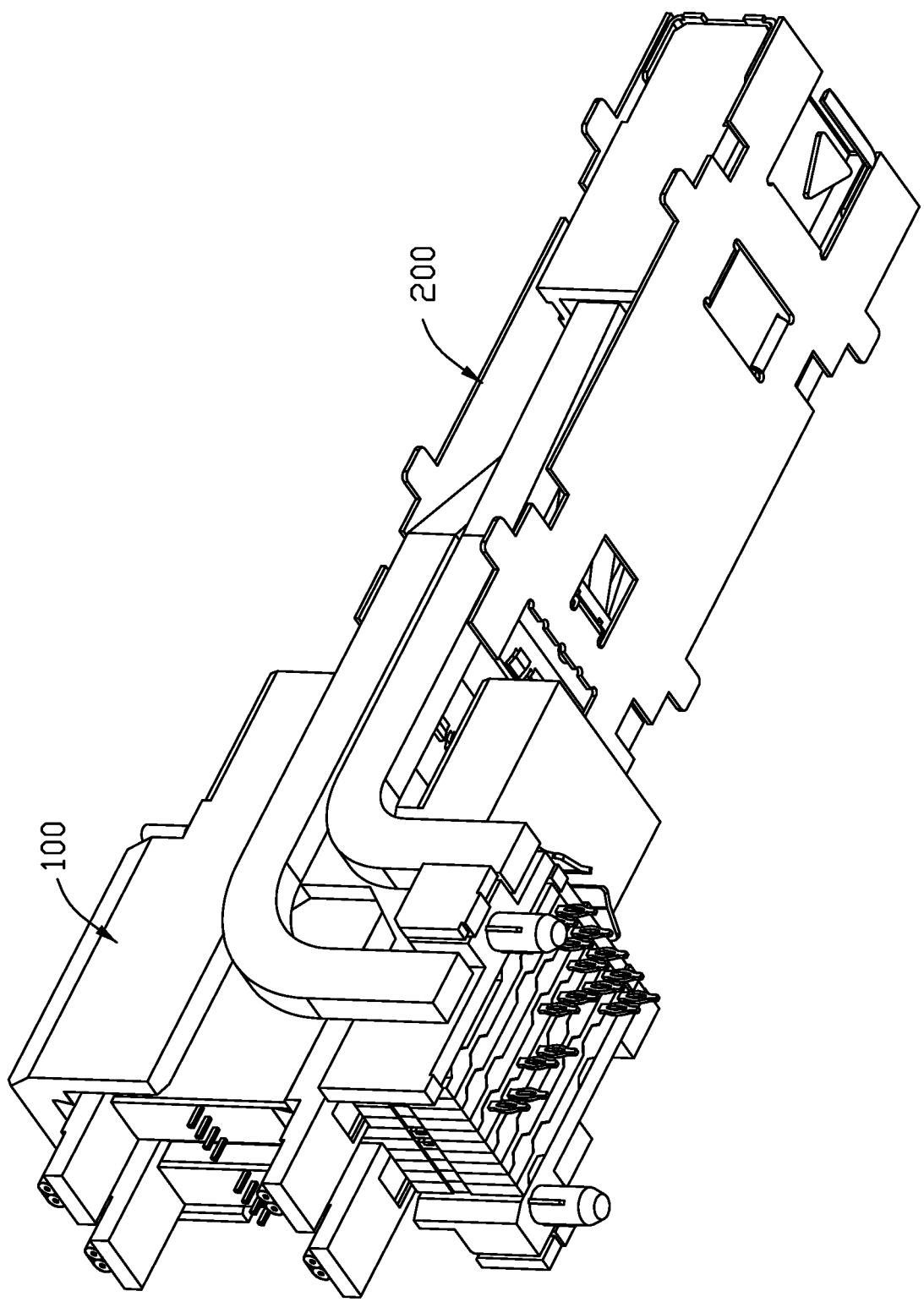
FIG. 19(B) is another perspective view of the cable receptacle connector and the associated light pipe unit of the electrical assembly of FIG. 19(A)
Figure 20A:
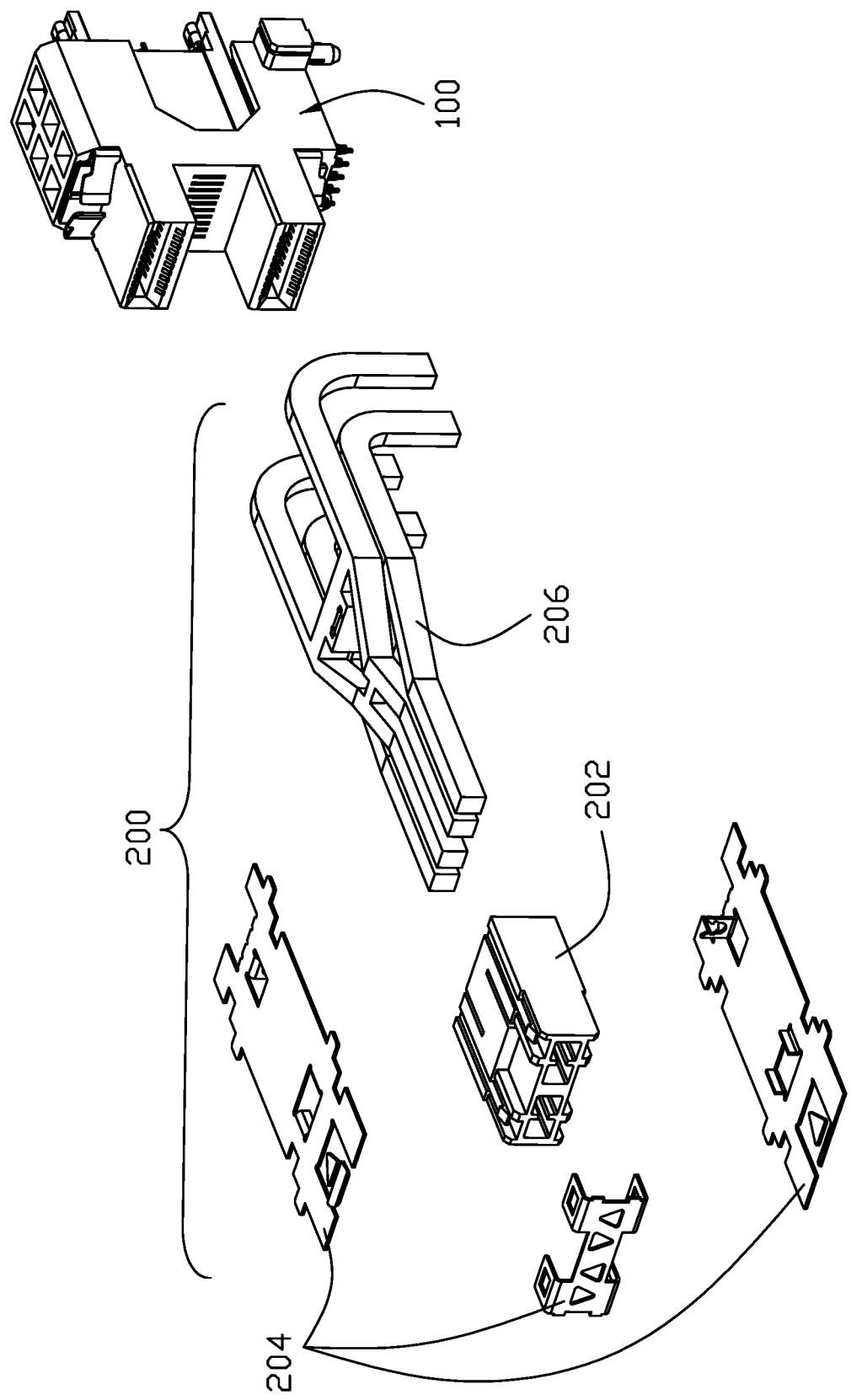
FIG. 20(A) is an exploded perspective view of the cable receptacle connector and the associated light pipe unit of the electrical assembly of FIG. 19(A)
Figure 20B:
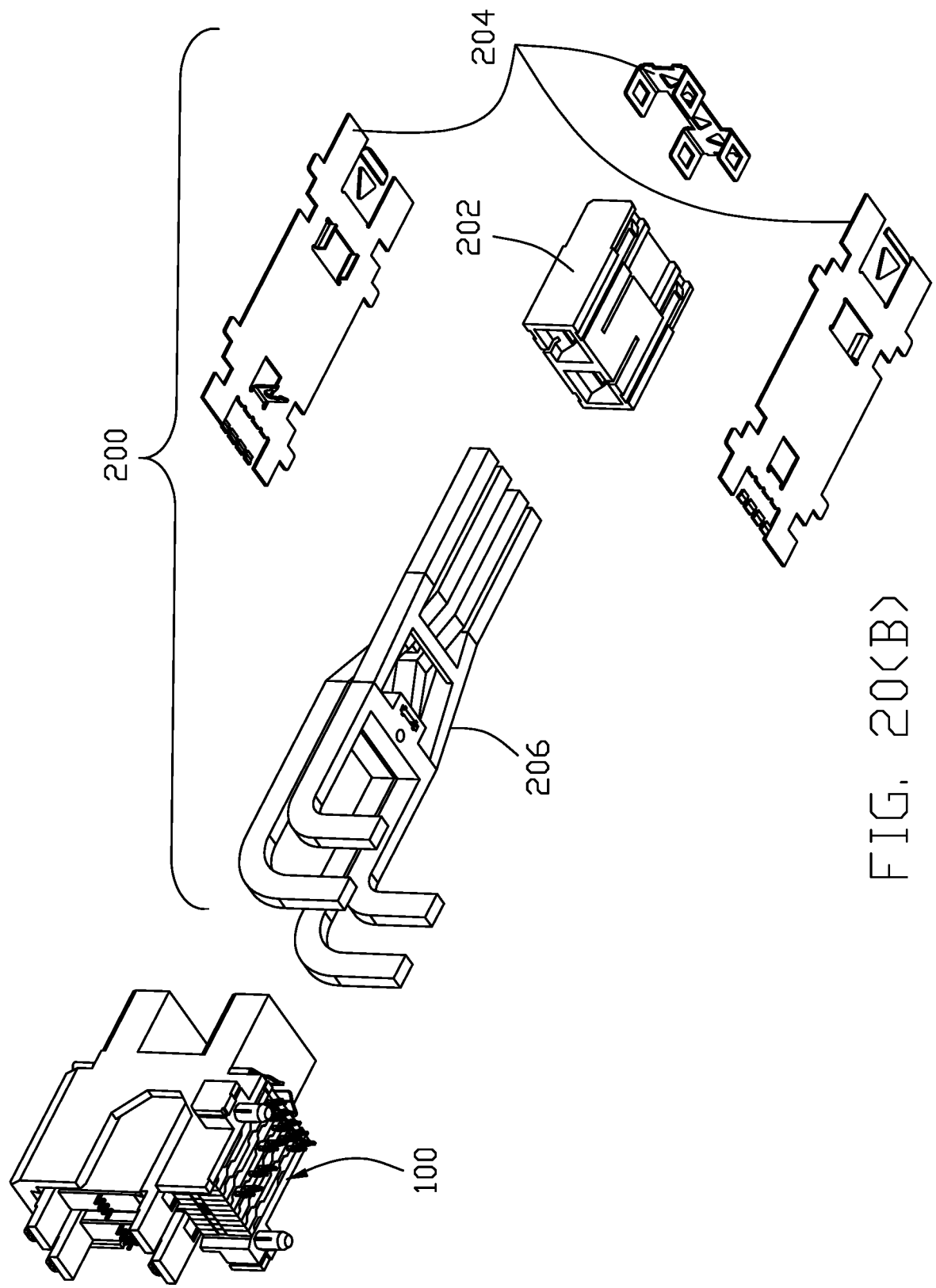
FIG. 20(B) is another exploded perspective view of the cable receptacle connector and the associated light pipe unit of the electrical assembly of FIG. 20(A)
Figure 21:
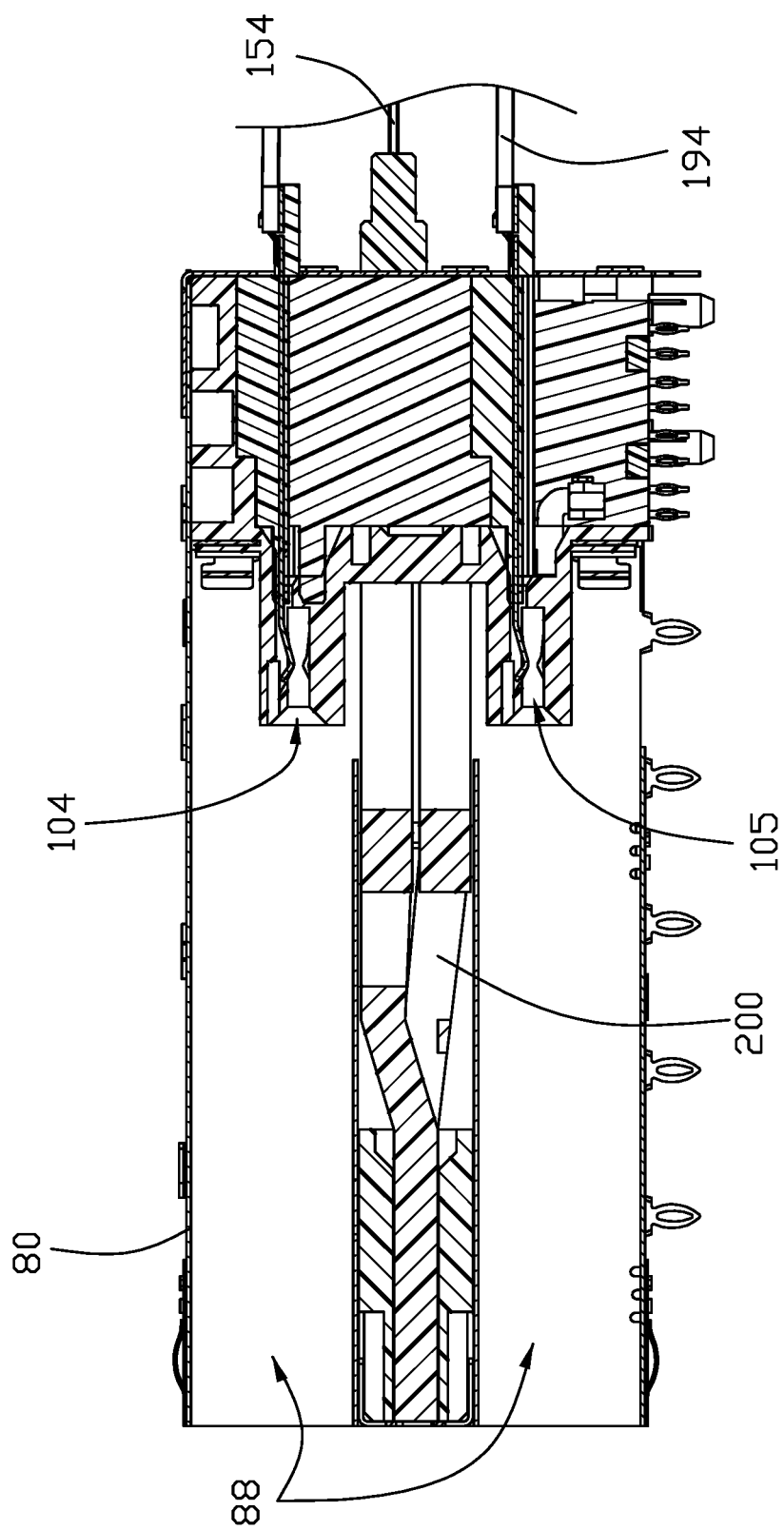
FIG. 21 is a cross-sectional view of the electrical assembly of FIG. 1.

Reference will now be made in detail to the preferred embodiment of the present invention. Referring to FIGS. 1 to 22, generally speaking an electrical assembly 10 is composed of a system side 10S and a periphery side 10P linked to each other. The periphery side 10P includes a printed circuit board 90, a metallic cage structure 80 mounted and a plurality of cable receptacle connectors 100 both mounted upon the printed circuit board 90 wherein each of the cable receptacle connectors 100 is located at a rear portion of the corresponding individual receiving space formed in the cage structure 80.

The cage structure 80 includes a U-shaped main body 81, a bottom cover 82 and a rear cover 83 assembled together. The main body 81 includes a top wall 84 and two side walls 85. A gasket 86 is attached upon a front end of the main body 81 and the bottom cover 82. A plurality of dividers 87 are assembled within a room in the assembled main body 81 and the bottom cover 82 in a parallel relation with the two side walls 85 so as to form a plurality of receiving cavities 88 in the cage structure 80 for receiving the corresponding SFP module (not shown) therein for mating with the aforementioned cable receptacle connector 100 which is located at the rear portion of each receiving cavity 88.

Each cable receptacle connector 100 includes an insulative housing 102 forming a cavity to receive a corresponding contact module 110. The housing 102 further forms a pair of forwardly protruding upper and lower mating ports 104, 105 spaced apart from each other in the vertical direction and each having a mating slot 106 therein. Understandably, because the cable receptacle connectors 100 are respectively mounted upon two opposite top and bottom surfaces of the printed circuit board 90 in a mirror image manner, the upper mating port 104 may be named as the far port, and the lower mating port 105 may be named as the near port based upon their positional relations with regard to the printed circuit board 90 in the vertical direction. The contact module 110 includes two opposite side modules subassembly 112 commonly sandwiching a center module subassembly 114 in the transverse direction. Each of the side modules subassembly 112 includes a first unit 116, a second unit 118, a third unit 120 and a fourth unit 122 stacked with one another in sequence from top to bottom in a vertical direction wherein the first unit 116 includes four top/first contacts 130 integrally formed within a first insulator 131 for forwardly extending into a top part of the upper mating port 104, the second unit 118 includes four bottom/second contacts 132 integrally formed within a second insulator 133 for forwardly extending into a bottom part of the upper mating port 104, the third unit 120 includes four top/third contacts 134 integrally formed within a third insulator 135 for forwardly extending into a top port of the lower mating port 105, and the fourth unit 122 includes four bottom/fourth contacts 136 integrally formed within a fourth insulator 137 for forwardly extending into a bottom part of the lower mating port 105. Understandably, because the cable receptacle connectors 100 are respectively mounted upon the top and bottom surfaces of the printed circuit board 90 in a mirror image manner, the first contacts 130 and the third contacts 134 may be named as the far row of contacts while the second contacts 132 and the fourth contacts 136 may be named as the near row of contacts by consideration of their positional relation with regard to the printed circuit board 90 in the vertical direction. Notably, in this embodiment, the fourth insulator 137 includes four subparts each integrally formed with the corresponding bottom contact 136 while such subparts have recesses and protrusions (not labeled) so as to compactly stacked with one another in the transverse direction perpendicular to the vertical direction so as to assure no relative movement between the two neighboring subparts in a front-to-back direction perpendicular to both the vertical direction and the transverse direction.

Along the front-to-back direction, each of such top/first, third contacts 130, 134 and such bottom/second, fourth contacts 132, 136 has a front contacting section 140 extending forwardly into the corresponding upper mating port 104 and lower mating port 105, and a rear connecting section 142 wherein for the top contacts 130 and 134, the rear connecting sections 142 of the center two contact 130, 134 functioning as a differential pair, are connected to the corresponding two wires 150 for high speed signal transmission for flying over toward a main board 70 on which the CPU socket is mounted, while those of the outer two contacts 130, 134 are connected to a grounding plane G where the drain wire 152 of the differential pair wires 150 is mechanically and electrically connected. The rear connecting sections 142 of the bottom/second contacts 132 extend rearwardly to be mechanically and electrically connected to a low speed cable 154 which is mounted to the printed circuit board 90. The bottom/fourth contacts 136 are characterized same with the bottom/second contacts 132 to be the low speed or sideband contacts, having corresponding rear connecting sections 142 directly mounted to the printed circuit board 90. The main board 70 and the printed circuit board 90 may be formed from two different printed circuit boards, or be formed from two different portions of an one piece of printed circuit board.

The central module subassembly 114 includes two wafers stacked with each other in the transverse direction each including four contacts 160 integrally formed within an insulator 162 wherein the four contacts 160 includes two VCC contacts and two low speed/sideband contact for mounting to the printed circuit board 90.

Notably, the first insulator 131 includes a tenon A to be received within a mortise B in the housing 102 for securing therebetween, the second insulator 133 includes a tenon A to be received within a mortise B in the first insulator 131, the third insulator 135 includes a tenon A to be received within mortise B in the second insulator 133, and the fourth insulator 137 has a tenon to be received within a mortise in the third insulator 135. With this arrangement, the side module subassembly 112 can be assembled together and further commonly assembled to the housing 102. The center module subassembly 114 also includes tenon A to be received within the corresponding mortise B in the housing 12. The side module subassembly further includes sideward protrusion C to be engaged within corresponding recess in the center module subassembly 114 so as to assure no relative movement between the side module subassembly 112 and the center module subassembly 114 along the vertical direction.

Correspondingly, a pair of board-mount receptacle 170 are mounted upon the main board 70. As disclosed in the previous provisional application, each of the board-mount receptacle connector 170 has an insulating housing 172 with a receiving space 174 to receive a terminal module 176 therein. The terminal module 176 includes an upper terminal unit 178 and a lower terminal unit 180 to commonly sandwich a middle grounding unit 182 therebetween wherein the upper terminal unit 178 includes a plurality of upper terminals 177 integrally formed with an upper insulator 179, the lower terminal unit 180 includes a plurality of lower terminals 181 integrally formed with a lower insulator 183, and the middle grounding unit 182 includes a grounding plate 184 integrally forms with a middle insulator 185 and electrically connected to the corresponding grounding terminals of the upper terminals 177 and those of the lower terminals 177 via spring pieces 186. The upper terminals 177 and the lower terminals 181 have corresponding contacting sections extending into the mating slot 171 in the housing 172 for mating with a mating tongue 190 of a corresponding cable connector 192 which integrates the differential pair wires 150 of all cable receptacle connectors 100 on the corresponding half side in the cage 80. Therefore, the high speed signals may be transmitted from the cable receptacle connector 100 directly to the board-mounted receptacle connector 170 via the cable 194 of the cable connector 194, which is essentially composed of a plurality of differential pair wires connected to the corresponding cable receptacle connector 100.

Figure 23A:
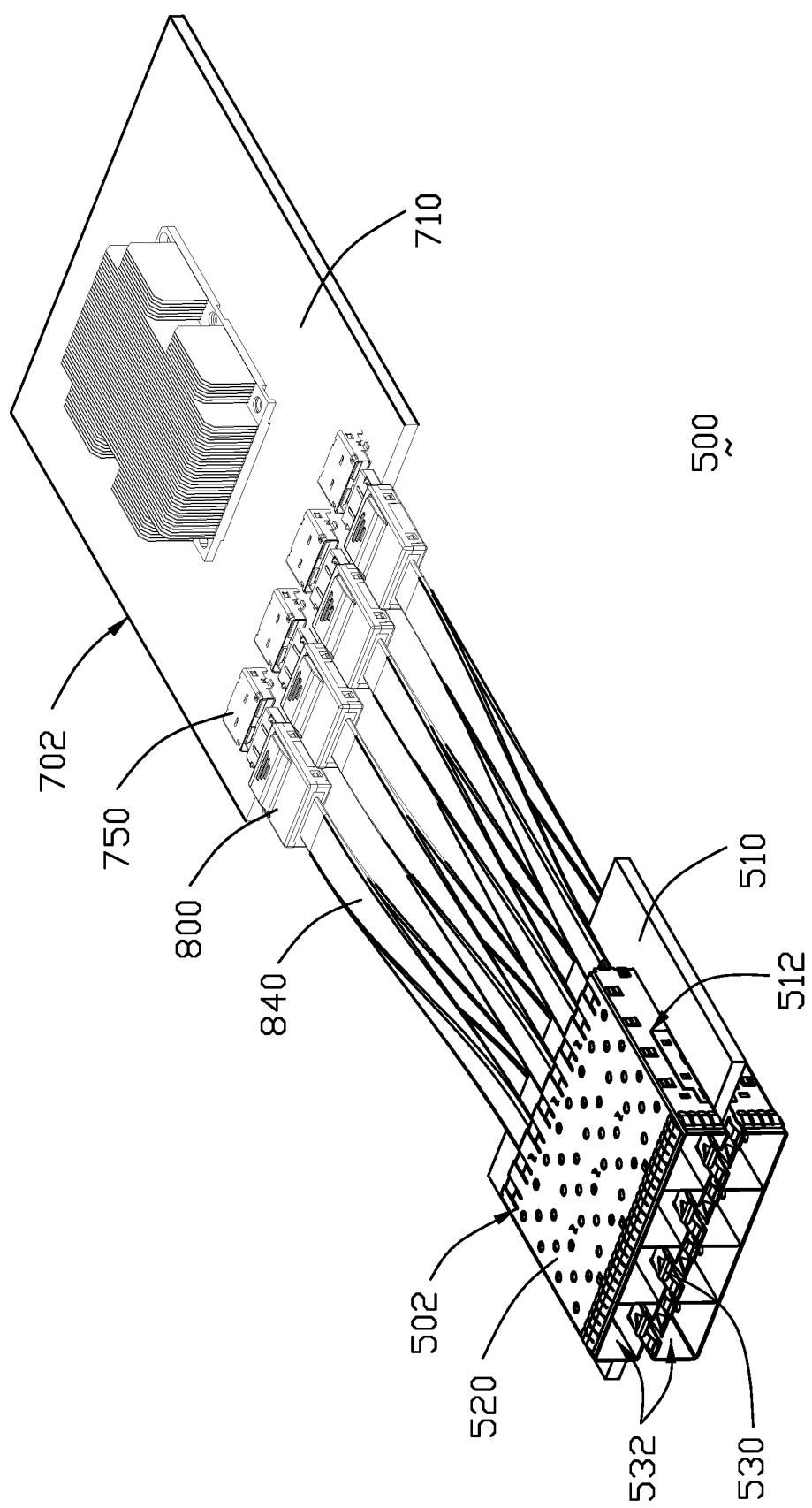
FIG. 23(A) is a perspective view of an electrical assembly according to another embodiment of the invention.
Figure 23B:
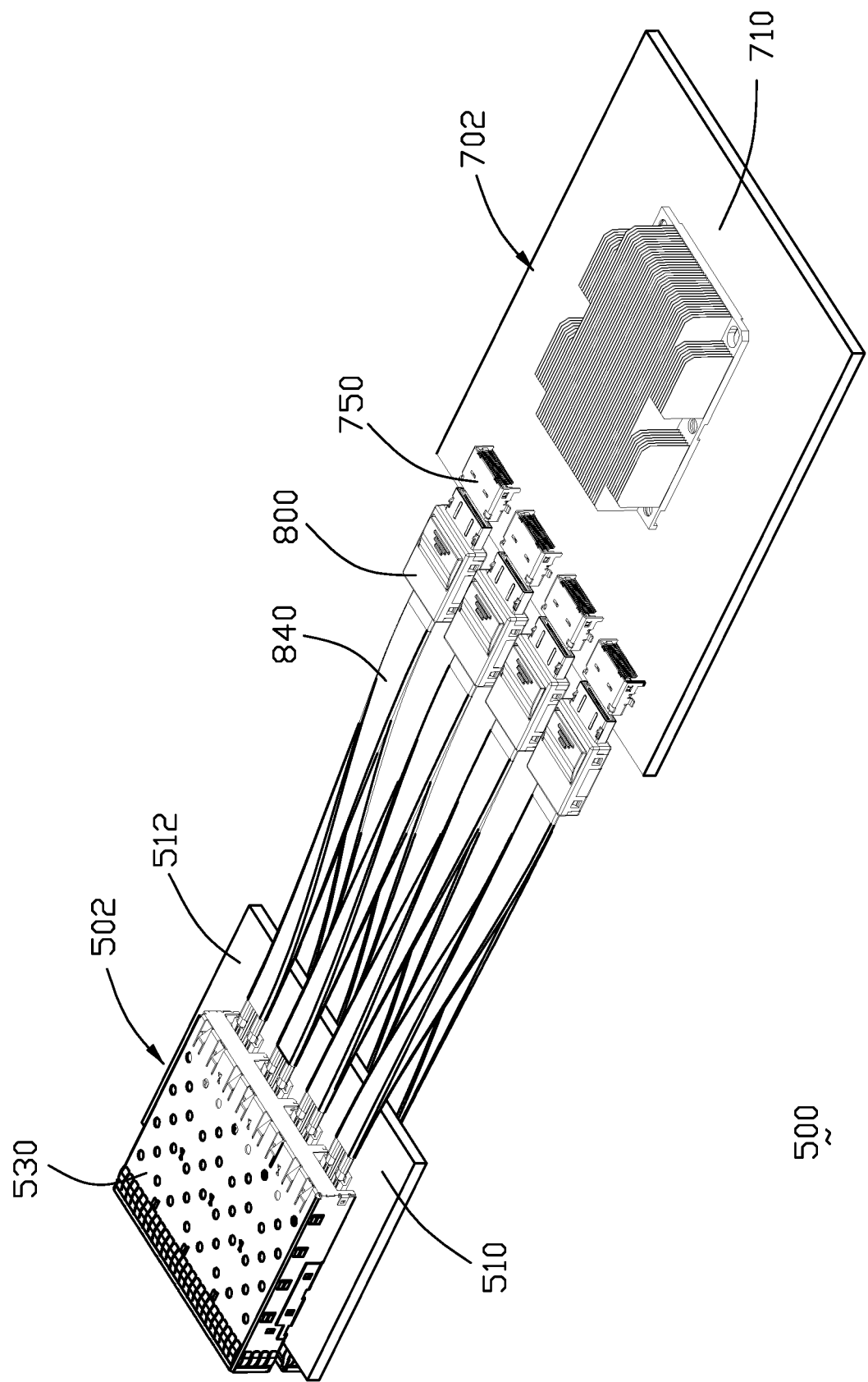
FIG. 23(B) is another perspective view of the electrical assembly of FIG. 23(A)
Figure 23C:
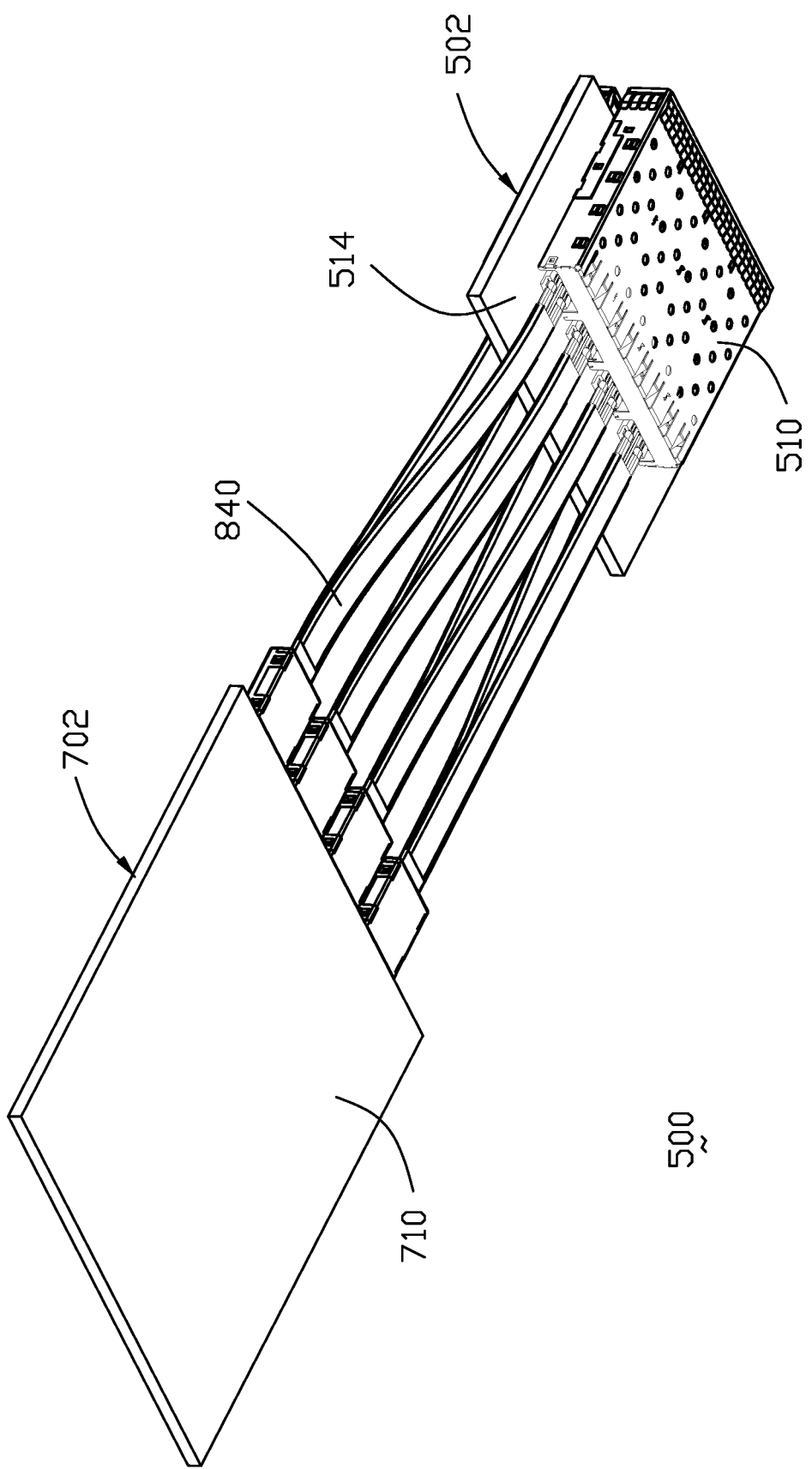
FIG. 23(C) is another perspective view of the electrical assembly of FIG. 23(A)
Figure 24A:
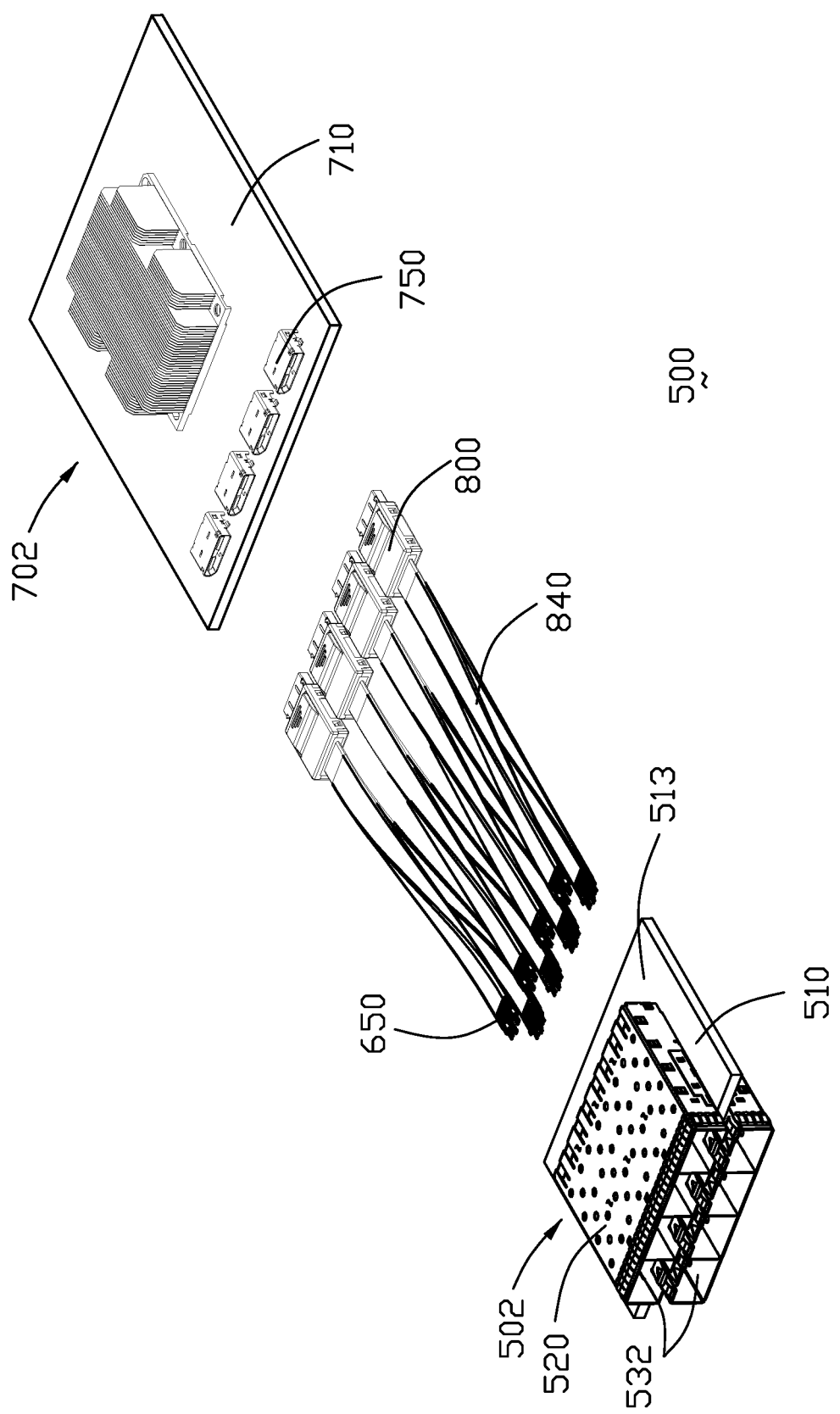
FIG. 24(A) is an exploded perspective view of the electrical assembly of FIG. 23(A)
Figure 24B:
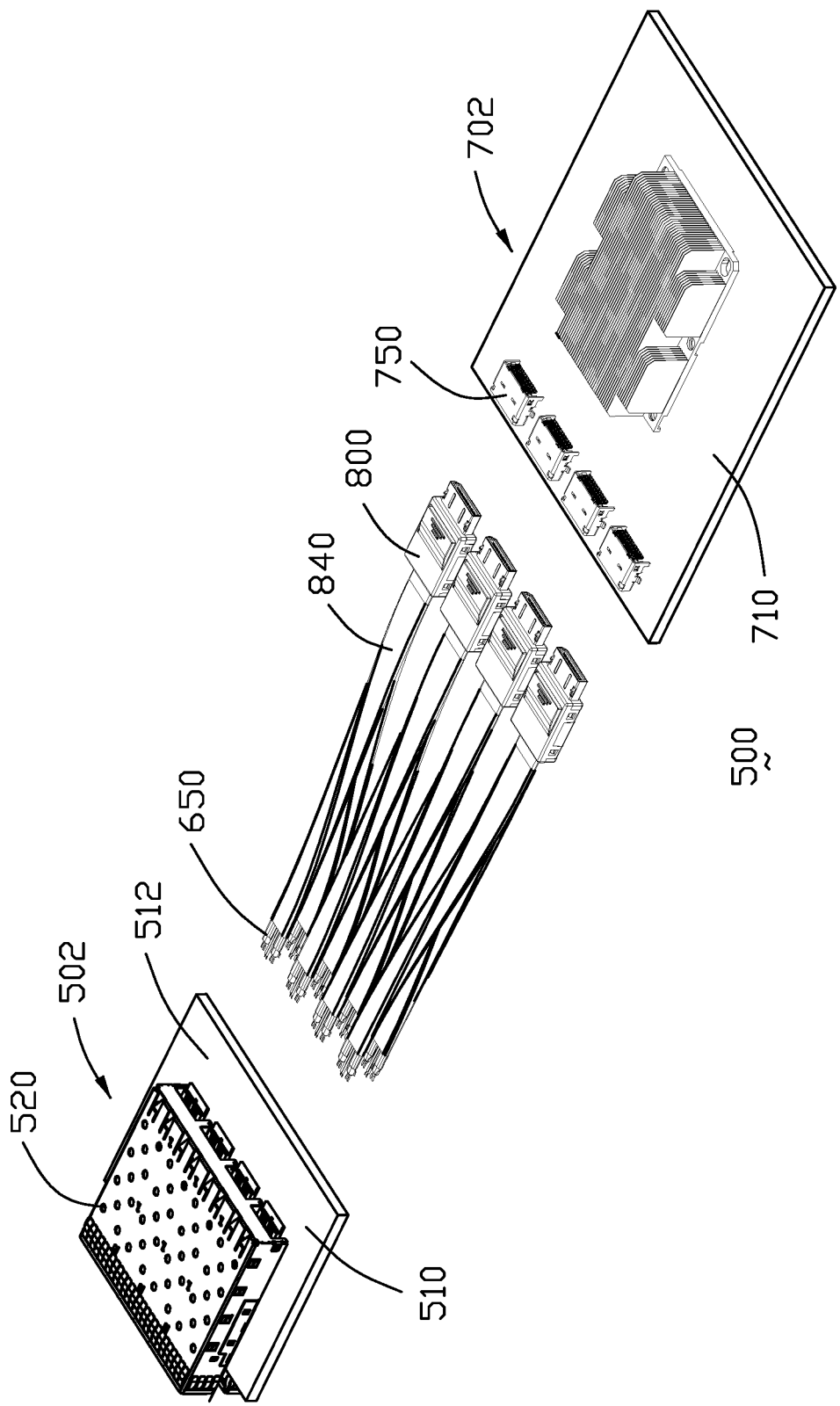
FIG. 24(B) is another exploded perspective view of the electrical assembly of FIG. 24(A)
Figure 24C:
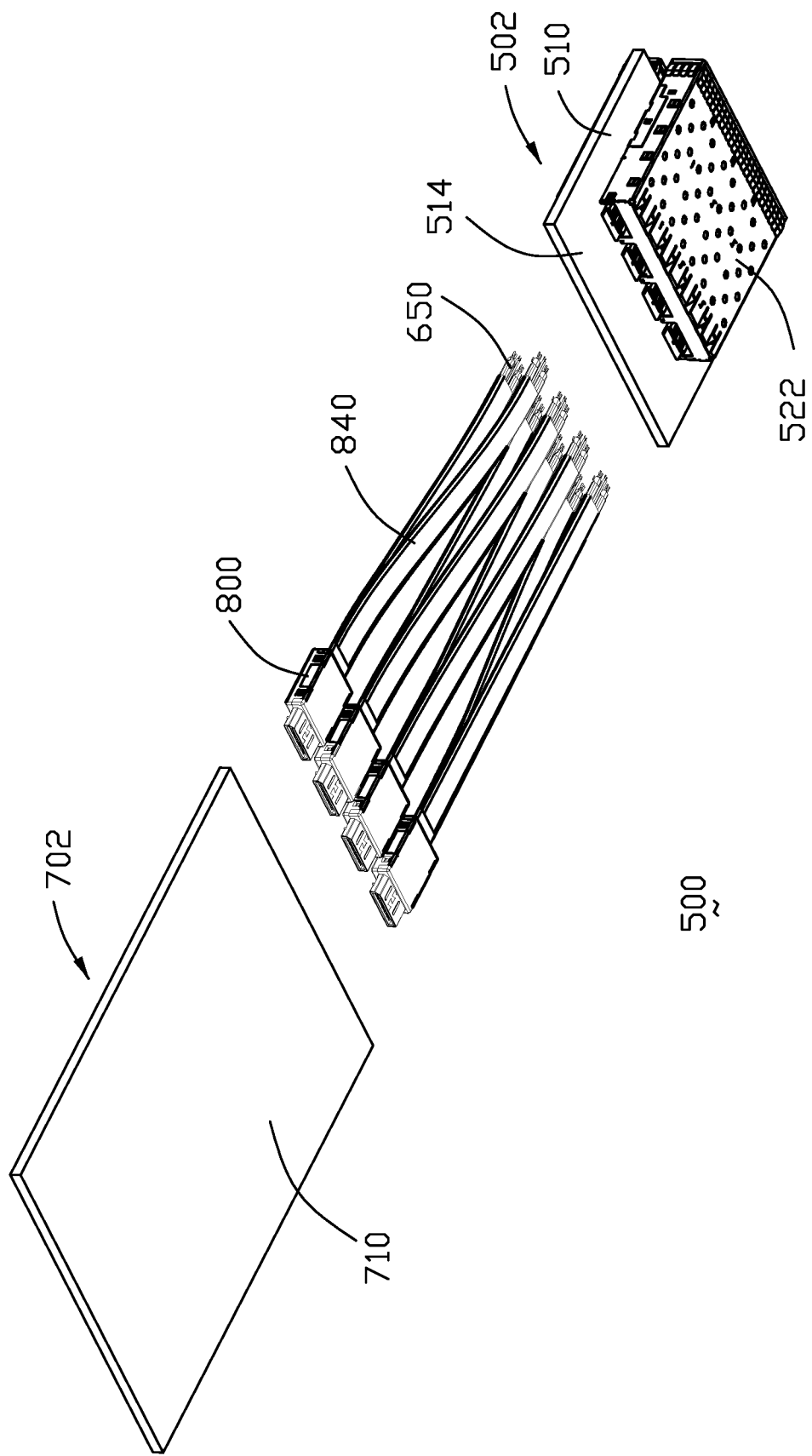
FIG. 24(C) is another exploded perspective view of the electrical assembly of FIG. 24(A)
Figure 25:
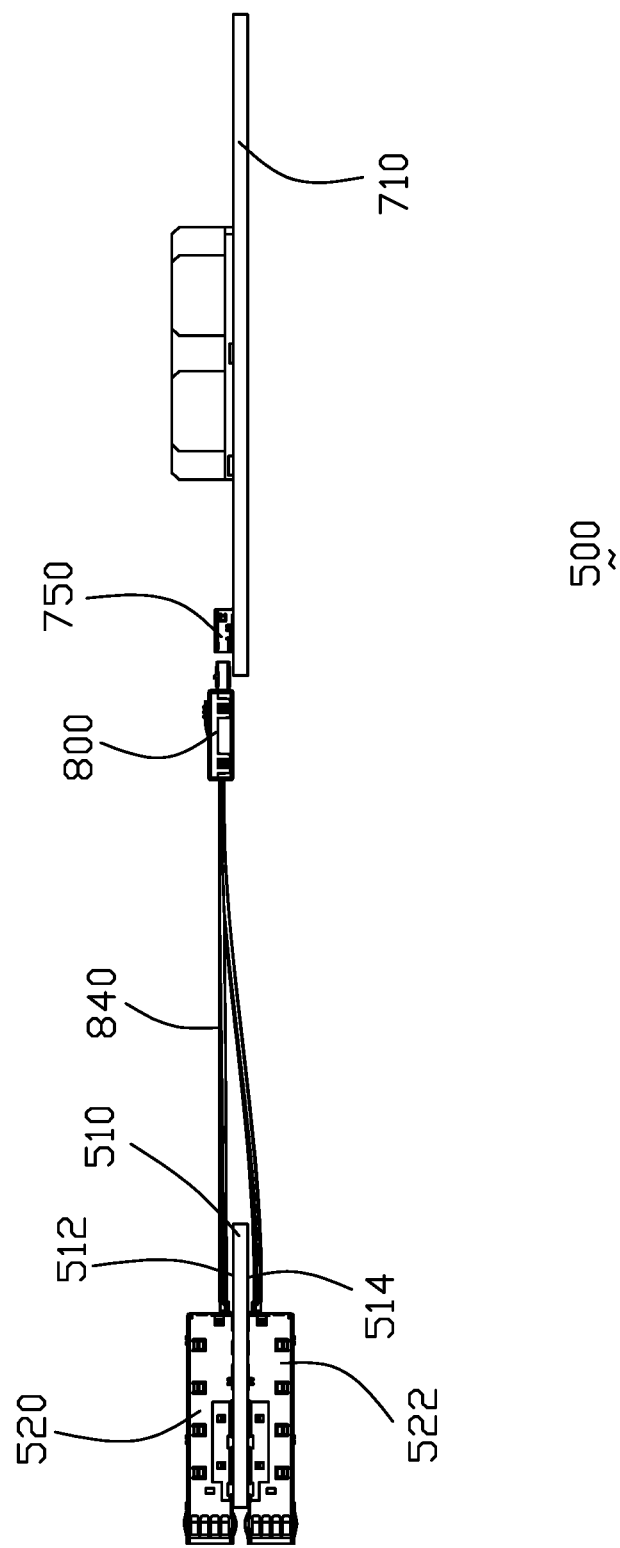
FIG. 25 is a side view of the electrical assembly of FIG. 23(A)
Figure 26:
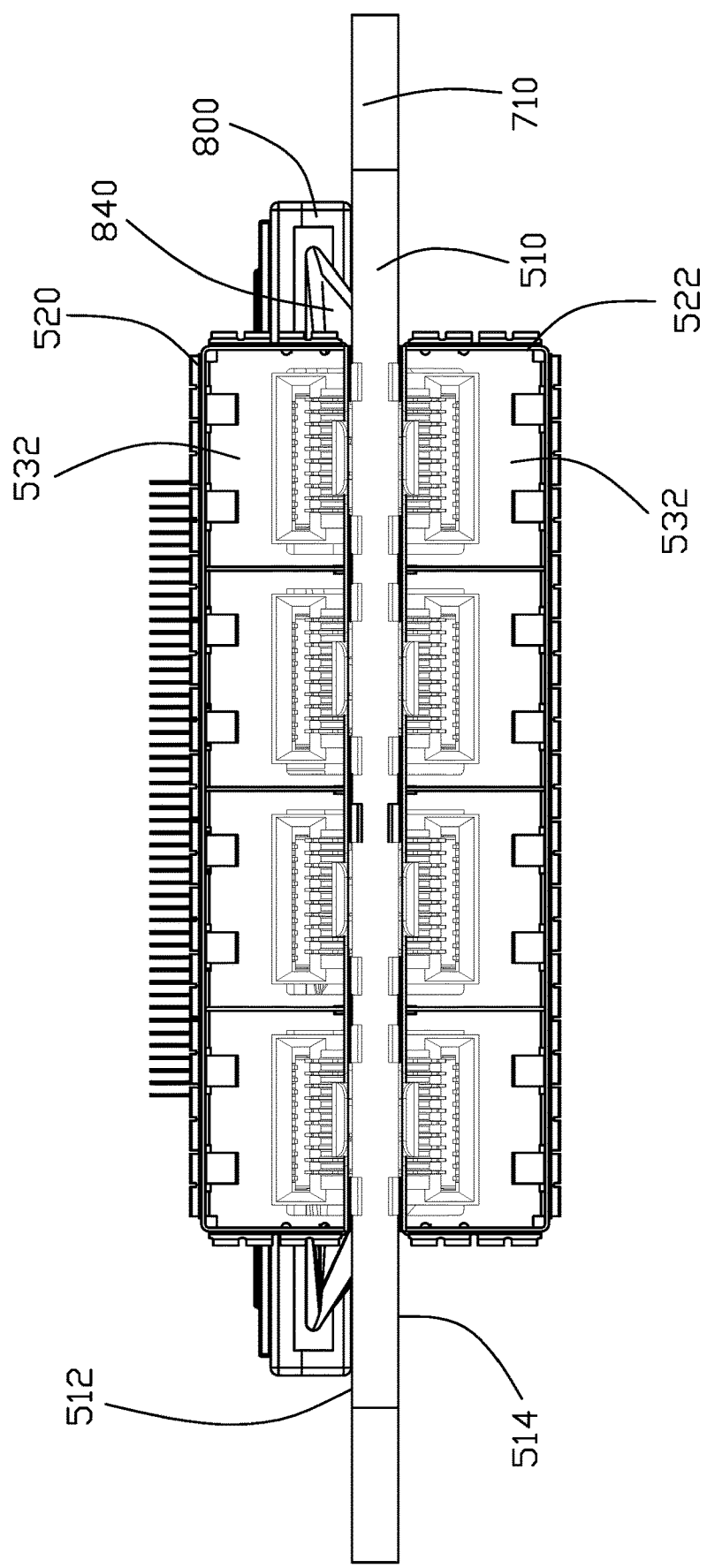
FIG. 26 is a front view of the electrical assembly of FIG. 23(A)
Figure 27A:
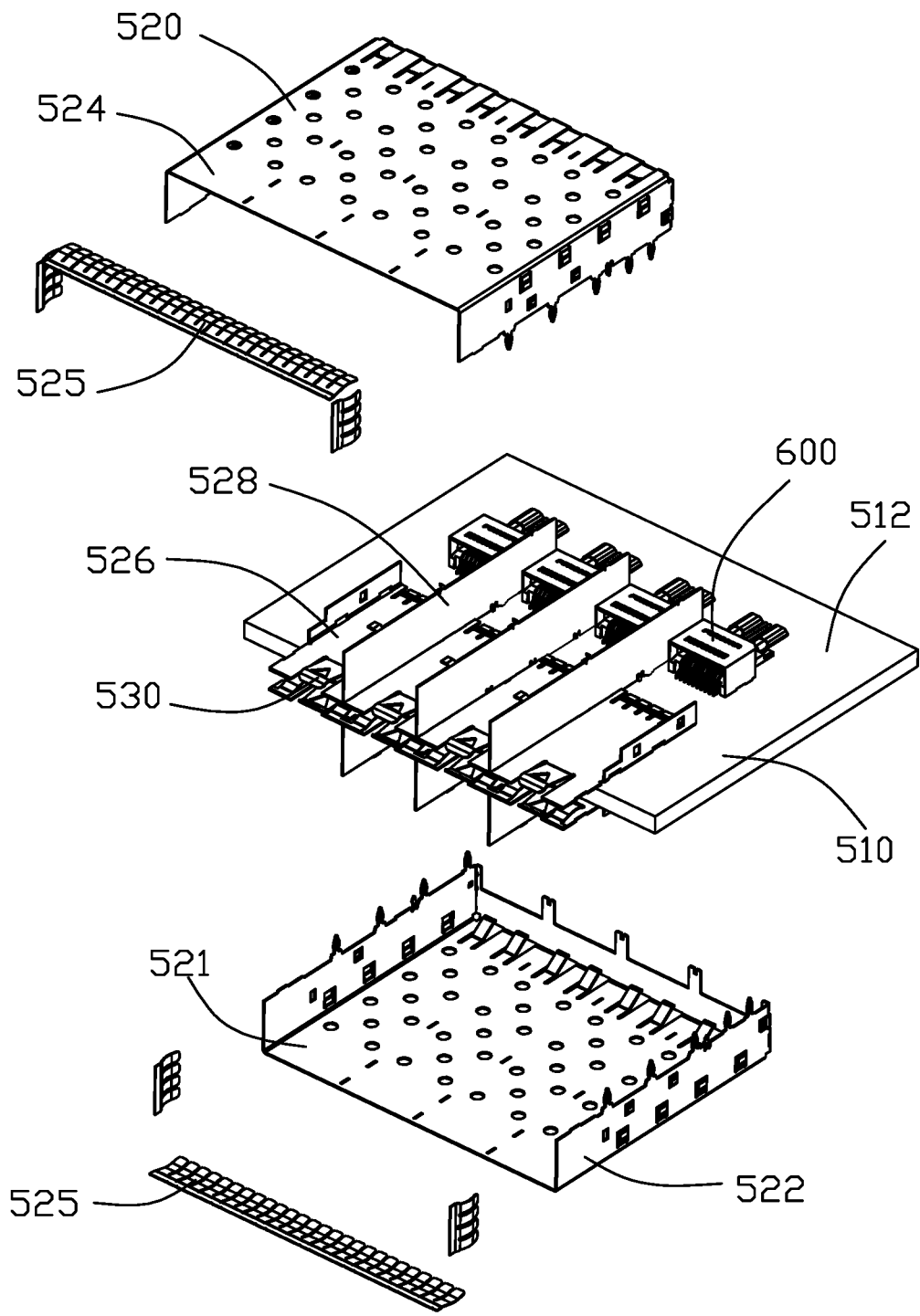
FIG. 27(A) is an exploded perspective view of the electrical assembly of FIG. 23(A)
Figure 27B:
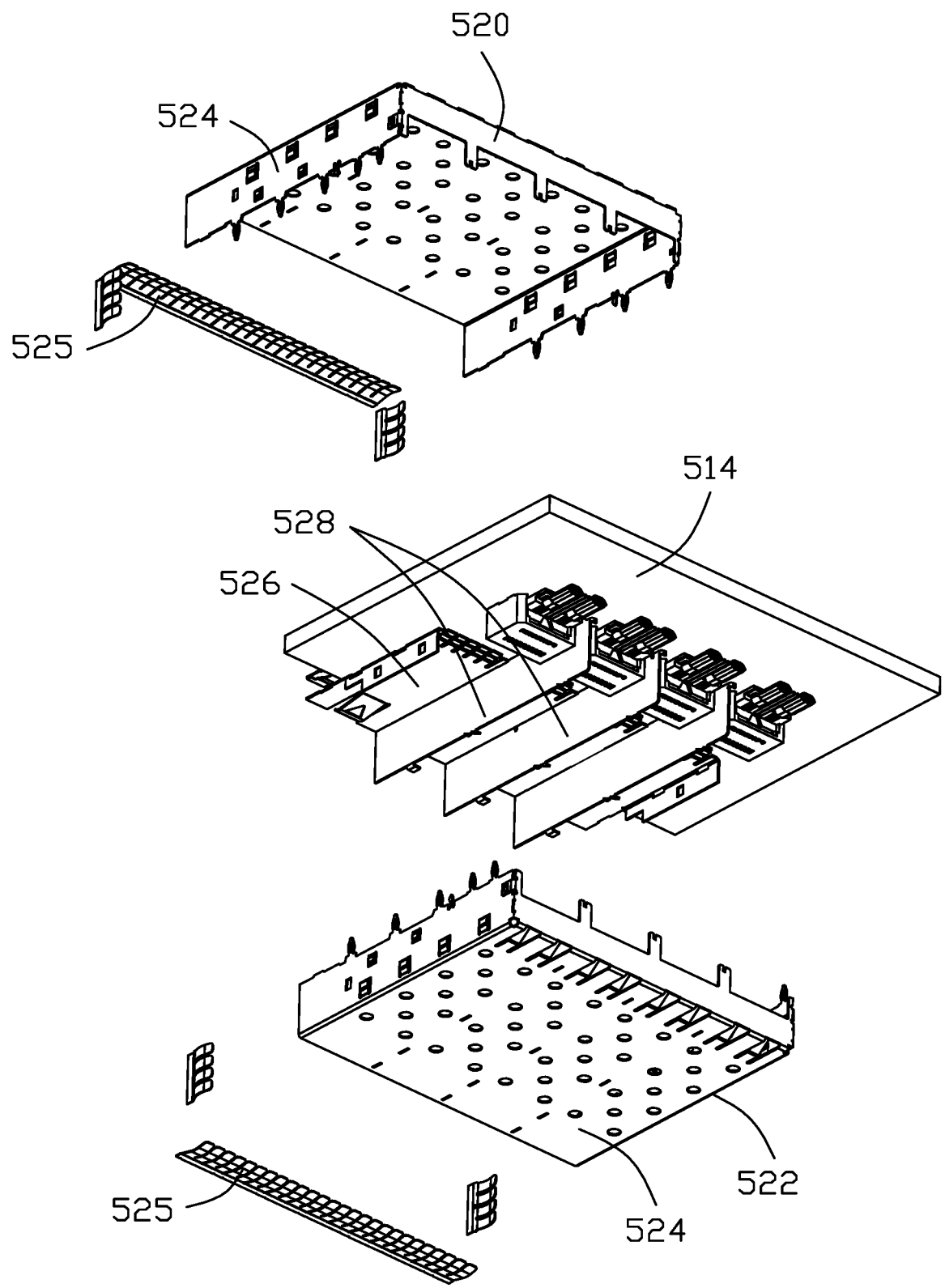
FIG. 27(B) is another exploded perspective view of the electrical assembly of FIG. 27(A)
Figure 28A:
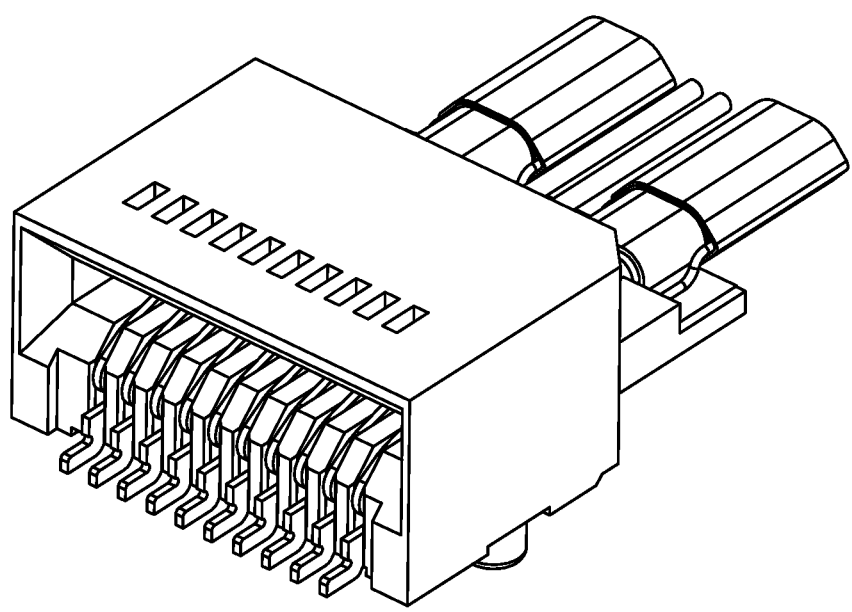
FIG. 28(A) is a perspective view of the cable receptacle connector of the electrical assembly of FIG. 23(A)
Figure 28B:
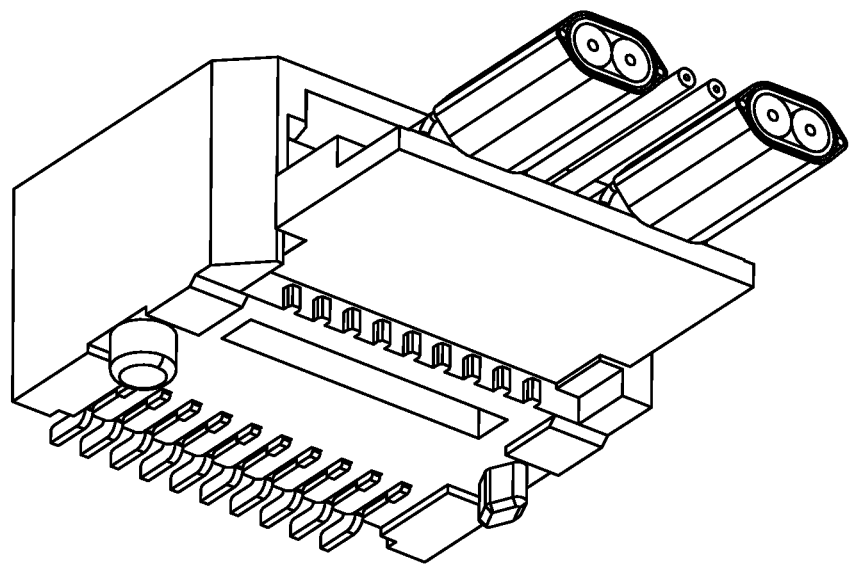
FIG. 28(B) is another perspective view of the cable receptacle connector of the electrical assembly of FIG. 28(A)
Figure 28C:
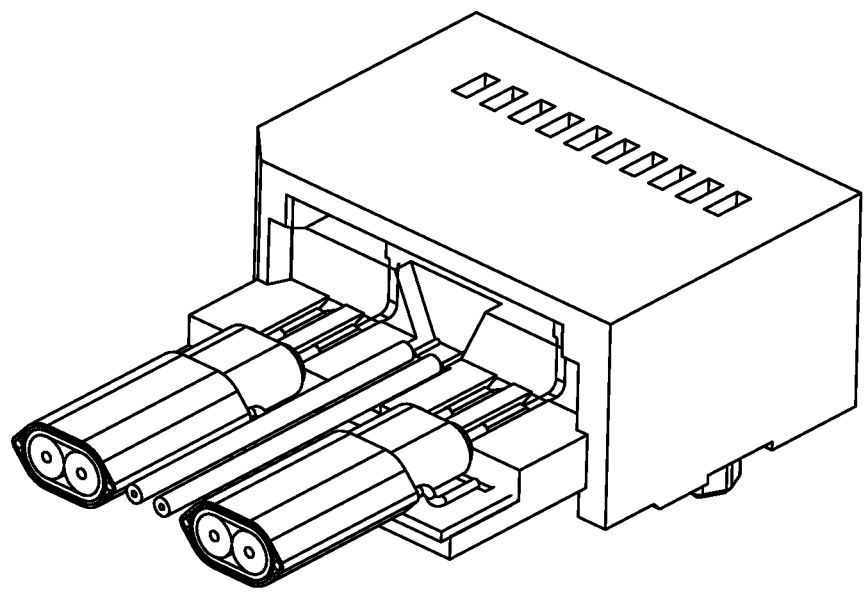
FIG. 28(C) is another perspective view of the cable receptacle connector of the electrical assembly of FIG. 28(A)
Figure 29A:
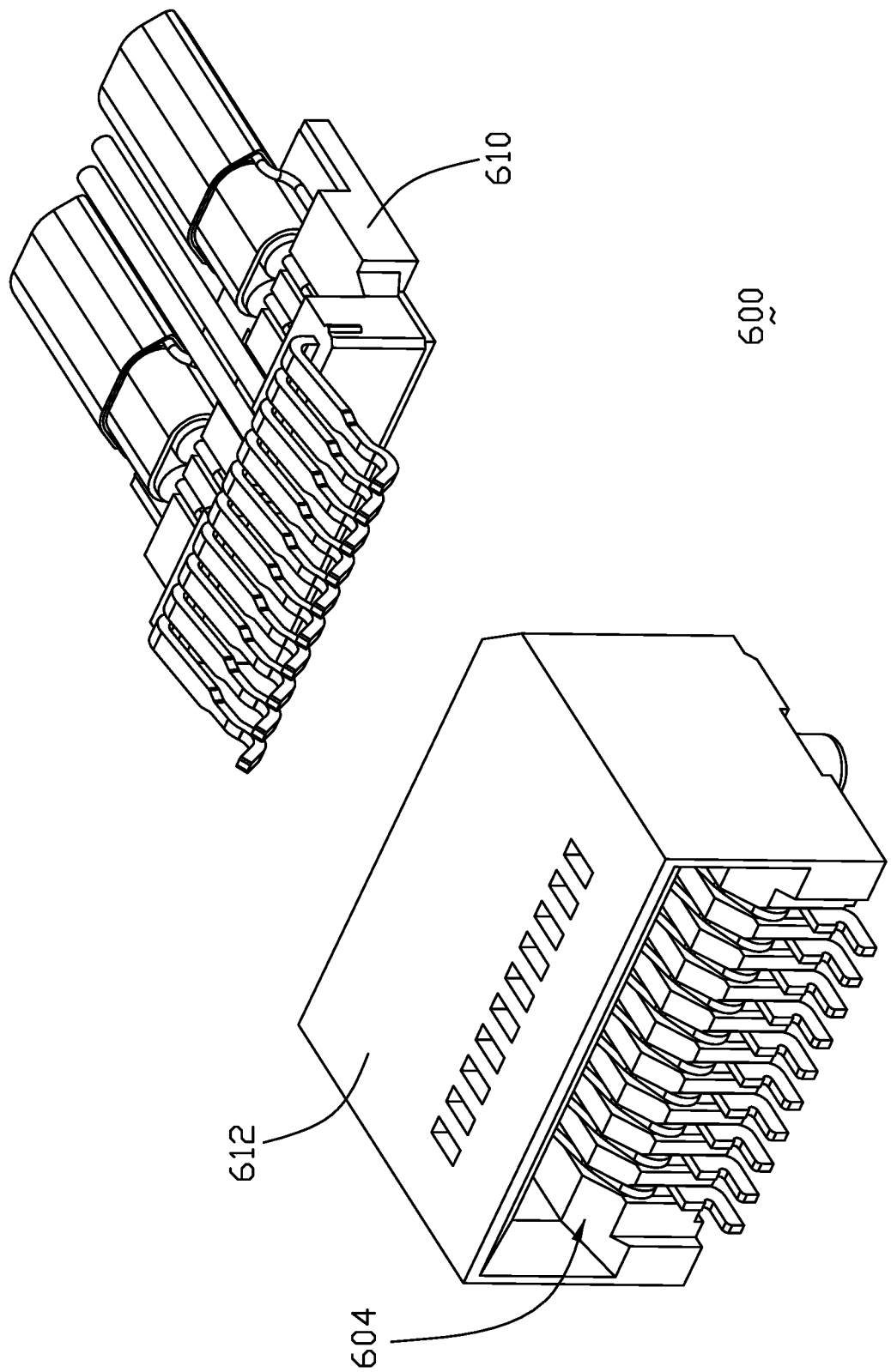
FIG. 29(A) is an exploded perspective view of the cable receptacle connector of the electrical assembly of FIG. 28(A)
Figure 29B:
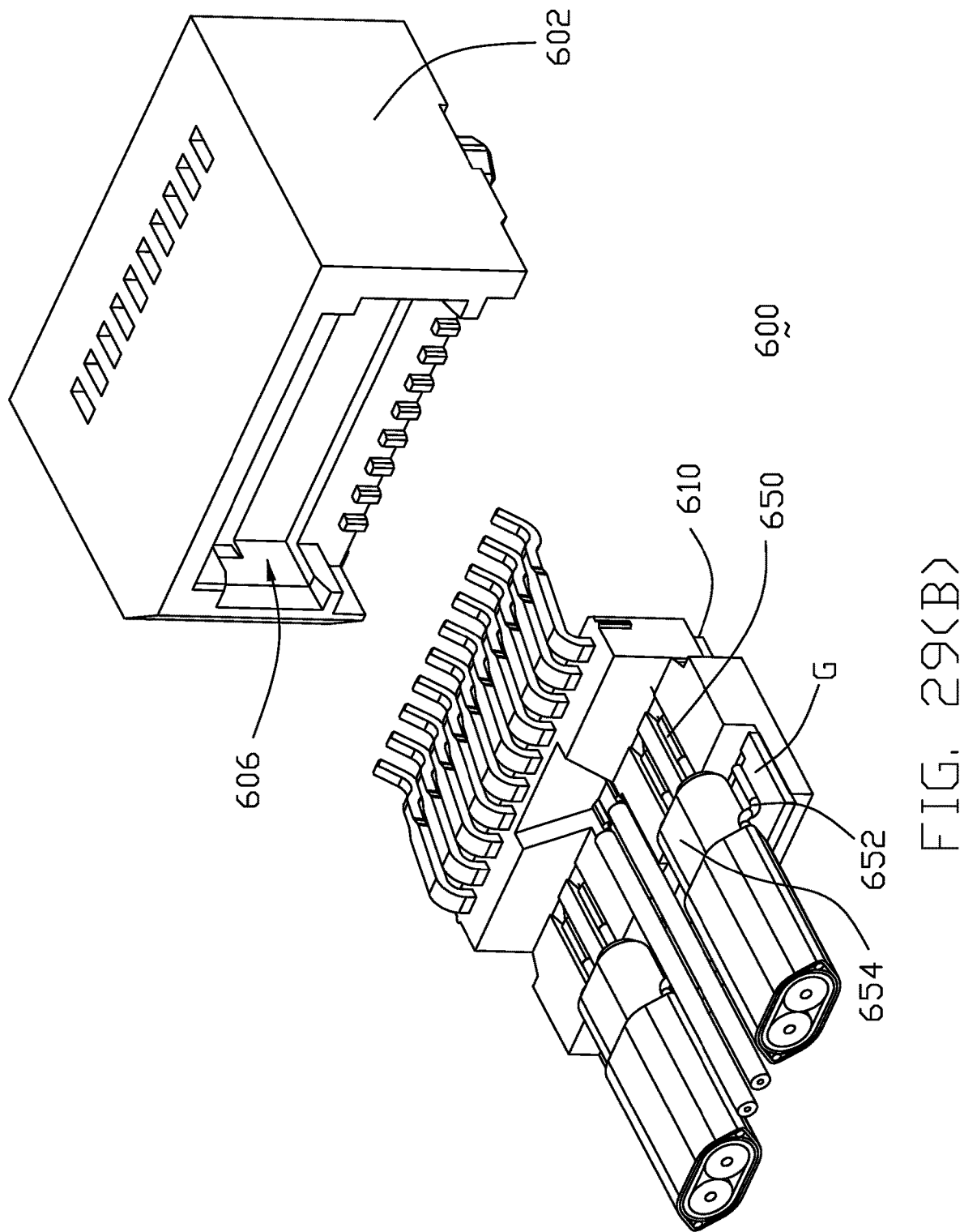
FIG. 29(B) is another exploded perspective view of the cable receptacle connector of the electrical assembly of FIG. 29(A)
Figure 29C:
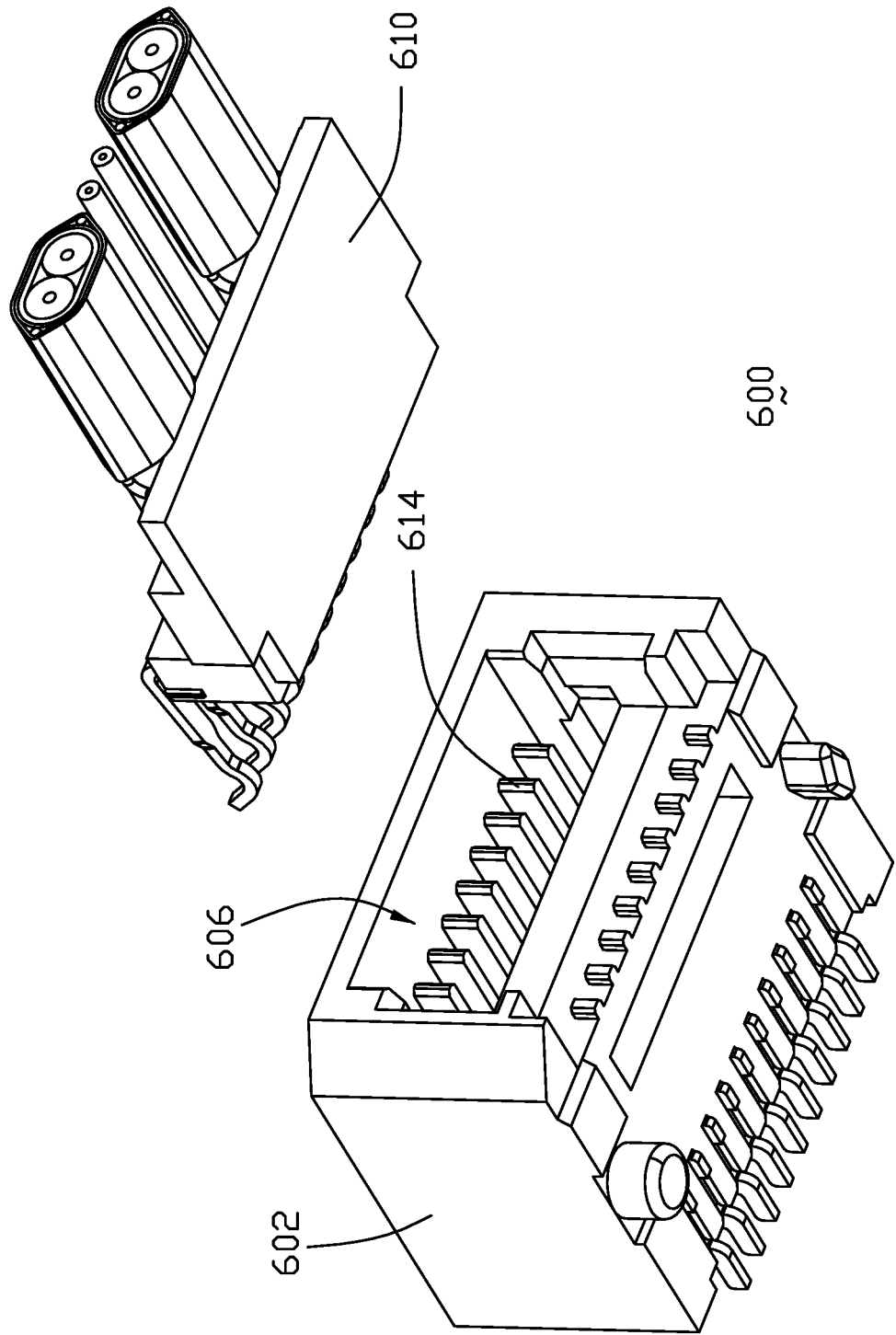
FIG. 29(C) is another exploded perspective view of the cable receptacle connector of the electrical assembly of FIG. 29(A)
Figure 30A:
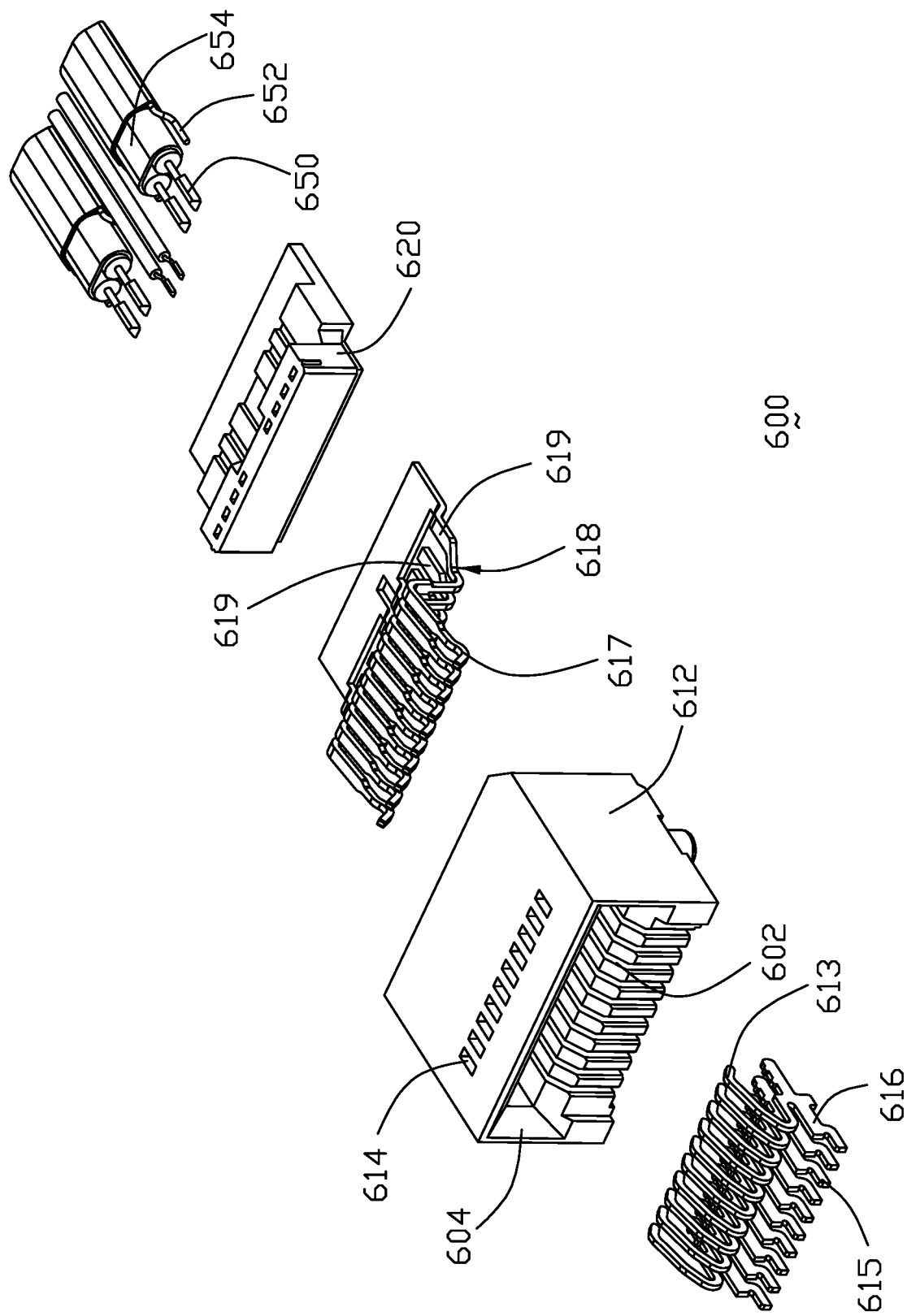
FIG. 30(A) is a further exploded perspective view of the cable receptacle connector of the electrical assembly of FIG. 29(A)
Figure 30B:
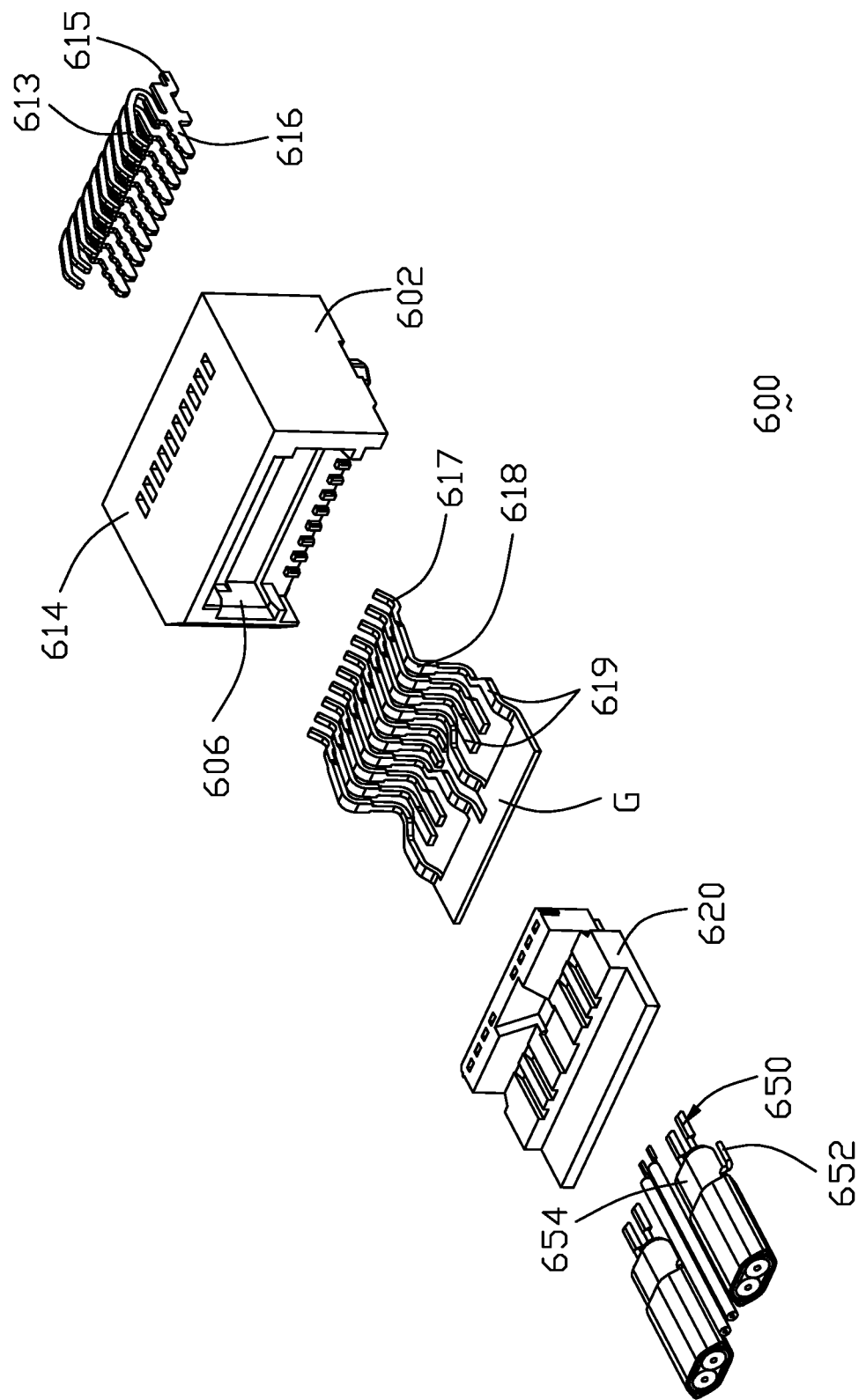
FIG. 30(B) is another further exploded perspective view of the cable receptacle connector of the electrical assembly of FIG. 30(A)
Figure 31A:
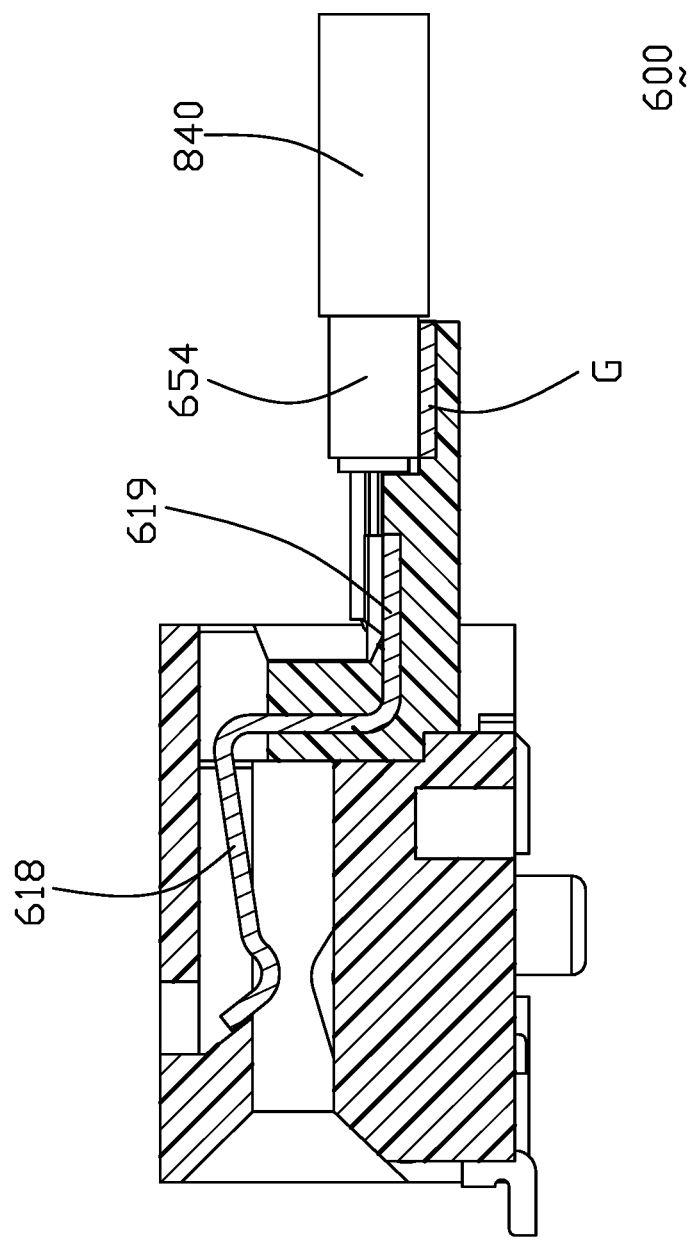
FIG. 31(A) is a cross-sectional view of the cable receptacle connector of the electrical assembly of FIG. 28(A)
Figure 31B:
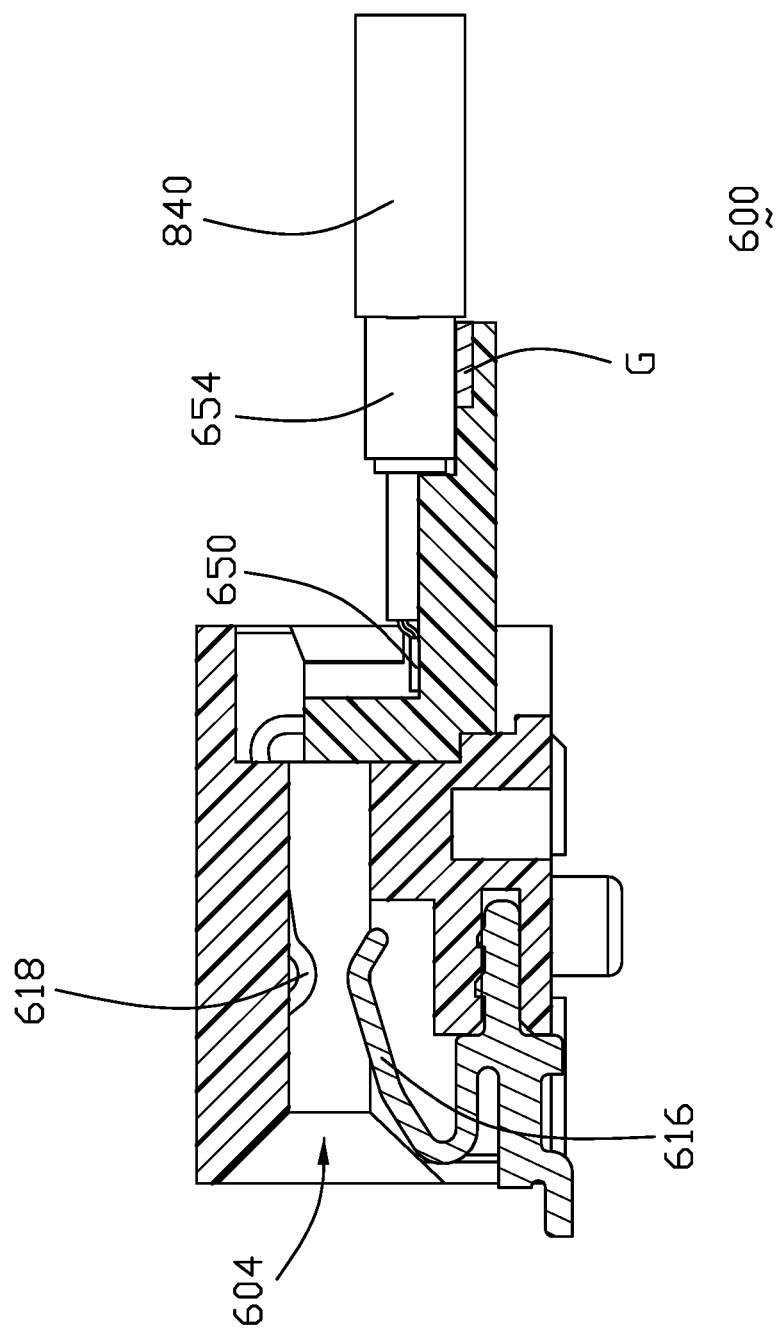
FIG. 31(B) is another cross-sectional view of the cable receptacle connector of the electrical assembly of FIG. 28(A)
Figure 32:
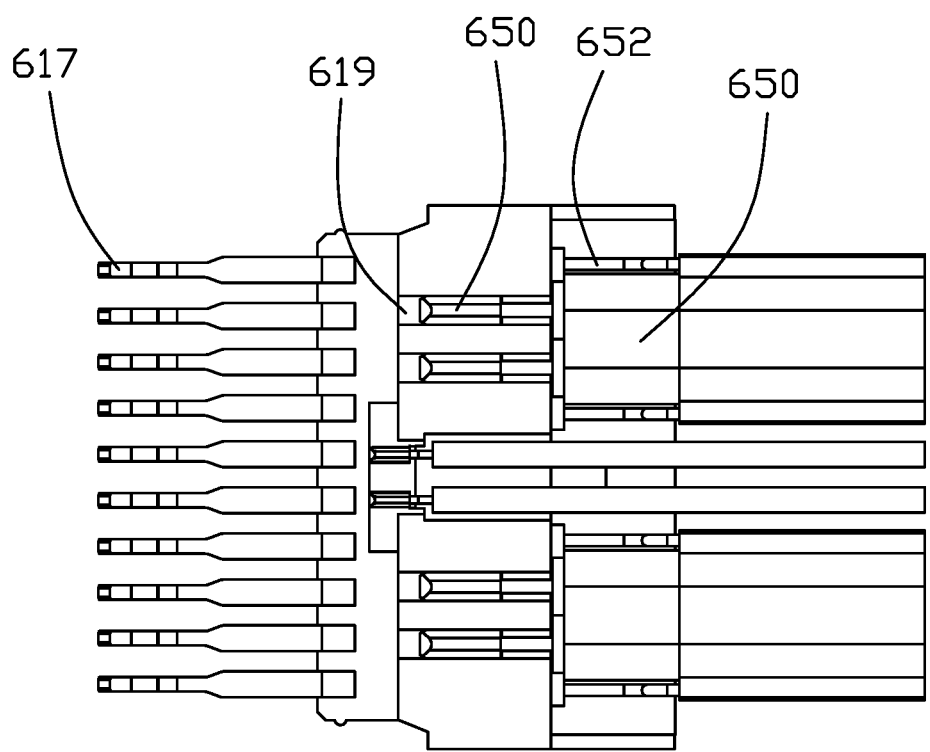
FIG. 32 is a plan view of the contact module of the cable receptacle connector of the electrical assembly of FIG. 29(A)
Figure 33A:
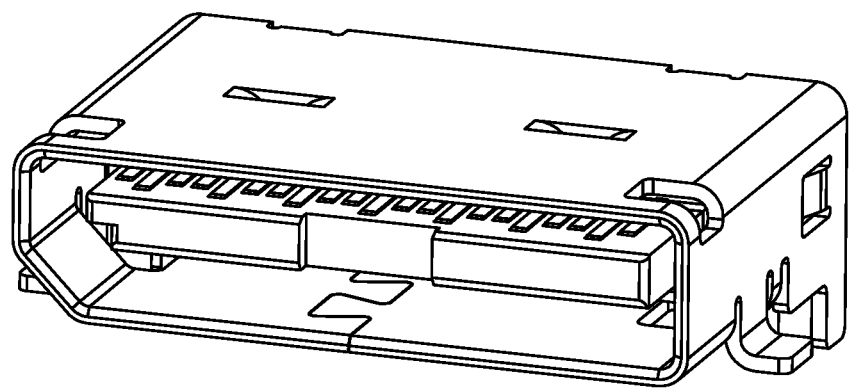
FIG. 33(A) is a perspective view of the board-mount receptacle connector of the electrical assembly of FIG. 23(A)
Figure 33B:
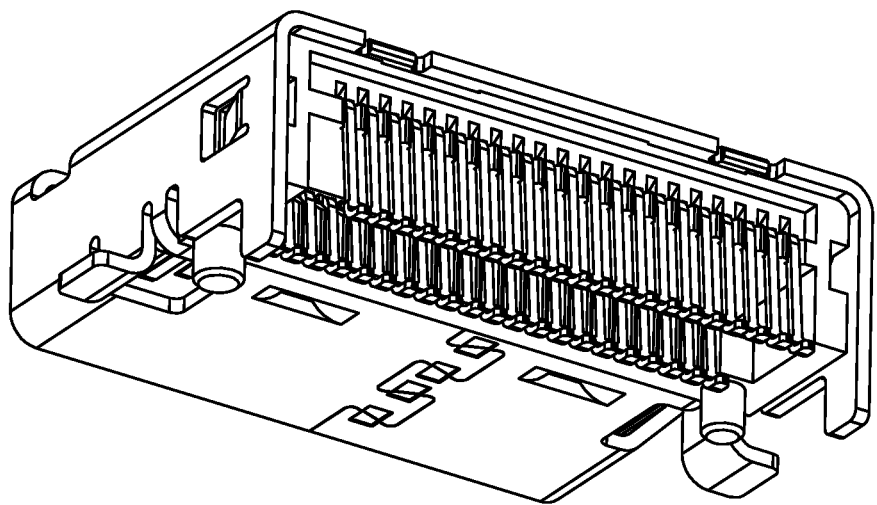
FIG. 33(B) is another perspective view of the board-mount receptacle connector of the electrical assembly of FIG. 33(A)
Figure 33C:
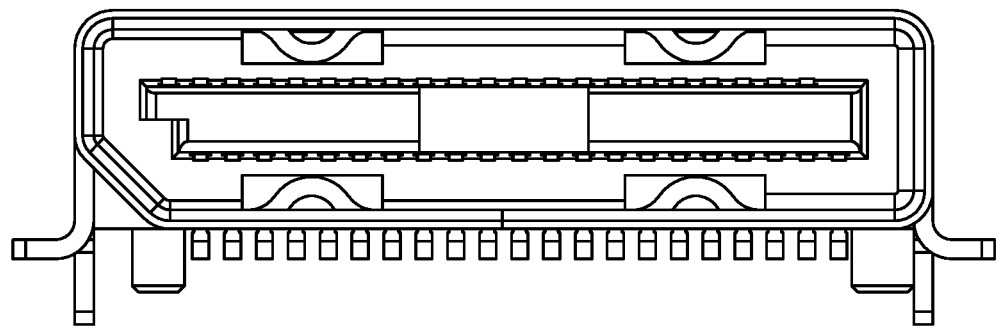
FIG. 33(C) is a front plan view of the board-mount receptacle connector of the electrical assembly of FIG. 33(A)
Figure 34A:
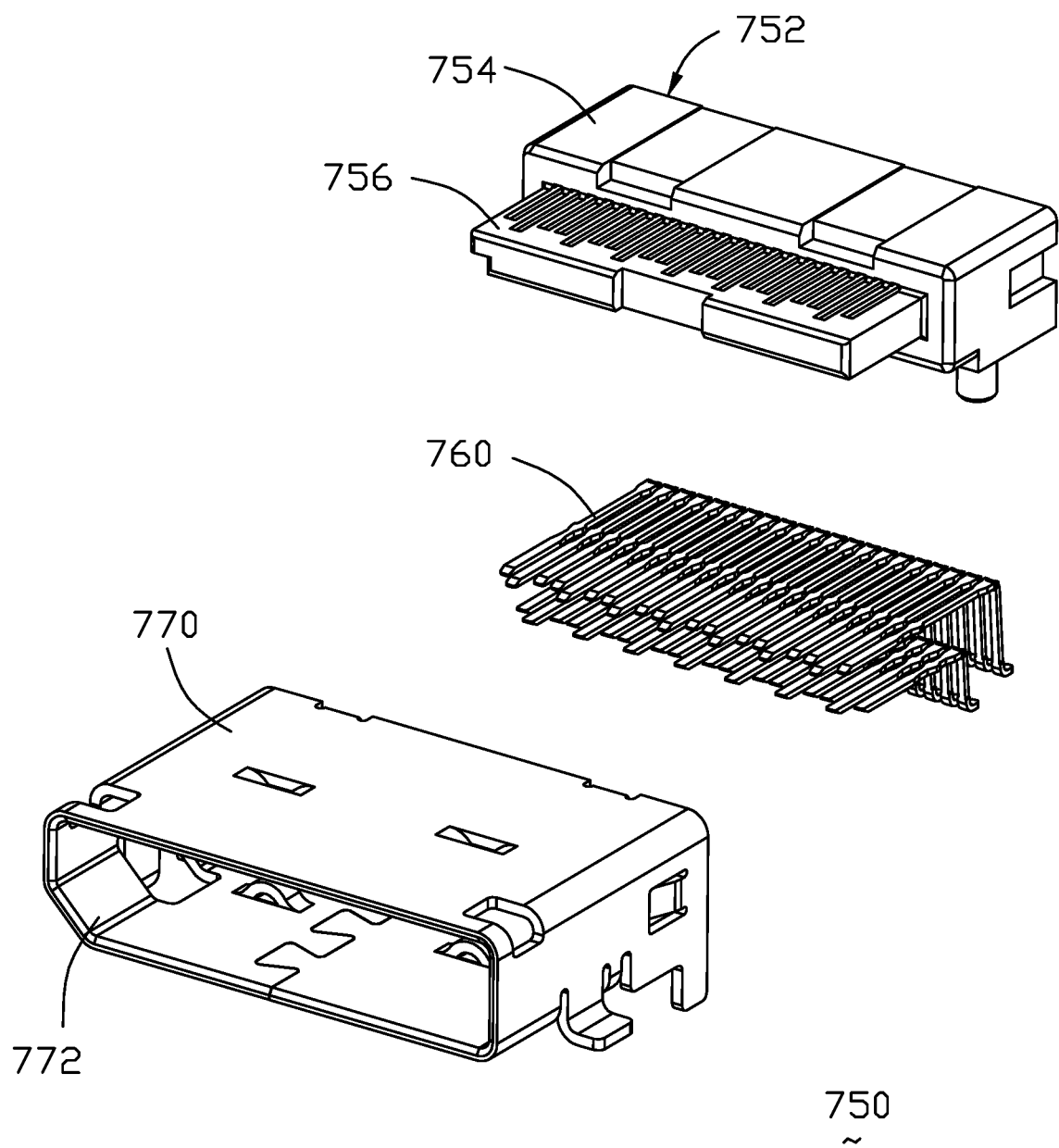
FIG. 34(A) is an exploded perspective view of the board-mount receptacle connector of the electrical assembly of FIG. 33(A)
Figure 34B:
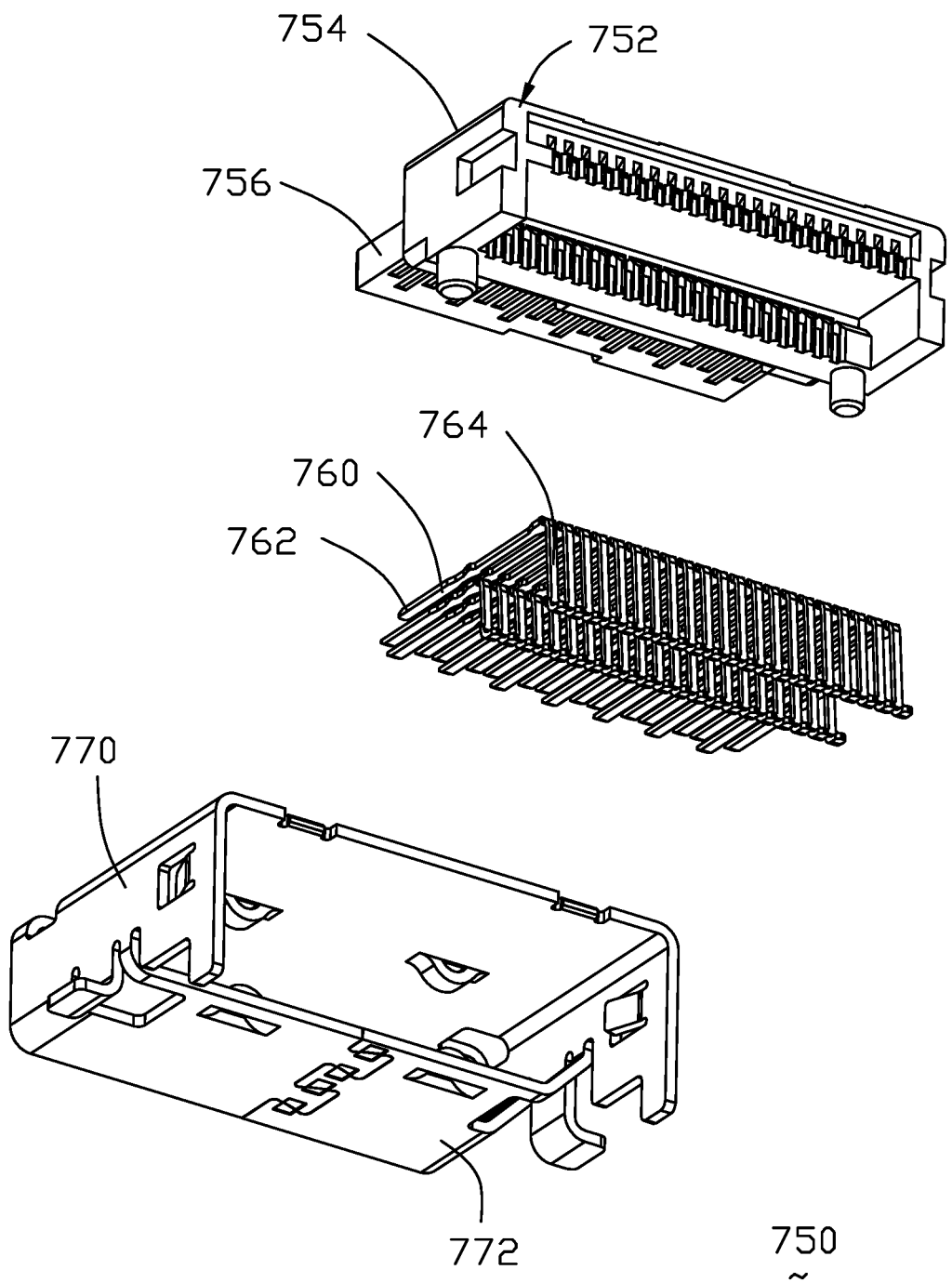
FIG. 34(B) is another exploded perspective view of the board-mount receptacle connector of the electrical assembly of FIG. 34(A)
Figure 35:
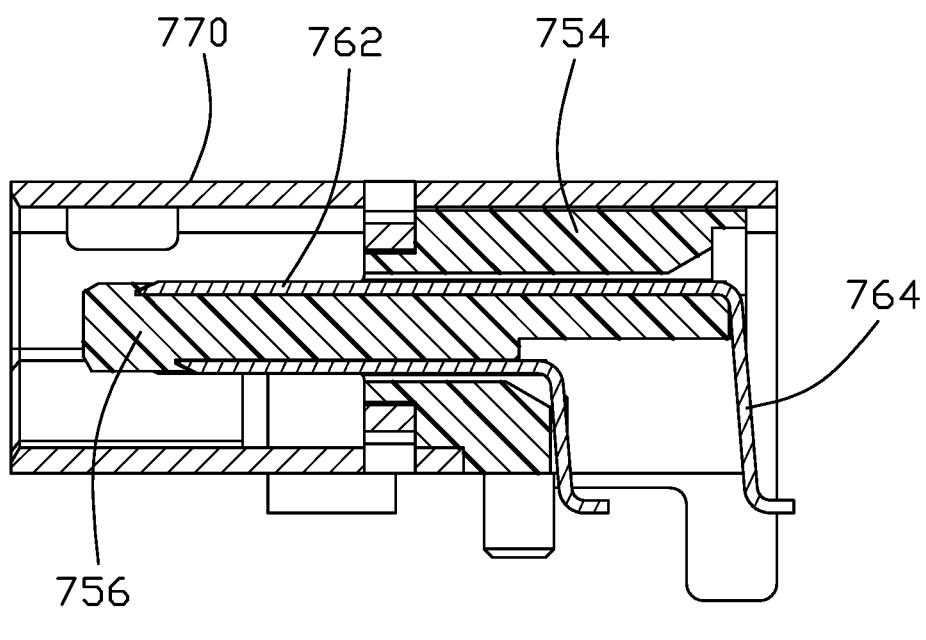
FIG. 35 is a cross-sectional view of the board-mount receptacle connector of the electrical assembly of FIG. 33(A)
Figure 36A:
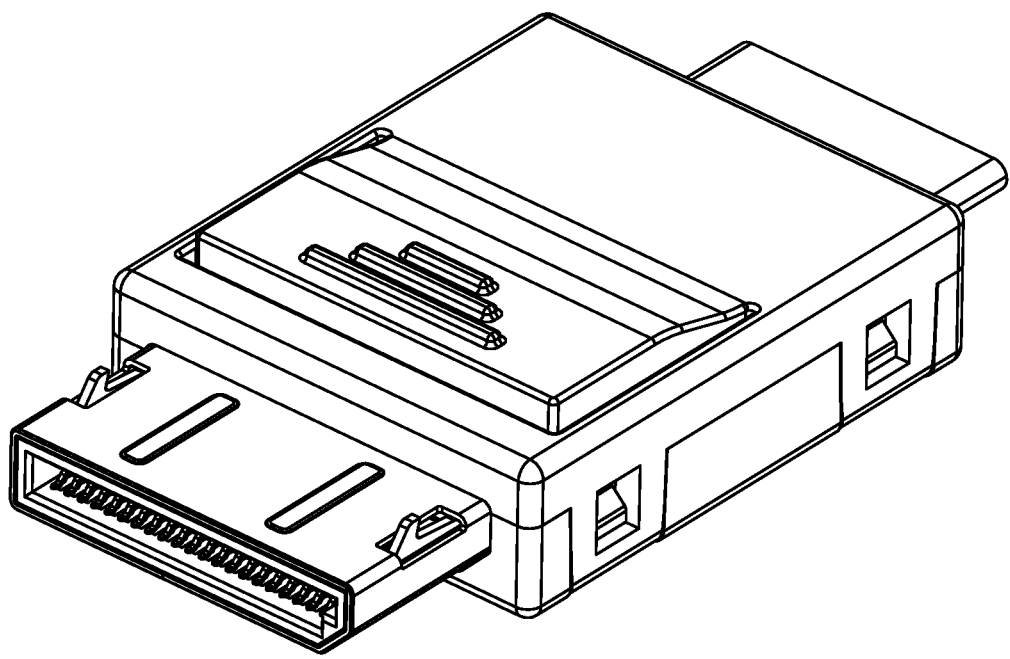
FIG. 36(A) is a perspective view of the cable (plug) connector of the electrical assembly of FIG. 23(A)
Figure 36B:
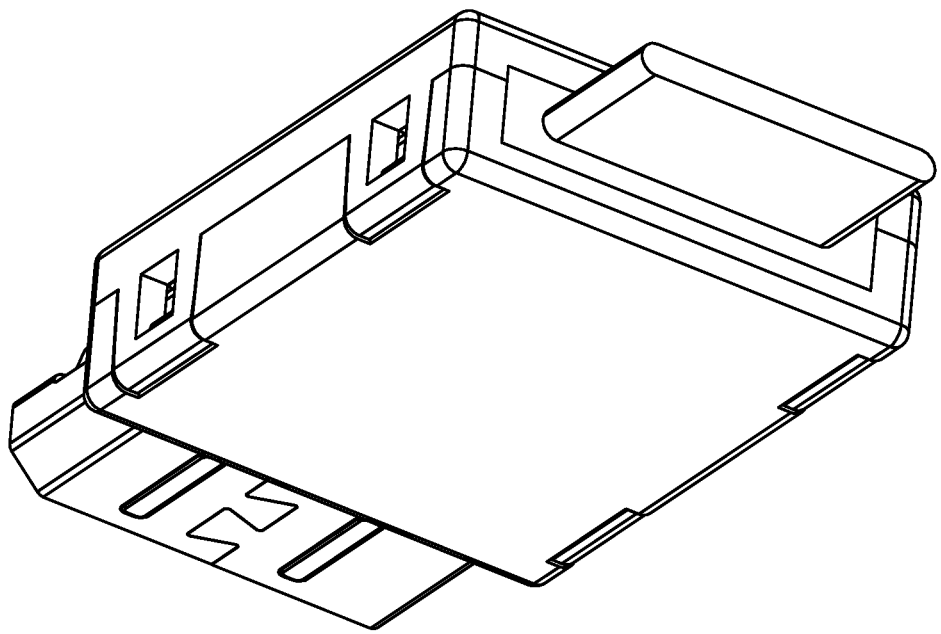
FIG. 36(B) is another perspective view of the cable (plug) connector of the electrical assembly of FIG. 36(A)
Figure 36C:
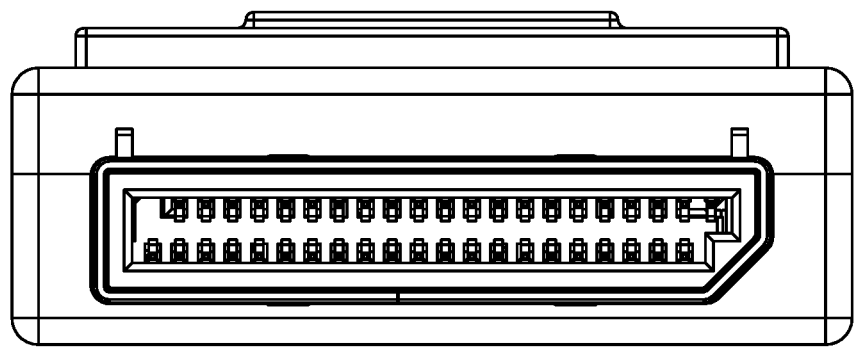
FIG. 36(C) is a front plan view of the cable (plug) connector of the electrical assembly of FIG. 36(A)
Figure 37A:
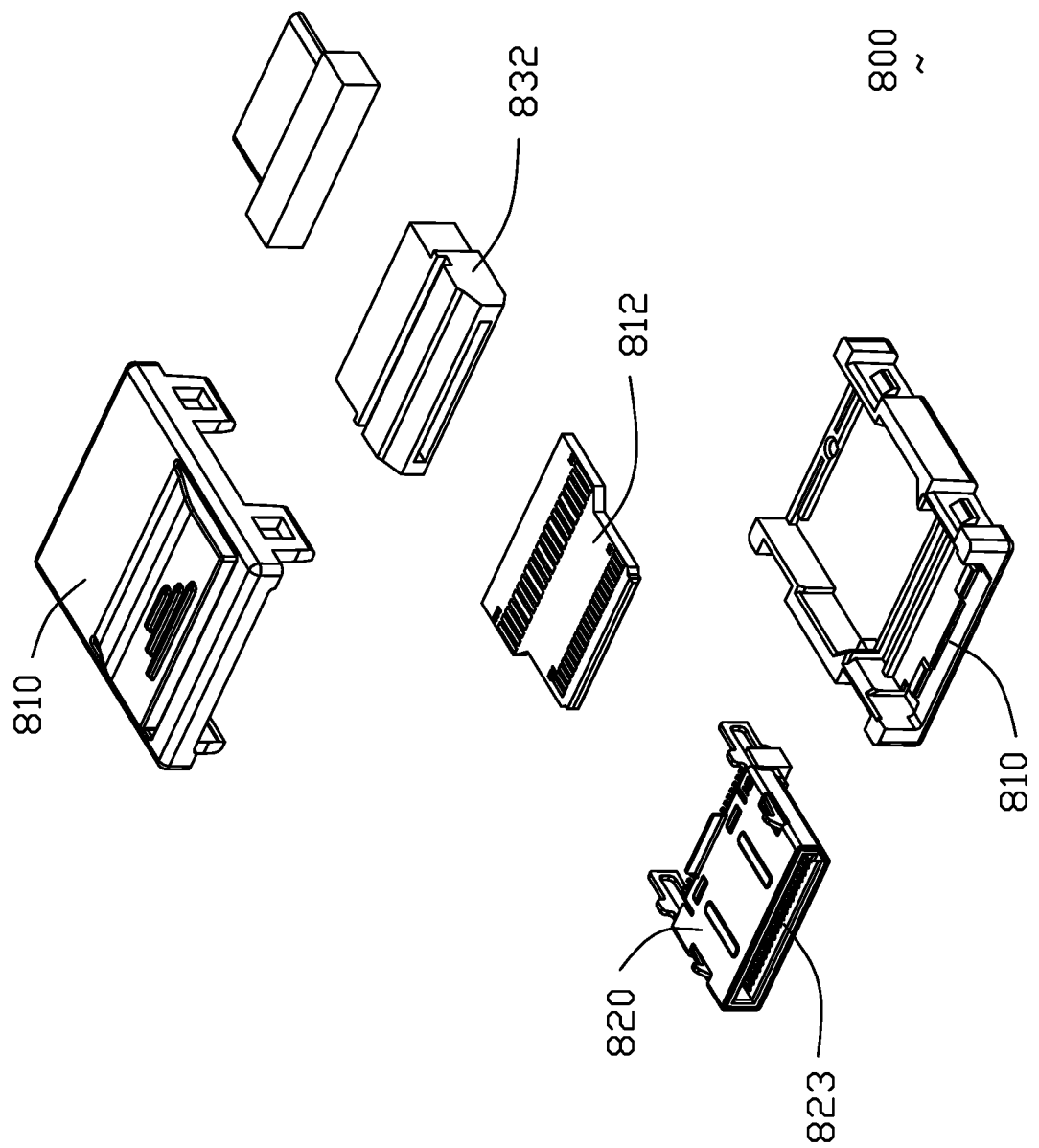
FIG. 37(A) is an exploded perspective view of the cable (plug) connector of the electrical assembly of FIG. 36(A)
Figure 37B:
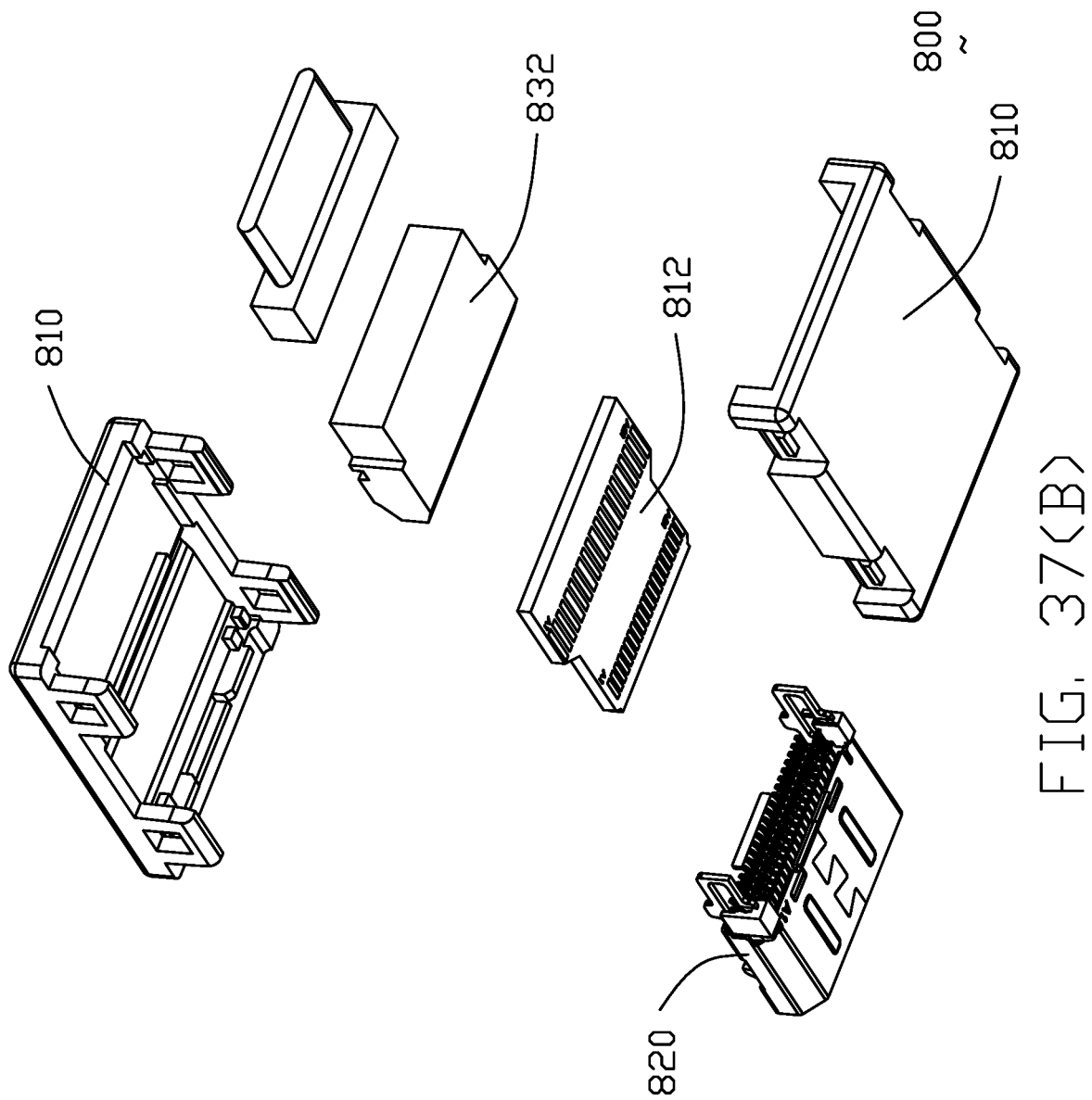
FIG. 37(B) is another exploded perspective view of the cable (plug) connector of the electrical assembly of FIG. 37(A)
Figure 38:
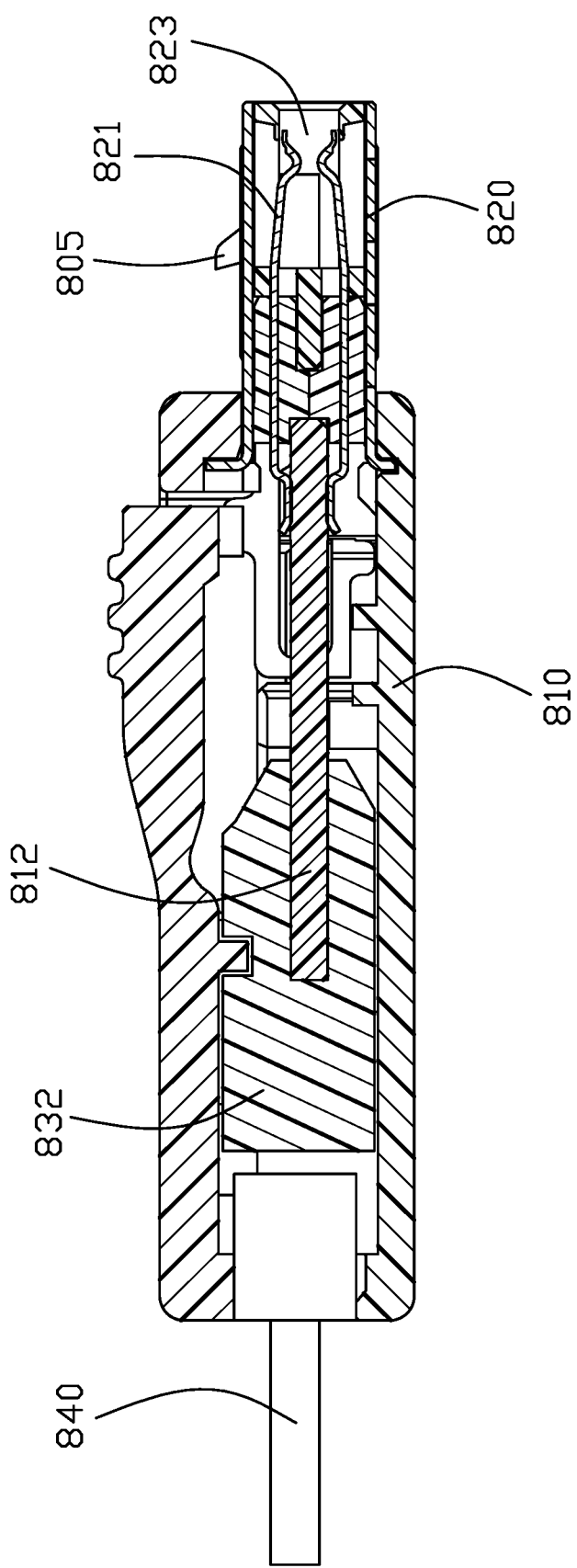
FIG. 38 is a cross-sectional view of the cable (plug) connector of the electrical assembly of FIG. 37(A)
Figure 39:
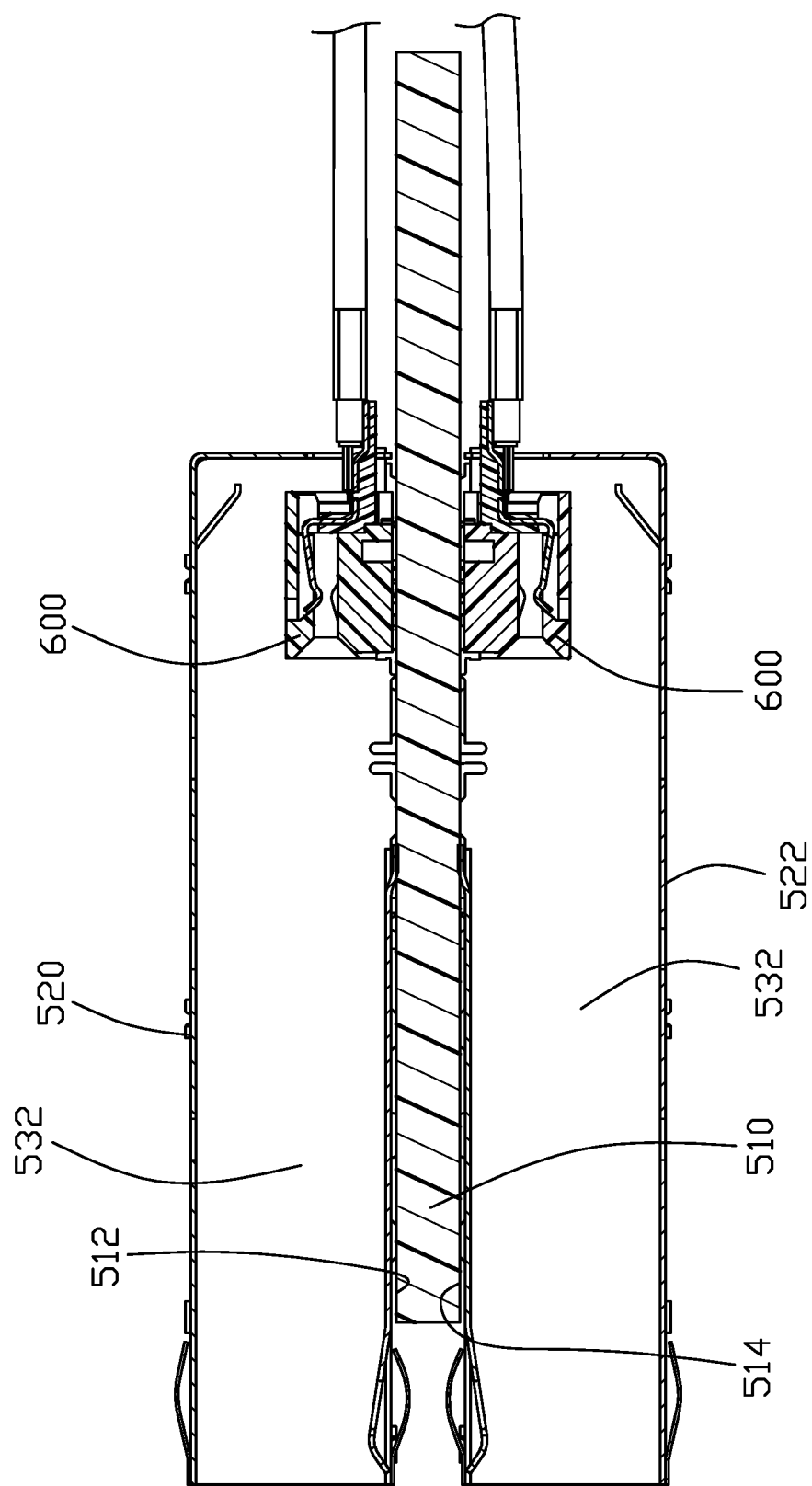
FIG. 39 is a cross-sectional view of the periphery side of the electrical assembly of FIG. 23(A)
Figure 40:
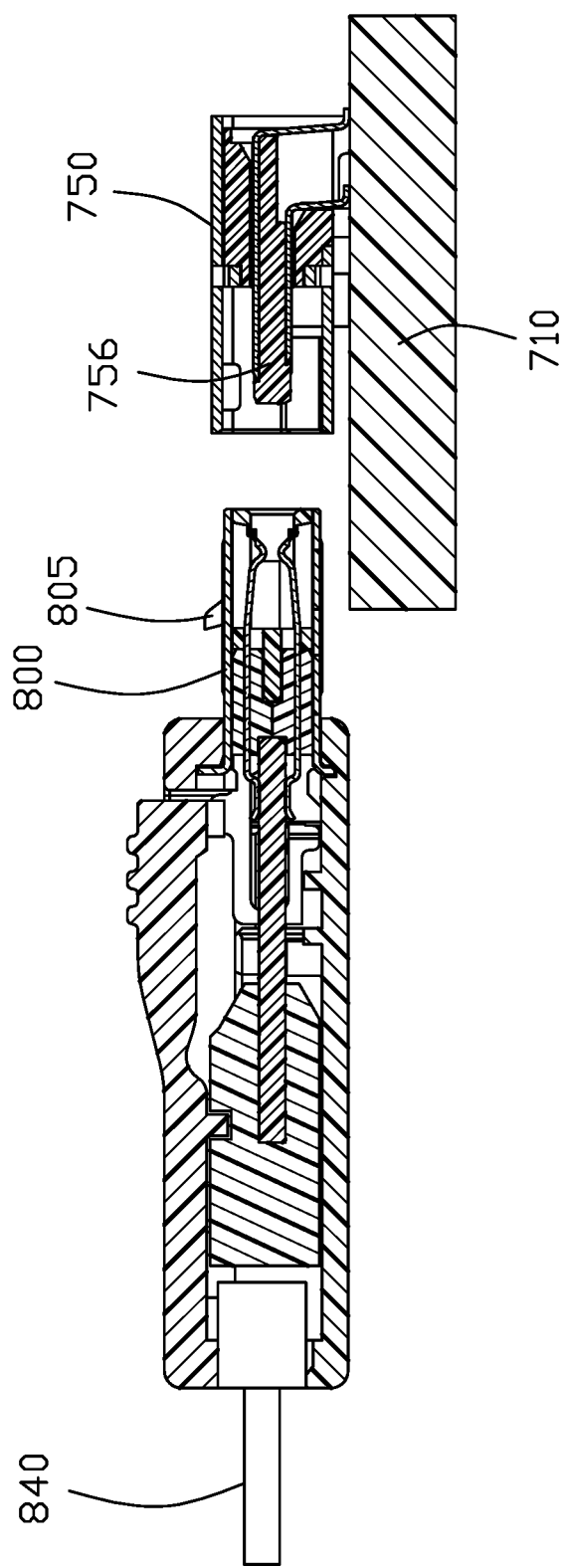
FIG. 40 is a cross-sectional view of the system side of the electrical assembly of FIG. 23(A).

A light pipe unit 200 associated with each cable receptacle connector 100, includes an insulative base 202 retained in a metallic bracket 204 which is attached to the corresponding dividers 87 by two sides in the transverse direction, and two pairs of light pipes 206 with front portions arranged in one row along a transverse direction at a front face of the base 202 around a front opening of the cage 80, and rear portions on two opposite sides of the housing 102 for receiving light from a light emitter (not shown) on the printed circuit board 90 wherein a pair of light pipes 206 are located on each side in a stacked manner. Notably, the base 202 and the bracket 204 are essentially located at a mid-level of the receiving cavity 88 so as to form opposite upper and lower receiving spaces for receiving the two corresponding SFP modules (not shown) of which the front mating end regions are adapted to be inserted into the upper mating port 104 and the lower mating port 105, respectively. It is noted that the bracket 204 forms a pair of deflectable locking tabs (not labeled) with a triangular locking hole therein for locking with the triangular locking lug of the inserted SFP module (not shown). Upper and lower kicker springs 199 are located around the corresponding mating ports 104, 105 for cooperating with the inserted SFP modules (not shown). In this embodiment, the two pairs of light pipes 206 are Referring to FIGS. 23(A)-40, an electrical assembly 500 includes a periphery side 502 and a system side 702 linked to each other. The periphery side 502 includes a printed circuit board 510 defining opposite top/first and bottom/second surfaces 512, 514. A first metallic cage 520 is mounted upon the first surface 512, and a second metallic cage 522 is mounted upon the second surface 514. Each of the first cage 520 and the second cage 522 includes a main body 524, a seat cover 526 and a plurality of dividers 528 assembled together to commonly defines a plurality of receiving cavities 532 for receiving corresponding FSP modules (not shown). The seat cover 526 forms a deflectable locking tab 530 for engagement with the inserted SFP module (not shown). A metallic gasket structure surrounds the first cage 520 and the second cage 522 around the front opens.

A cable receptacle connector 600 is located around a rear end of each receiving cavity 532 and includes an insulative housing 602 forming a mating slot 604 in a front portion for receiving a mating part of the inserted SFP module (not shown) and a receiving space 606 in a rear portion to receive the contact module 610. A plurality of floor passageways 612 and a plurality of ceiling passageways 614 are formed in the housing 602. A plurality of floor contacts 616 are retained in the corresponding floor passageways 612. Each of the floor contacts 616 has a front contacting section 613 extending into the mating slot 604 and a rear connecting section 615 mounted to the printed circuit board 510. The contact module 610 includes a plurality of ceiling contacts 618 integrally formed within an insulator 620 and extending into the corresponding ceiling passageways 614. Each of the ceiling contacts 618 includes a front contacting section 617 extending into the mating slot 604 and a rear connecting section 619. The ceiling contacts 618 are arranged with two high speed groups each having four contacts 618 wherein the rear connecting sections 619 of middle two contacts 618 are mechanically and electrically connected to a differential pair wires 650, while those of the two outer contacts 619 are unitarily formed with a grounding plate G on which the drain wire 652 and/or a braiding foil 654 of the differential pair wires 650 is connected. Notably, the middle two contacts between two groups belong to VCC.

A board-mount receptacle connector 750 is mounted upon the main board 710 on the system side 702, and includes an insulative housing 752 enclosed in a metallic shield 770, and a plurality of contacts 760 retained thereto. The housing 752 includes a base 754 and a mating tongue 756 extending forwardly therefrom. Each of the contacts 760 includes a front contacting section 762 exposed upon the corresponding mating surface of the mating tongue 756, and a rear connecting section 764 mounted upon the main board 710. A chamfer structure 772 is formed on one corner of the shield 770.

A cable (plug) connector 800 is mated with the corresponding board-mount receptacle connector 710, and includes a case 810 enclosing an inner printed circuit board 812 with a mating part 820, which includes a plurality of contacts 821 extending into the mating groove 823 for receiving the mating tongue 756 during mating, connected at a front region of the inner printed circuit board 812 for mating with the board-mount receptacle connector 710. A cable 840 with the inner cover 832 is connected to a rear region of the inner printed circuit board 812 for stably holding the inner printed circuit board 812 in the case 810. The cable 840 includes the corresponding differential pair wires 650 linked with both two corresponding cable receptacle connectors 600 in the receiving cavities 532 of the first cage 520 and of the second cage 522 which are aligned with each other in the vertical direction. In this embodiment, there are four receiving cavities 532 in each of the first cage 520 and the second cage 522 so there are four cable (plug) connectors 800 and four board-mount receptacle connectors 750 correspondingly. The cable connector 800 includes a deflectable latch 805 for engagement with the board-mount receptacle connector 710.

Notably, the difference between the first embodiment and the second embodiment is that the first embodiment uses the stacked arrangement on the same surface of the printed circuit board on the periphery side while the second embodiment uses the single deck on the opposite surfaces of the printed circuit board. Additionally, the second embodiment uses four cables connected with corresponding four pairs of cable receptacle connectors, respectively, wherein each pair of cable receptacle connector are aligned with each other in the vertical direction while the first embodiment uses two cables connected with one half of the cable receptacle connectors on each half side, respectively. The common feature of both embodiments includes the provision of two rows of receiving cavities associated with the corresponding cable receptacle connectors in a mirror image manner with each other in the vertical direction for receiving the corresponding SFP modules in the symmetrical way. Also, using the fly-over cables between the periphery side and the system side in a one-to-two or one-to-four relation is more efficient than the circuit path transmission on the printed circuit board.

What is claimed is:
1. An electrical assembly comprising:
a periphery side and a system side connected with each other via a plurality of cables;
the periphery side including:
a first printed circuit board;
a cage structure mounted upon the first printed circuit board;
a plurality of receiving cavities formed in the cage for receiving a plurality of modules therein; and a plurality of cable receptacle connectors located at rear portions of said receiving cavities, respectively;
the system side including:
a second printed circuit board;
a plurality of board-mount receptacle connectors mounted upon the second printed circuit board; and
a plurality of cables connected between the cable receptacle connectors and the board-mount receptacle connectors; wherein
each cable has one end directly integrally connected to at least one corresponding cable receptacle connector, and the other end detachably connected to the corresponding board-mount receptacle connector via a plug connector;
the first printed circuit board and the second printed circuit board are formed by two different portions of a one piece of printed circuit board;
each of said cables is connected to two corresponding cable receptacle connectors which are aligned with each other in a vertical direction; and
said two corresponding cable receptacle connectors are arranged in a mirror image manner in the vertical direction.

2. The electrical assembly as claimed in claim 1, wherein the cage forms two rows of receiving cavities each of which is equipped with one of said cable receptacle connectors at the rear portion.

3. The electrical assembly as claimed in claim 2, wherein said two rows of receiving cavities are arranged on two opposite surfaces of the first printed circuit board, respectively.

4. The electrical assembly as claimed in claim 3, wherein said cage structure includes two separate cage units respectively mounted upon said two opposite surfaces of the first printed circuit board.

5. The electrical assembly as claimed in claim 4, wherein each of said cage units has a locking tab adjacent to the surface on which the cage unit is mounted.

6. The electrical assembly as claimed in claim 1, wherein each of said cable receptacle connectors defines two rows of contacts, and one row of the contacts are mounted to the printed circuit board while the other row of contacts are connected to the cable.

7. The electrical assembly as claimed in claim 6, wherein said one row of contacts is closer to the first printed circuit board than said other row of contacts in a vertical direction.

8. The electrical assembly as claimed in claim 6, wherein the other row of contacts are integrally formed with an insulator while said row of contacts are respectively assembled to an insulative housing of the cable receptacle connector in which said insulator is inserted.

9. The electrical assembly as claimed in claim 1, wherein each of said cables is connected to four corresponding cable receptacle connectors which are aligned with each other in a transverse direction.

10. The electrical assembly as claimed in claim 9, wherein each of the cable receptacle connectors comprises an insulative housing forming a cavity to receive a corresponding contact module.

11. The electrical assembly as claimed in claim 10, wherein the housing comprises a pair of forwardly protruding upper and lower mating ports spaced apart from each other in a vertical direction.

12. The electrical assembly as claimed in claim 10, wherein the contact module comprises two opposite side modules subassembly commonly sandwiching a center module subassembly.

13. The electrical assembly as claimed in claim 12, wherein each of the side modules subassembly comprises a first unit, a second unit, a third unit and a fourth unit stacked with one another in sequence from top to bottom in a vertical direction.

14. An electrical assembly comprising:
a periphery side and a system side connected with each other via a plurality of cables;
the periphery side including:
a first printed circuit board;
a cage structure mounted upon the first printed circuit board;
a plurality of receiving cavities formed in the cage for receiving a plurality of modules therein; and
a plurality of cable receptacle connectors located at rear portions of said receiving cavities, respectively;
the system side including:
a second printed circuit board;
a plurality of board-mount receptacle connectors mounted upon the second printed circuit board; and
a plurality of cables connected between the cable receptacle connectors and the board-mount receptacle connectors; wherein
each cable has one end directly integrally connected to at least one corresponding cable receptacle connector, and the other end detachably connected to the corresponding board-mount receptacle connector via a plug connector;
the first printed circuit board and the second printed circuit board are formed by two different portions of a one piece of printed circuit board;
the cage forms two rows of receiving cavities each of which is equipped with one of said cable receptacle connectors at the rear portion; and
said two rows of receiving cavities are arranged on two opposite surfaces of the first printed circuit board, respectively.

15. The electrical assembly as claimed in claim 14, wherein said cage structure includes two separate cage units respectively mounted upon said two opposite surfaces of the first printed circuit board.

16. An electrical assembly comprising:
a periphery side and a system side connected with each other via a plurality of cables;
the periphery side including:
a first printed circuit board;
a cage structure mounted upon the first printed circuit board;
a plurality of receiving cavities formed in the cage for receiving a plurality of modules therein; and
a plurality of cable receptacle connectors located at rear portions of said receiving cavities, respectively;
the system side including:
a second printed circuit board;
a plurality of board-mount receptacle connectors mounted upon the second printed circuit board; and
a plurality of cables connected between the cable receptacle connectors and the board-mount receptacle connectors; wherein
each cable has one end directly integrally connected to at least one corresponding cable receptacle connector, and the other end detachably connected to the corresponding board-mount receptacle connector via a plug connector;
the first printed circuit board and the second printed circuit board are formed by two different portions of a one piece of printed circuit board; and each of said cable receptacle connectors defines two rows of contacts, and one row of the contacts are mounted to the printed circuit board while the other row of contacts are connected to the cable.

17. The electrical assembly as claimed in claim 16, wherein said one row of contacts is closer to the first printed circuit board than said other row of contacts in a vertical direction.

18. The electrical assembly as claimed in claim 16, wherein the other row of contacts are integrally formed with an insulator while said row of contacts are respectively assembled to an insulative housing of the cable receptacle connector in which said insulator is inserted.

19. An electrical assembly comprising:
   a periphery side and a system side connected with each other via a plurality of cables;
   the periphery side including:
      a first printed circuit board;
      a cage structure mounted upon the first printed circuit board;
      a plurality of receiving cavities formed in the cage for receiving a plurality of modules therein; and
      a plurality of cable receptacle connectors located at rear portions of said receiving cavities, respectively;
   the system side including:
      a second printed circuit board;
      a plurality of board-mount receptacle connectors mounted upon the second printed circuit board; and
      a plurality of cables connected between the cable receptacle connectors and the board-mount receptacle connectors; wherein
   each cable has one end directly integrally connected to at least one corresponding cable receptacle connector, and the other end detachably connected to the corresponding board-mount receptacle connector via a plug connector;
   the first printed circuit board and the second printed circuit board are formed by two different portions of a one piece of printed circuit board; and
   each of said cables is connected to four corresponding cable receptacle connectors which are aligned with each other in a transverse direction.

20. The electrical assembly as claimed in claim 19, wherein each of the cable receptacle connectors comprises an insulative housing forming a cavity to receive a corresponding contact module.

\* \* \* \* \*